(12) United States Patent
Sprengart

(10) Patent No.: US 11,527,165 B2
(45) Date of Patent: Dec. 13, 2022

(54) AUTOMATED AIRCRAFT SYSTEM WITH GOAL DRIVEN ACTION PLANNING

(71) Applicant: The Boeing Company, Chicago, IL (US)

(72) Inventor: Sebastian Michael Sprengart, Darmstadt (DE)

(73) Assignee: The Boeing Company, Chicago, IL (US)

(*) Notice: Subject to any disclaimer, the term of this patent is extended or adjusted under 35 U.S.C. 154(b) by 102 days.

(21) Appl. No.: 16/554,768

(22) Filed: Aug. 29, 2019

(65) Prior Publication Data
US 2021/0065561 A1    Mar. 4, 2021

(51) Int. Cl.
| G08G 5/00 | (2006.01) |
| B64D 45/00 | (2006.01) |
| G01C 21/20 | (2006.01) |
| G05D 1/00 | (2006.01) |
| G05D 1/02 | (2020.01) |
| G06F 9/32 | (2018.01) |
| G07C 5/08 | (2006.01) |

(52) U.S. Cl.
CPC .......... *G08G 5/0039* (2013.01); *B64D 45/00* (2013.01); *G01C 21/20* (2013.01); *G05D 1/0088* (2013.01); *G05D 1/0202* (2013.01); *G06F 9/32* (2013.01); *G07C 5/0816* (2013.01); *G07C 5/0841* (2013.01); *G06F 2209/5011* (2013.01)

(58) Field of Classification Search
CPC .. G08G 5/0039; G08G 5/0021; G08G 5/0052; G08G 5/0013; G08G 5/0091; B64D 45/00; G01C 21/20; G01C 21/00; G05D 1/0088; G05D 1/0202; G05D 1/0005; G05D 1/0808; G05D 1/101; G06F 9/32; G06F 2209/5011; G07C 5/0816; G07C 5/0841; B64C 2201/141; B64C 13/16; B64C 13/18; B64C 27/57
See application file for complete search history.

(56) References Cited

U.S. PATENT DOCUMENTS

| 8,774,989 B1 | 7/2014 | Bush et al. |
| 10,209,122 B1 * | 2/2019 | Suddreth .............. G08G 5/0017 |

(Continued)

FOREIGN PATENT DOCUMENTS

| CN | 106200673 A | 12/2016 |
| EP | 1462767 A1 | 9/2004 |

(Continued)

OTHER PUBLICATIONS

Extended European Search Report, dated Nov. 26, 2020, regarding EP Application No. 20184059.2, 8 pages.

(Continued)

*Primary Examiner* — James J Lee
*Assistant Examiner* — Shon G Foley
(74) *Attorney, Agent, or Firm* — Yee & Associates, P.C.

(57) ABSTRACT

A method, apparatus, and system for controlling an aircraft. A target state for the aircraft is identified. A current mission state is determined for the aircraft. A sequence of actions is selected from a pool of potential actions to reach the target state from the current mission state for the aircraft. The sequence of actions is selected based on the current mission state. The actions in the sequence of actions for which preconditions for the actions that have been met are performed. The actions are performed in an order defined by the sequence of actions.

37 Claims, 40 Drawing Sheets

(56) References Cited

U.S. PATENT DOCUMENTS

| | | | |
|---|---|---|---|
| 2006/0190868 A1* | 8/2006 | Baumgartner | G06F 30/3323 |
| | | | 716/103 |
| 2014/0100768 A1* | 4/2014 | Kessens | G05D 1/0891 |
| | | | 701/124 |
| 2016/0285840 A1* | 9/2016 | Smith | G06F 21/335 |
| 2021/0123741 A1* | 4/2021 | Candido | G01C 21/20 |

FOREIGN PATENT DOCUMENTS

| | | |
|---|---|---|
| EP | 3415416 A1 | 12/2018 |
| EP | 3477617 A1 | 5/2019 |

OTHER PUBLICATIONS

Orkin, "Goal-Oriented Action Planning (GOAP)," accessed Aug. 24, 2019, 2 pages. http://alumni.media.mit.edu/%7Ejorkin/goap.html.

Orkin, "Symbolic Representation of Game World State: Toward Real-Time Planning in Games," published 2004, 5 pages. http://alumni.media.mit.edu/~jorkin/WS404OrkinJ.pdf.

Orkin, "Agent Architecture Considerations for Real-Time Planning in Games," copyright 2004, American Association for Artificial Intelligence, 6 pages. https://pdfs.semanticscholar.org/90bf/3068553b2ab9c5d4fbf137ead274b519450f.pdf.

Orkin, "Three States and a Plan: The A.I. of F.E.A.R.," Game Developers Conference, 2006, 18 pages. https://alumni.media.mit.edu/~jorkin/gdc2006_orkin_jeff_fear.pdf.

Kloeckner, "Behavior Trees for UAV Mission Management," Sep. 2013, 12 pages. https://pdfs.semanticscholar.org/4e42/8721ae4a5861d5491 e56d0da9599f8cc613e.pdf.

European Patent Office Examination Report, dated Nov. 23, 2021, regarding EP Application No. 20184059.2, 5 pages.

European Patent Office Examination Report, dated Mar. 29, 2022, regarding EP Application No. 20184059.2, 7 pages.

European Examination Report, dated Oct. 13, 2022, regarding EP Application No. 20184059.2, 8 pages.

* cited by examiner

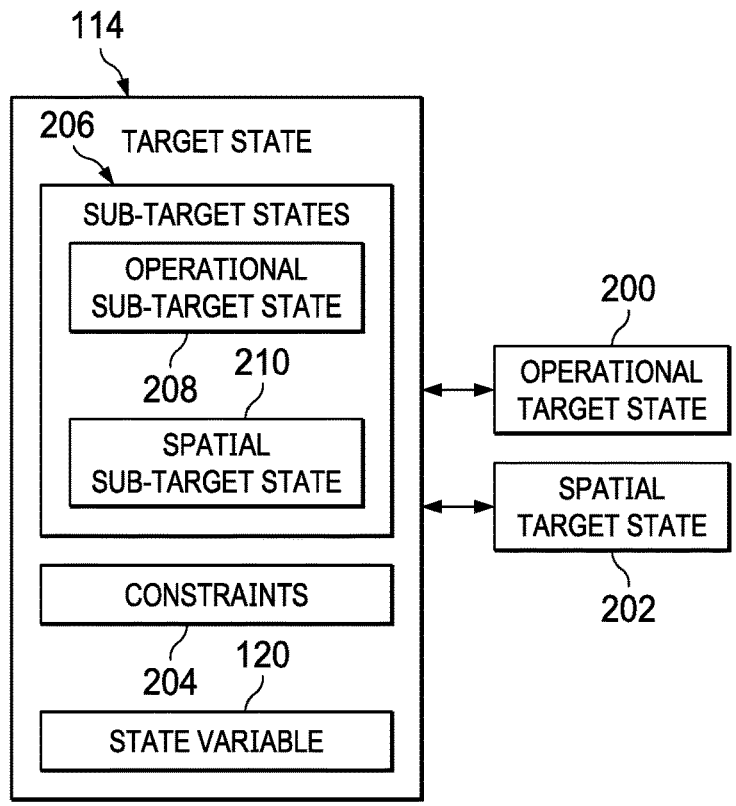
FIG. 2
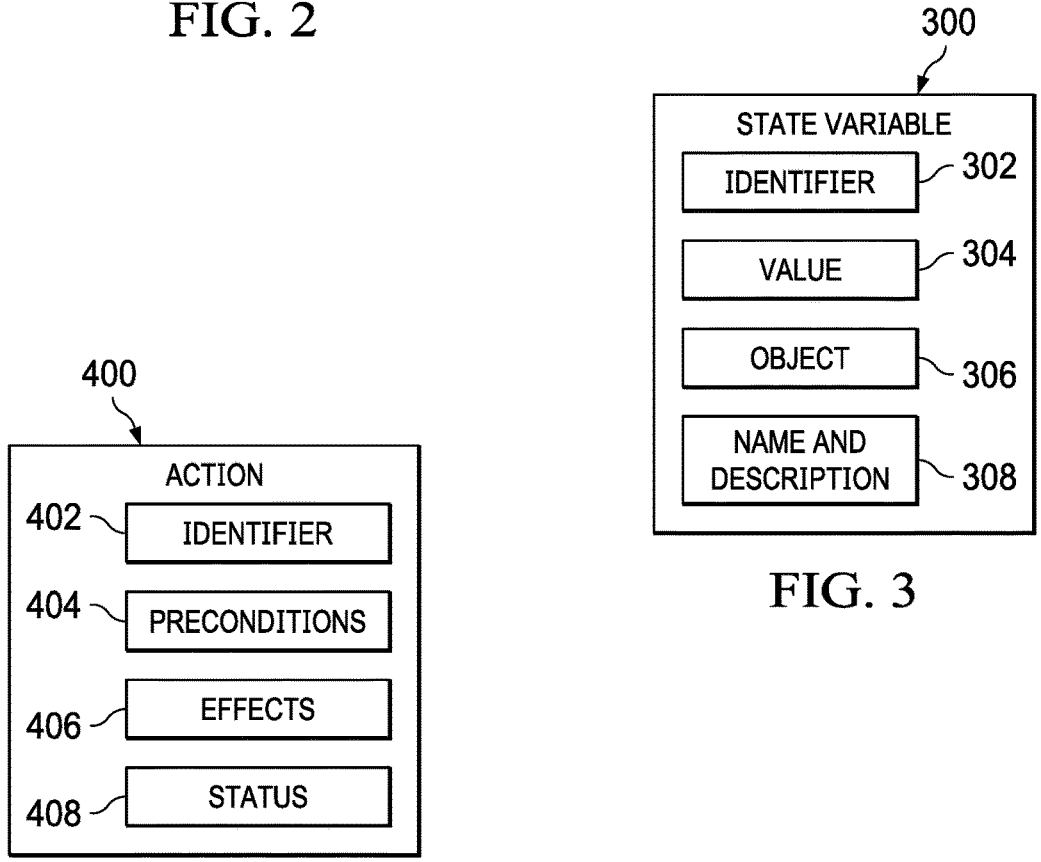
FIG. 4
FIG. 3

AUTOMATED AIRCRAFT SYSTEM WITH GOAL DRIVEN ACTION PLANNING

BACKGROUND INFORMATION

1. Field

The present disclosure relates generally to an aircraft and, in particular, to operating the aircraft using automated aircraft systems.

2. Background

In operating an aircraft, many functions can be performed automatically using automated aircraft systems. For example, one automated aircraft system is an autopilot. The autopilot can control the trajectory of an aircraft without constant control by a human operator such as a pilot or a co-pilot. The autopilot allows for the pilot and other flight crew members in the aircraft to focus on broader aspects of operating the aircraft such as monitoring the trajectory, weather, and other aircraft systems in the aircraft.

Current automated aircraft systems are rule-based systems. These automated aircraft systems use decision trees to determine what steps to perform to meet target values specified by the human operator. These types of automated aircraft systems are easy to evaluate because their behavior can be predicted when traversing the decision tree. These automated aircraft systems, however, are limited in performing actions only for situations that are previously accounted for in the decision tree.

SUMMARY

An embodiment of the present disclosure provides a method for controlling an aircraft. A target state for the aircraft is identified. A current mission state is determined for the aircraft. A sequence of actions is selected from a pool of potential actions to reach the target state from the current mission state for the aircraft. The sequence of actions is selected based on the current mission state. Actions in the sequence of actions for which preconditions for the actions that have been met are performed. The actions are performed in an order defined by the sequence of actions.

Another embodiment of the present disclosure provides an aircraft control system comprising a computer system and an action manager in the computer system. The action manager is configured to identify a target state for the aircraft and determine a current mission state for the aircraft from state variables received from aircraft systems in the aircraft. The action manager is configured to select a sequence of actions from a pool of potential actions to reach the target state from the current mission state for the aircraft using a set of path planning algorithms in which the sequence of actions is selected based on the current mission state. The action manager is configured to perform actions in the sequence of actions for which preconditions for the actions that have been met. The actions are performed in an order defined by the sequence of actions.

Still another embodiment of the present disclosure provides an aircraft control system comprising a computer system. The computer system is configured to identify a target state for the aircraft and determine a current mission state for the aircraft. The computer system is configured to select a sequence of actions from a pool of potential actions to reach the target state from the current mission state for the aircraft in which the sequence of actions is selected based on the current mission state. The computer system is configured to perform actions in the sequence of actions for which preconditions for the actions that have been met. The actions are performed in an order defined by the sequence of actions.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a block diagram of a target state in accordance with an illustrative embodiment;

FIG. 3 is an illustration of a block diagram of a state variable in accordance with an illustrative embodiment;

FIG. 4 is an illustration of a block diagram of an action in accordance with an illustrative embodiment;

DETAILED DESCRIPTION

Figure 1:
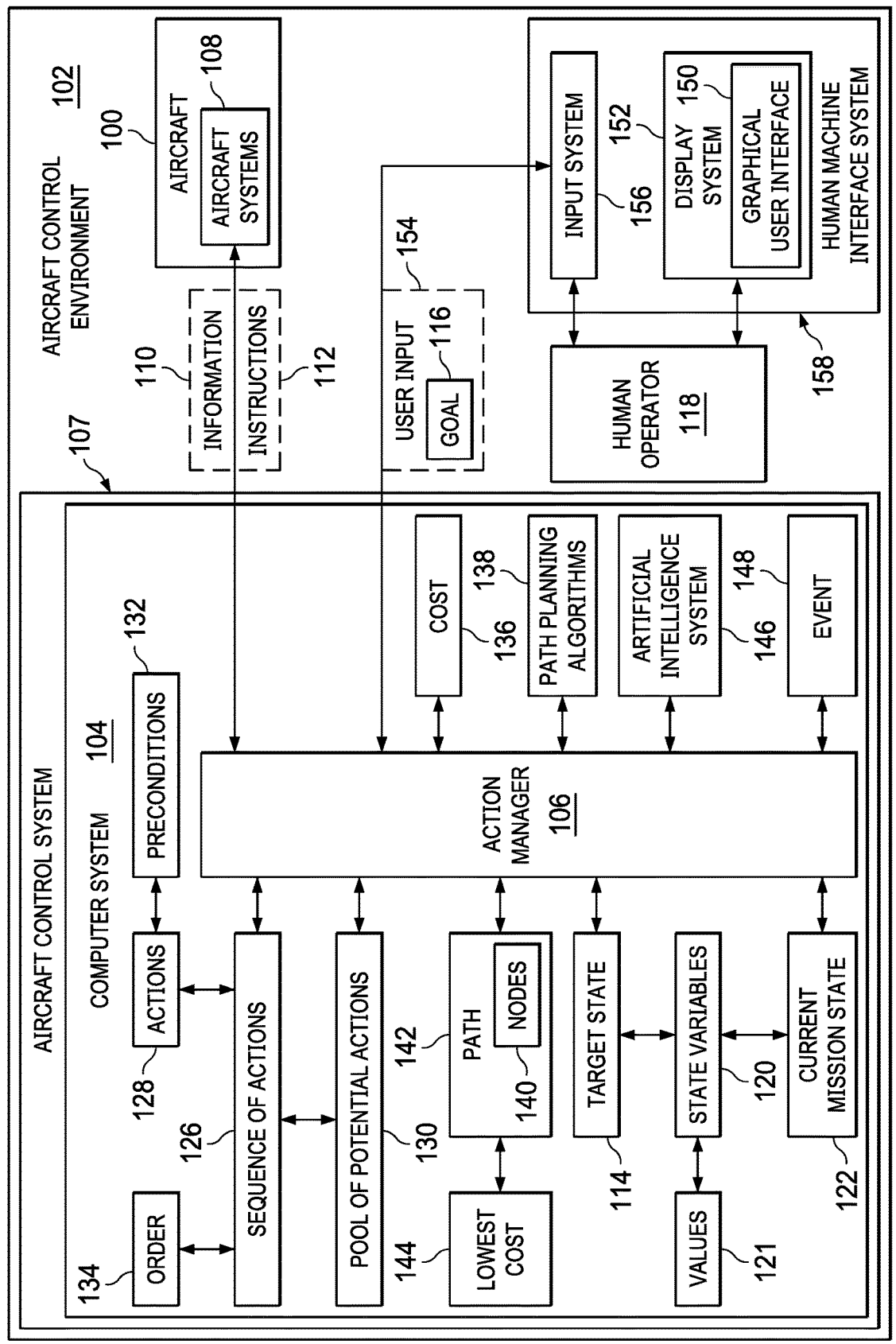
FIG. 1 is an illustration of a block diagram of an aircraft operation environment in accordance with an illustrative embodiment.

The illustrative embodiments recognize and take into account one or more different considerations. For example, the illustrative embodiments recognize and take into account that during a flight of an aircraft, aircraft control systems using decision trees may be unable to provide actions for particular conditions not contemplated by the decision trees. The illustrative embodiments also recognize and take into account that control of functions being handled by an automated aircraft system are returned to pilot when the decision tree does not provide solutions such as actions for a particular condition. Those embodiments recognize and take into account that this situation can result in increased workloads for the flight crew.

The illustrative embodiments recognize and take into account that increased workloads can also be present in operating the automated aircraft systems that employ the decision trees. The illustrative embodiments recognize and take into account that the pilot is limited in how a goal is to be reached in the automated aircraft system. For example, the illustrative embodiments recognize and take into account that it may need to break down a goal of flying to a particular location into a tactical action such as a heading change or a series of waypoints. The illustrative embodiments recognize and take into account that these steps performed by pilots increase the workload as compared to providing a goal such as a destination. Thus, the illustrative embodiments recognize and take into account that current automated aircraft systems are less capable of supporting the pilot with actionable information and require deposits to monitor different parameters during the flight of the aircraft.

Thus, the illustrative embodiments provide a method, apparatus, and system to control the operation of an aircraft. In the illustrative examples, goals can be translated into target states for the aircraft. Actions and an order of the actions can be selected and performed dynamically as a sequence of actions to reach the target state as the current mission state of the aircraft changes. For example, the actions can be reselected based on a change in the current situation of an aircraft during operation of the aircraft without requiring the human operator to assume or take control of the aircraft. With the reselection of actions, different actions or the same actions can be selected. Further, even when the same actions are selected as part of the reselection process, those actions can be in a different order to form a different sequence of actions.

In one illustrative example, a method controls an aircraft. A computer system receives a target state for the aircraft. The computer system determines a current mission state for the aircraft. An artificial intelligence system in the computer system can determine actions to reach the target state based on the current mission state for the aircraft. The actions can be performed for which preconditions for the actions that have been met can be performed.

Further, determining the actions to reach the target state can occur dynamically in which a determination of the actions is performed in a manner that takes into account changes in the current mission state of the aircraft. For example, the actions for performance can be identified to reach the target state based on a current mission state. When the current mission state changes, the determination of the actions can be made again based on the new current mission state. As a result, the actions identified to reach the target state for the aircraft can change during the flight of the aircraft as the current mission state changes.

With reference now to figures and, in particular, with reference to FIG. 1, an illustration of a block diagram of an aircraft operation environment is depicted in accordance with an illustrative embodiment. Aircraft 100 in aircraft control environment 102 can be operated using computer system 104 in aircraft 100. Aircraft 100 can take a number of different forms. For example, aircraft 100 can be selected as one of an airplane, a commercial aircraft, a rotorcraft, an unmanned aircraft, an unmanned aerial vehicle, a fighter jet, a spaceplane, and other suitable aircraft.

In this illustrative example, action manager 106 in computer system 104 forms aircraft control system 107, which is configured to control the operation of aircraft 100. The operation of aircraft 100 can be controlled using aircraft systems 108. In controlling the operation of aircraft 100, action manager 106 receives information 110 from aircraft systems 108 and sends instructions 112 to aircraft systems 108. These instructions can be commands, data, or other information that can be used to control how aircraft systems 108 operate.

As depicted, aircraft systems 108 can include at least one of a flight management system, a flight navigation system, an environmental control system, an engine, a flight control surface system, a communications system, a satellite communications system, a very high frequency (VHF) communication system, microwave-band communication system, a radar system, an autopilot, a fuel system, a weather radar, an electronic centralized aircraft monitoring (ECAM) system, a quick access data recorder (QAR), an onboard network server (ONS), an electronic flight instrument system (EFIS), or other suitable aircraft systems.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, action manager 106 can be implemented in software, hardware, firmware, or a combination thereof. When software is used, the operations performed by action manager 106 can be implemented in program code configured to run on hardware, such as a processor unit. When firmware is used, the operations performed by action manager 106 can be implemented in program code and data and stored in persistent memory to run on a processor unit. When hardware is employed, the hardware can include circuits that operate to perform the operations in action manager 106.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 104 is a physical hardware system and includes one or more data processing systems. When more than one data processing system is present in computer system 104, those data processing systems are in communication with each other using a communications medium. The communications medium can be a network. The data processing systems can be selected from at least one of a computer, a server computer, an electronic flight bag, a tablet computer, or some other suitable data processing system.

In this illustrative example, computer system 104 can be located in at least one of the aircraft or a location remote to the aircraft. For example, all of computer system 104 can be located in aircraft 100, all of computer system 104 can be located in one or more remote locations to aircraft 100 such as a ground location, or computer system 104 can be distributed between aircraft 100 and one or more remote locations outside of aircraft 100.

In this illustrative example, action manager 106 is configured to identify target state 114 for aircraft 100. Target state 114 is a data structure and can be identified based on goal 116 received from human operator 118. In the illustrative example, goal 116 can be translated into a set of state variables 120 by action manager 106 for target state 114.

As used herein, "a set of," when used with reference to items, means one or more items. For example, a set of state variables 120 is one or more of state variables 120.

The set of state variables 120 has a set of values 121 that is present when target state 114 is reached. These values describe target state 114. In this illustrative example, the set of state variables 120 contains a portion of state variables 120 with values 121 needed to describe target state 114 and does not necessarily include all possible state variables for aircraft 100.

For example, goal 116 can be "complete preflight phase and start passenger boarding". With this example, the set of state variables 120 for target state 114 are flightPhase_preflightCompleted=true and passengersBoarding=true.

In another example, goal 116 can be "be enroute over the Atlantic before 7:45 UTC". Action manager 106 can identify the set of state variables 120 for target state 114 as flightPhase_climbOutCompleted=true (true means that currently the flight phase enroute is active) and inAtlanticAirspace=true [Time constraint: BEFORE 7:45 UTC time].

Human operator 118 can be located in aircraft 100 or can be in a remote location to aircraft 100. The remote location can be a ground location, another aircraft, or some other suitable location. In this illustrative example, human operator 118 can be a pilot in the aircraft, the pilot in a remote location, a co-pilot, an airline operator, an air traffic controller a military operator, an airline employee, or some other suitable person that can set goal 116 for aircraft 100.

In other illustrative examples, target state 114 can be received from an airline, a traffic control system, or some other suitable source. In this case, target state 114 can be preselected prior to the flight or other operation of aircraft 100. In this case, target state 114 can be transmitted to computer system 104 and aircraft 100 in a message, a set of data packets, or in some other format used to facilitate communications between computers over a communications link.

As depicted, action manager 106 is also configured to determine current mission state 122 for aircraft 100. Current mission state 122 can be determined by action manager 106 from state variables 120 using information 110 received from aircraft systems 108. In this illustrative example, information 110 can include state variables 124 or information 110 can be used to derive or determine state variables 120. As depicted, state variables 120 are all of the state variables for aircraft 100 rather than a subset of state variables 120, as described with respect to target state 114.

In the illustrative example, aircraft systems 108 are designed, modified, reconfigured, or other otherwise changed to track and send state variables 120 to action manager 106. In this illustrative example, each aircraft system is responsible for knowing what state variables are required from other aircraft systems as well as knowing what state variables are provided to other systems, such as other aircraft systems or action manager 106. State variables 120 sent to action manager 106 may be at least one of automatically sent by aircraft systems 108 to action manager 106, sent in response to a request from action manager 106, or sent in some other manner.

In other illustrative examples, a set of aircraft systems 108 sends information 110 that can be used to derive state variables 120 in place of or in addition to sending state variables 120 in information 110. In the illustrative example, sending a state variable means that the state variable with the value for the state variable is sent.

As depicted, action manager 106 is configured to select sequence of actions 126 from pool of potential actions 130 based on current mission state 122 to reach target state 114 based on current mission state 122 for aircraft 100. In other words, action manager 106 can select actions 128 from pool of potential actions 130 and place actions 128 into order 134 for performance to form sequence of actions 126.

In one illustrative example, actions 128 and sequence of actions 126 can be based on cost 136 for performing actions 128. Cost 136 can be selected from at least one of the number of effects by an action, a monetary cost for performing an action, time, a maintenance cost incurred, an amount of fuel to be consumed, a personnel cost connected to time, passenger comfort, a company policy, a manufacturing recommendation, or other suitable factors. In one example, an airline policy can prefer performing A over B. As a result, performing B has greater cost than performing A when taking into account the airline policy in this example. In the illustrative examples, cost 136 can be dynamic and not static in which cost 136 can change when a system state or the environment changes.

Action manager 106 is configured to perform actions 128 for which preconditions 132 for actions 128 have been met. As depicted, preconditions 132 comprise at least one of a current location of the aircraft, a performance of a selected action, a configuration of the aircraft, a position of a control surface, a weather condition, an instruction from an air traffic controller, or some other type of condition. In one illustrative example, a configuration of an aircraft can be, for example, without limitation, the landing gear being in a raised position, the landing gear being in a lowered position, the doors being closed, the flaps being extended, the air brakes in a position to increase drag, or some other configuration of components in the aircraft.

In this illustrative example, actions 128 are performed in order 134 defined by sequence of actions 126. In other words, actions 128 are performed in the order identified in sequence of actions 128 when preconditions 132 are met for actions 128. In some illustrative examples, one or more of actions 128 may not have a precondition. Further, sequence of actions 128 may define performing some of actions 128 in parallel or substantially at the same time.

As depicted, selecting sequence of actions 126, by action manager 106, from pool of potential actions 130 to reach target state 114 based on current mission state 122 for aircraft 100 can be performed using a set of path planning algorithms 138. In this illustrative example, the set of path planning algorithms 138 is selected from at least one an A* search algorithm, a Dijkstra's algorithm, a D*, an incremental search algorithm, a Backtracking algorithm, a Fringe search, an Any-angle path planning algorithm, an iterative deepening A* search algorithm, a Bellman-Ford search algorithm, a Floyd-Warshall algorithm, a Hill climbing algorithm, a Bidirectional search algorithm, a Johnson's algorithm, or some other suitable algorithm that can be used for path planning to reach target state 114 from current mission state 122.

As depicted, the set of path planning algorithms 138 can select sequence of actions 126 in a manner that reduces cost 136. For example, action manager 106 may use the set of path planning algorithms 138 to select the sequence of actions 126 from pool of potential actions 130 to reach target state 114 from current mission state 122 for aircraft 100 in which sequence of actions 126 is selected based on current mission state 122. The selection can comprise identifying nodes 140 in path 142 from current mission state 122 to target state 114 based on nodes 140 having lowest cost 144. In this example, lowest cost 144 comprises a set of factors selected from at least one of a number of effects of an action, a monetary cost, an amount of time, a maintenance cost incurred, an amount of fuel to be consumed, a personnel cost connected to time, or passenger comfort.

The sequence of actions 126 can be selected by action manager 106 from pool of potential actions 130 based on nodes 140 identified in path 142.

In the illustrative example, nodes 140 illustrate potential mission states that can occur through the performance of actions 128. In other words, current mission state 122 can change to another mission state which in turn can change to get another mission state depending on the performance of particular actions selected from pool of potential actions 130. Each potential mission state represented by a node in nodes 140 is unique within nodes 140 and can be identified as having a different value for one or more state variables 124 that are present in current mission state 122.

In the illustrative example, at least one of determining target state 114 from goal 116 or selecting sequence of actions 126 can be performed by action manager 106 using artificial intelligence system 146. Artificial intelligence system 146 is a system that has intelligent behavior and can be based on the function of a human brain. Artificial intelligence system 146 comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

A cognitive system is a computing system that mimics the function of the human brain. The cognitive system can be, for example, IBM Watson available from International Business Machines Corporation.

For example, actions 128 and order 134 of action 128 for sequence of actions 126 can be selected from pool of potential actions 130 by artificial intelligence system 146. Artificial intelligence system 146 can implement or use the set of path planning algorithms 138. When the set of path planning algorithms 138 is implemented in artificial intelligence system 146, this implementation can be performed using machine learning techniques.

In the illustrative example, aircraft control system 107 is a dynamic system in which selection of actions 126 can be performed dynamically during the operation of aircraft 100. In other words, once sequence of actions 126 is selected for aircraft 100 to reach target state 114, sequence of actions 126 can change during performance of actions 128 defined in sequence of actions 126.

In one illustrative example, action manager 106 can select sequence of actions 126 from pool of potential actions 130 to reach target state 114 from current mission state 122 for aircraft 100 using the set of path planning algorithms 138 in which sequence of actions 128 is selected based on current mission state 122 that is present when event 148 occurs. Event 148 can take a number of different forms. For example, event 148 can be one of a periodic event, a non-periodic event, a current mission state change, reaching a sub target state, an expiration of a timer, a state variable, and a performance of an action.

In one illustrative example, one or more technical solutions are present that overcome a technical problem with providing a desired level of automated control and operating an aircraft. As a result, one or more technical solutions can provide a technical effect of providing an ability to dynamically identify actions in an order in which the action should be performed to reach a target statement from the current mission state.

In the illustrate example, one or more technical solutions are provided with a technical effect of enabling control of an aircraft that results in a reduced workload on the flight crew. In the illustrative example, one or more technical solutions enable selecting actions and the order of actions to form a sequence of actions that can be performed to reach a target state. In the illustrative example, this sequence of actions can be determined from the current mission state and can be re-determined any number of times based on the occurrence of events during the operation of the aircraft.

Thus, an aircraft can be controlled by a computer system that provides instructions to aircraft systems in the aircraft and a pilot or other human operator entering specific values for automated systems are unnecessary to be entered by the human operator. For example, the human operator does not need to enter information such as speed, heading, altitude, or other information. Instead, the human operator can enter a goal such as "be docked at gate B13 at Seattle Tacoma at 10:35 UTC".

This goal can be translated into a target state and analysis of the current mission state of the aircraft can be used to automatically identify actions in order for performing the actions to reach the target state.

Computer system 104 can be configured to perform at least one of the steps, operations, or actions described in the different illustrative examples using software, hardware, firmware, or a combination thereof. As a result, computer system 104 operates as a special purpose computer system in which action manager 106 in computer system 104 enables controlling aircraft systems 108 to automate operation of aircraft 100 in a manner that reduces the workload on human operators in aircraft 100. In particular, action manager 106 transforms computer system 104 into a special purpose computer system as compared to currently available general computer systems that do not have action manager 106.

In the illustrative example, the use of action manager 106 in computer system 104 integrates processes into a practical application for controlling the operation of aircraft 100 that increases the performance of computer system 104 in controlling actions 128 performed by aircraft 100. In other words, action manager 106 in computer system 104 is directed to a practical application of processes integrated into action manager 106 in computer system 104 that controls an aircraft with a desired level of automation. In this illustrative example, the practical application can be in action manager 106 in computer system 104 in which action manager 106 identifies a target state for the aircraft; determines a current mission state for the aircraft; selects a sequence of actions from a pool of potential actions to reach the target state from the current mission state for the aircraft in which the sequence of actions is selected based on the current mission state; and performs the actions in the sequence of actions for which preconditions for the actions that have been met in which the actions are performed in an order defined by the sequence of actions.

These processes result in improvement in the operation of aircraft 100. For example, computer system 104 operates with increased efficiency as compared to current systems. Further, computer system 104 automatically controls the operation of aircraft 100 in a manner that reduces the workload on a pilot, a co-pilot, or other human operator of aircraft 100. In this manner, action manager 106 in computer system 104 provides a practical application of controlling an aircraft such that the functioning of computer system 104 is improved by at least one of identifying or initiating performance of sequence of actions 126 to reach target state 114 for aircraft 100. The selection and performance of sequence of actions 126 is performed in a manner that reduces how often control of aircraft 100 is returned to a flight crew member, such as a pilot, a co-pilot, or other human operator.

In this illustrative example, human operator 118 can interact with action manager 106 through graphical user interface 150 displayed on display system 152 for computer system 104. As depicted, display system 152 is a physical hardware system and includes one or more display devices on which graphical user interface 150 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information. Display system 152 is configured to display graphical user interface 150. Human operator 118 is a person that can interact with graphical user interface 150 through user input 154 generated by input system 156 for computer system 104. Input system 156 is a physical hardware system and can be selected from at least one of a mouse, a keyboard, a trackball, a touchscreen, a stylus, a motion sensing input device, a cyber glove, microphone, or some other suitable type of input device.

In this illustrative example, display system 152 and input system 156 form human machine interface system 158. Human machine interface system 158 is at least one of located in the aircraft, a remote location in communication with the aircraft, an air traffic control system, an airline system, or in some other suitable location.

For example, user input 154 can define goal 116. Information including at least one of current mission state 122, target state 114, sequence of actions 126, a location of aircraft 100, altitude, or other suitable information can be displayed in graphical user interface 150 for viewing by human operator 118. Target state 114 for aircraft 100 can be identified based on user input 154, such as goal 116, received from human machine interface system 158.

Thus, the illustrative example provides a method, apparatus, and system in which automated aircraft systems derive a set of tactical flight actions from strategic goals set by a human operator. The actions to reach these goals can be determined using goal oriented action planning (GOAP).

With reference next to FIG. 2, an illustration of a block diagram of a target state is depicted in accordance with an illustrative embodiment. In the illustrative examples, the same reference numeral may be used in more than one figure. This reuse of a reference numeral in different figures represents the same element in the different figures.

As depicted, target state 114 can take a number of different forms. For example, target state 114 can be selected from one of operational target state 200 and spatial target state 202.

In this illustrative example, operational target state 200 represents a state of an operation that is desired for aircraft 100 in FIG. 1. For example, operational target state 200 can be "the passengers deboarded". Spatial target state 202 represents a location that is desired. For example, "fly to KESA" can be spatial target state 202.

Further, target state 114 can also include a set of constraints 204. In this illustrative example, the set of constraints 204 is one or more restrictions. The set of constraints 204 can include at least one of a spatial constraint, an operational constraint, or a temporal constraint. The spatial constraint can be a constraint on a location. For example, a spatial constraint can be "cruise under 25,000 feet" or "avoid area along flight path".

In the illustrative example, an operational constraint can be a constraint on what operation can be performed. An operational constraint can be, for example, the position light for the aircraft must be turned on at all times.

A temporal constraint is a constraint on time. In this illustrative example, the temporal constraint can be a constraint on when an operation is performed or when the aircraft is in a particular location. A temporal constraint can include "at", after", and "window". For example, "at" can be "depart at 9:00 UTC"; "after" can be "depart after 9:00 UTC"; and "window" can be "depart between 8:50 UTC and 9:10 UTC".

In the illustrative example, target state 114 can be formed from multiple goals such that target state 114 includes sub target states 206. The sub target states can be selected from at least one of operational sub target state 208 or spatial sub target state 210.

For example, operational sub target state 208 represents a state of an operation that is desired for aircraft 100. Spatial sub target state 210 represents a location that is desired.

For example, a goal of "be docked at gate at KSEA at 9:00 local time, with passengers already deboarded" can be divided into sub goals that are represented by sub target states. For example, this goal can be translated into target state 114 with state variables 124 as follows: dockedAtGate=true; arrivedAtDestination=true [Object: KSEA—will be needed to check if the aircraft arrived at the right location]; destinationAirportSet=true [Object: KSEA]; and passengersBoarded=false [Time constraint: AT 9:00 local time].

In this illustrative example, a mix of operational and spatial goals are represented in sub target states 206 in target state 114. For example, dockedAtGate=true is a state variable representing an operational sub target state. As depicted, destinationAirportSet=true [Object: KSEA] represents spatial sub target state. Additionally, passengersBoarded=false [Time constraint: AT 9:00 local time] represents a temporal constraint. In this example, the temporal constraint can be sent by a pilot to ensure that passengers reach a destination location a desired time.

As another example, artificial intelligence system 146 can also perform a translation of goal 116 into target state 114 and can identify sub target states 206. In this illustrative example, artificial intelligence system 146 can include natural language processing capabilities that take goal 116 in a natural language and translate goals 116 into target state 114, which also may include sub target states 206. This capability can be implemented in artificial intelligence system 146 through machine learning techniques. These machines learning techniques can include, for example, known machine learning techniques, such as a supervised learning algorithm, an unsupervised learning algorithm, and a reinforcement learning algorithm.

For example, training data can be provided to artificial intelligence system 146 in which the training data includes goals in natural language for a correspondent correct output of target states and sub target states. With this type of training data, supervised learning can be used to train artificial intelligence system 146. Other techniques can also be used depending on the implementation.

Turning now to FIG. 3, an illustration of a block diagram of a state variable is depicted in accordance with an illustrative embodiment. In this illustrative example, state variable 300 is an example of a state variable in state variables 120.

In this illustrative example, state variable 300 comprises a number of different parameters. As depicted, state variable 300 comprises identifier 302, value 304, object 306, and name and description 308.

In the illustrative example, identifier 302 indicates a property of the data maintained in state variable 300. Identifier 302 is a unique identifier in this example.

For example, when state variable 300 is a variable indicating whether a destination airport has been reached, identifier 302 can be "destinationAirportReached". Identifier 302 is a unique identifier in this example.

Value 304, in this depicted example, is a Boolean value. In other illustrative examples, value 304 can be a numerical value rather than merely a Boolean value.

In this example, object 306 is an optional parameter in state variable 300. Object 306 can be used to convey or reference additional information about state variable 300. For example, with "destinationAirportReached", object 306 can indicate that an identifier of a destination airport should be set.

In this illustrative example, name and description 308 are parameters used to present status of state variable 300 to human operator 118 in FIG. 1. In other words, these parameters can be used to display information to human operator 118 in a manner that is understood by human operator 118. For example, name and description 308 for "destinationAirportReached" can be "Has destination airport been reached". These parameters can be used to display information to human operator 118.

With reference to FIG. 4, an illustration of a block diagram of an action is depicted in accordance with an illustrative embodiment. As depicted, action 400 is an example of an action in actions 128 in FIG. 1 and a potential action in pool of potential actions 130 in FIG. 1.

In this example, action 400 includes a number of different parameters. In this illustrative example, action 400 includes identifier 402, a set of preconditions 404, a set of effects 406, and status 408.

As depicted, identifier 402 is a unique identifier for action 400 in this example. Identifier 402 can be used to identify action 400 when action 400 is present in actions 128 in sequence of actions 126 or is present in pool of potential actions 130.

In this illustrative example, the set of preconditions 404 is one or more conditions that are to be met before action 400 can be performed. For example, action 400 is not performed until all conditions in the set of preconditions 404 for action 400 are met. In another example, preconditions 404 can include a precondition that specifies which ones of preconditions 404 need to be met to perform action 400. As a result, a subset of preconditions 404 can be met to perform action 400 with this example.

The set of preconditions 404 can take a number of different forms. For example, the set of preconditions 404 can be selected from at least one of when at least 1-n conditions are met, if either one of two conditions are met, or other types of conditions. With the use of object 306 in state variable 300 in FIG. 3, the set of preconditions 404 can be bound by greater, less, equal, or other logic statements regarding selected system parameters. These system parameters can be, for example, groundspeed, altitude, attitude, temperature, or other suitable parameters.

In the illustrative example, the set of effects 406 is one or more changes that can occur to state variables 120 in FIG. 1 when action 400 is performed. An effect that changes a state variable is a change in a value for the state variable in response to a performance of action 400. The performance of action 400 changes current mission state 122, thus resulting in a new mission state becoming current mission state 122.

In this example, actions such as action 400 can be identified and placed into pool of potential actions 130 for aircraft 100. The actions available in pool of potential actions 130 can vary between different types and models of aircraft.

The identification of actions for use in pool of potential actions 130 can be determined in a number of different ways. For example, functional decompositions of the system and supervised learning of actions through machine learning approaches can be performed using artificial intelligence system 146. In other illustrative examples, these actions can be manually defined by human operators.

The illustration of aircraft control environment 102 and the different components depicted in aircraft control environment 102 in FIGS. 1-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the illustrative example can be applied to other types of vehicles in addition to aircraft 100. For example, the planning of the sequence of actions to reach a target state can be used to operate a vehicle such as a spacecraft, a surface ship, a submarine, an autonomous underwater vehicle (AUV), a remotely operated underwater vehicles (ROV), a car, a semi-trailer truck, a tank, a train, or other suitable types of vehicles.

In the illustrative example, artificial intelligence system 146 is shown as being separate from action manager 106 in FIG. 1. In another illustrative example, artificial intelligence system 146 can be implemented as part of action manager 106.

Further, when computer system 104 includes components in locations remote from aircraft 100, action manager 106 can be located in the remote location and generate sequence of actions 126 that are sent to aircraft systems 108 in aircraft 100. With this example, information 110 and instructions 112 can be exchanged over a communications medium such as a set of wireless communications links. The set of wireless communications links can include at least one of a satellite communications link, a microwave communications link, a Worldwide Interoperability for Microwave Access (WiMAX) communications link, an ultra high frequency (UHF) communications link, a very high frequency (VFH) communications link, a WiFi communications link, or some other suitable type of wireless communications link.

In other examples, a wired communications link can be used when aircraft 100 is on the ground. This communications link can be used when preplanning to reach a target state from a particular target state or to transmit an initial sequence of actions determined for the target state. With this implementation, re-planning or re-determining the sequence of actions can be performed while aircraft 100 is in flight using action manager 106. In this example, a new sequence of actions can be dynamically selected as needed during flight of aircraft with action manager 106 located in computer system 104 in aircraft 100 and or with action manager 106 in computer system 104 in remote location and in communication with aircraft 100 through a wireless communications link.

With this type of implementation, human operator 118 can be located in a number of different locations. For example, human operator 118 can be located in aircraft 100, on a ground location, in a ground vehicle, on another aircraft, or some other suitable location.

Figure 5:
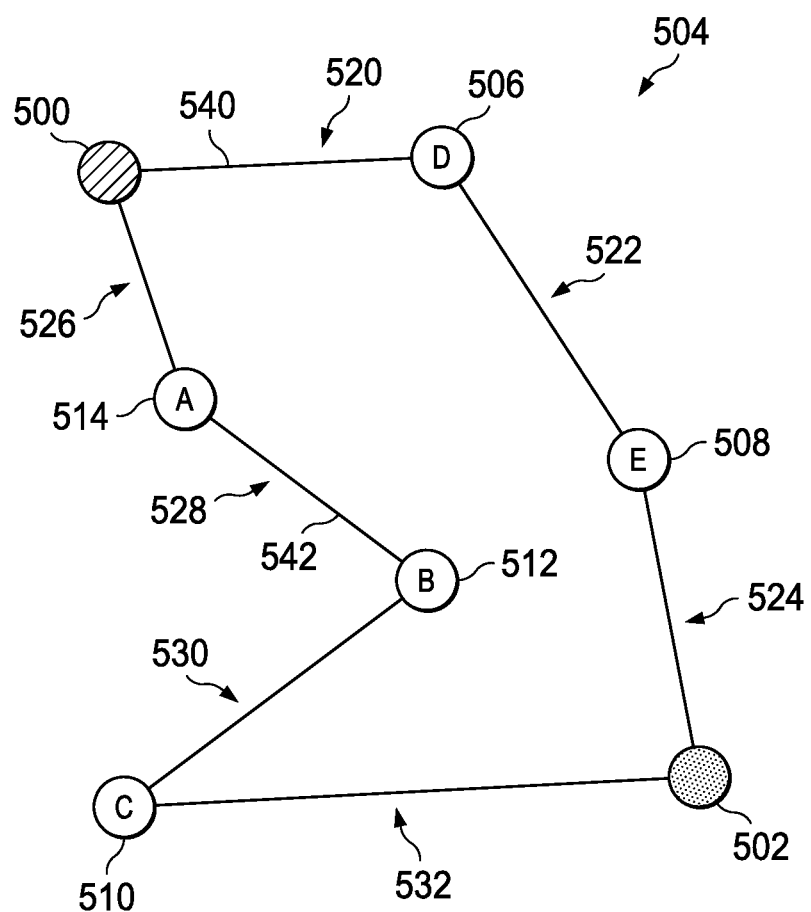
FIG. 5 is an illustration of nodes in paths from a current mission state to a target state in accordance with an illustrative embodiment.

With reference to FIG. 5, an illustration of nodes in paths from a current mission state to a target state is depicted in accordance with an illustrative embodiment. In this depicted example, current mission state 500 and target state 502 are depicted as nodes. Additional nodes 504 are shown between these two states.

As depicted, additional nodes 504 include node 506, node 508, node 510, node 512, and node 514. As depicted, additional nodes 504 are examples of nodes 140 in FIG. 1. Each of additional nodes 504 represents a potential mission state that can occur from current mission state 500, depending on the actions performed.

These nodes are connected to each other through lines that represent actions. These lines representing the actions are referred to as edges. As depicted, action 520, action 522, action 524, action 526, action 528, action 530, and action 532 are shown in this illustration.

In the illustrative example, the performance of action 520 can result in current mission state 500 changing to the mission state in node 510. As another example, the performance of action 526 can result in current mission state 500 changing to the mission state in node 514.

In this illustrative example, action 520, action 522, an action 524 are a sequence of actions in path 540 from current mission state 500 to target state 502. Action 526, action 528, action 530, and action 532 are the sequence of actions that form path 542 from current mission state 500 to target state 502.

In this depicted example, the sequence of actions in path 540 and the sequence of actions in path 542 are not actually performed, but are potential actions that can be performed for aircraft 100 to reach target state 502 from current mission state 500. By creating the sequences of actions, an analysis can be made as to which path is the optimal path to reach target state 502 from current mission state 500. The particular path chosen can be based on the cost incurred in following each of the two paths. For example, the cost can be, for example, without limitation, on the number of effects each action along a path has on the mission state in the prior node to create the new node with the new current mission state. The sequence of actions in the path selected can then be performed to control the operation of aircraft 100.

As used herein, a "number of," when used with reference to items means one or more items. For example, a number of effects is one or more effects.

For example, node 510 has all of the same variable states as node 512. The difference between these two nodes and other nodes is the value or value state for state variables for the nodes. The performance of action 522 can change one or more values in the state variables of node 510 to create node 512.

Figure 6:
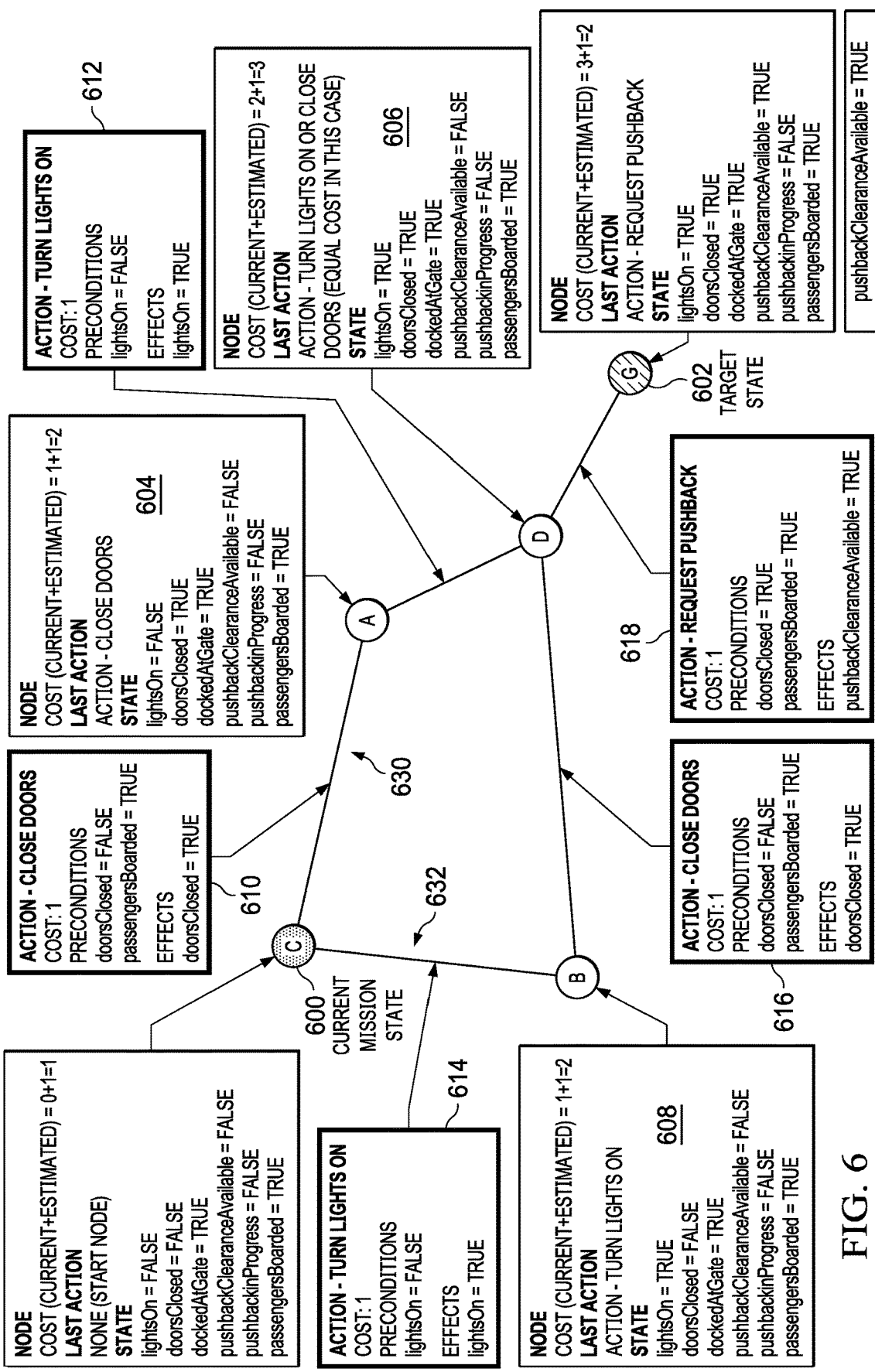
FIG. 6 is an illustration of nodes in paths from a current mission state to a target state in which a pushback from a gate occurs for an aircraft in accordance with an illustrative embodiment.

With reference next to FIG. 6, an illustration of nodes in paths from a current mission state to a target state in which a pushback from a gate occurs for an aircraft is depicted in accordance with an illustrative embodiment. Current mission state 600 is an example of current mission state 122 in FIG. 1. Target state 602 is an example of target state 114 in Figure. In the social example, target state 602 represents a goal of a pushback of the aircraft from a gate.

In this illustrative example, node 604, node 606, and node 608 represent potential mission states. These nodes are located between current mission state 600 and target state 602, which are represented as nodes in this illustration.

As depicted, actions are depicted in which the actions can be performed to reach target state 602 in which a pushback of the aircraft occurs. These are potential actions that include close doors 610, turn lights on 612, turn lights on 614, close doors 616, and request pushback 618.

As depicted, the sequence of actions: close doors 610, turn on lights 612, and request pushback 618 form path 630. The sequence of actions: turn on lights 614, close doors 616, and request pushback 618 form path 630.

In the illustrative example, the difference in state variables, between current mission state 600 and node 604, is that the state variable "doorsClosed" changes from false to true in node 604 in response to performing close doors 610. The performance of turn lights on 612 results in node 606 in which the difference in the state variables between node 606 and node 604 is that lightsOn changes from false to true. The performance of request pushback 618 causes a change in the state variables between node 606 and target state 602 in which "pushbackClearanceAvailable" changes from false to true.

Similarly, the performance of turn lights on 614 causes the state variable "lightsOn" to become true from false in the shift from current mission state 600 to node 608. The performance of close doors 616 causes the state variable "doorsClosed" to change from false in node 608 to true in node 606.

As depicted, each of these actions has a cost of one. As a result, the order in which the doors are closed and the lights are turned on both have the same cost with respect to reaching target state 602 from current mission state 600. As a result, either path 630 or path 632 can be selected to reach target state 602. The selection of the path can be made randomly because both paths have the same cost.

Illustrations of paths between a current mission state to a target state in FIG. 5 and FIG. 6 are presented for purposes of illustrating how actions can cause a change in the current mission state to a number of different potential mission states. The nodes present in the paths in reaching a target mission state from a current mission state can include many more nodes and actions than depicted. Further, the state variables illustrated for the nodes are only state variables relevant to the particular example. The nodes can actually contain all of the state variables that are available in an aircraft. In this illustrative example, only a few nodes and actions are depicted to avoid obscuring the concepts presented in the illustrative examples.

Figure 7:
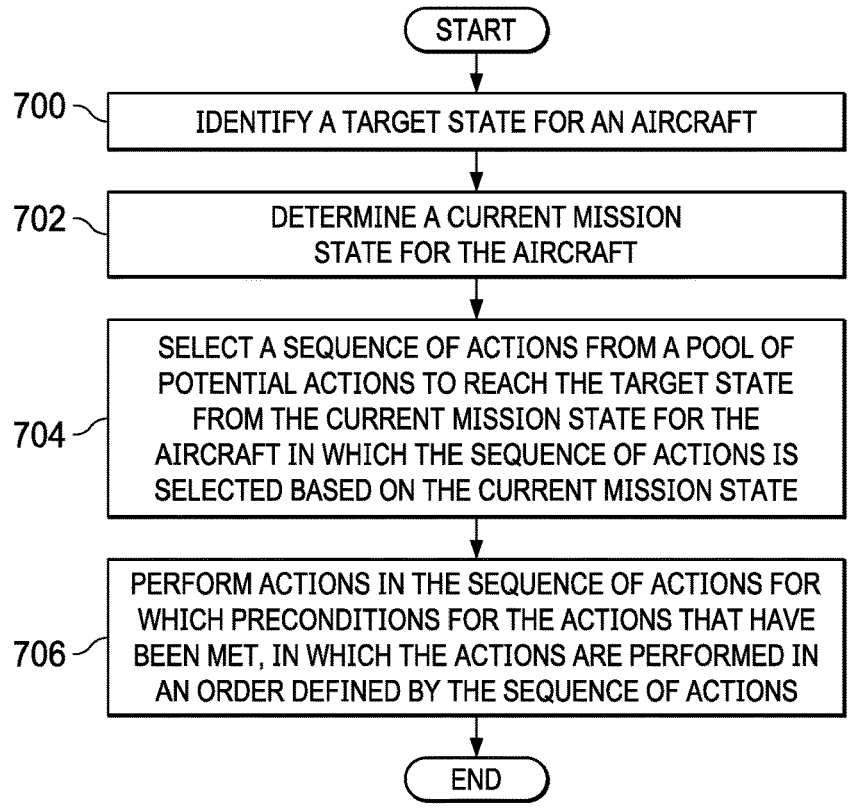
FIG. 7 is an illustration of a flowchart of a process for controlling an aircraft in accordance with an illustrative embodiment.

Turning next to FIG. 7, an illustration of a flowchart of a process for controlling an aircraft is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in action manager 106 in computer system 104 in FIG. 1.

The process begins by identifying a target state for an aircraft (operation 700). The process determines a current mission state for the aircraft (operation 702).

The process then selects a sequence of actions from a pool of potential actions to reach the target state from the current mission state for the aircraft in which the sequence of actions is selected based on the current mission state (operation 704). The selection of the sequence of actions in operation 704 can be performed using at least one of a set of path-planning algorithms or an artificial intelligence system.

The process performs actions in the sequence of actions for which preconditions for the actions that have been met, in which the actions are performed in an order defined by the sequence of actions (operation 706). The process terminates thereafter.

The one or more operations in the process in FIG. 7 can be performed again after the sequence of actions has been selected. For example, selecting the sequence of actions can be repeated in response to an event. In the illustrative example, the event can be selected from one of a periodic event, a non-periodic event, a current mission state change, reaching a sub target state, an expiration of a timer, a state variable change, a change in a configuration of the aircraft, a performance of an action, or some other event. As a result, the sequence of actions can change even as actions in the sequence of actions are being performed in response to the event. In this manner, in the illustrative examples, a change in the configuration of an aircraft can include at least one of a change in a control surface, a change in a gross weight of the aircraft, a change in a number of engines operating in the aircraft, or other changes in the aircraft structure or operation that may or may not be planned.

Figure 8:
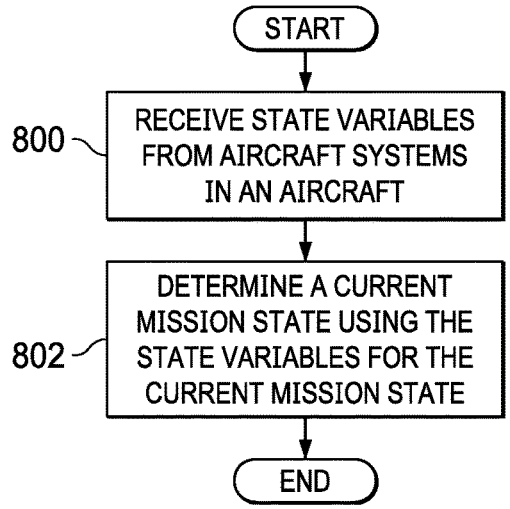
FIG. 8 is an illustration of a flowchart of a process for determining a current mission state in accordance with an illustrative embodiment.

With reference to FIG. 8, an illustration of a flowchart of a process for determining a current mission state is depicted in accordance with an illustrative embodiment. The process in FIG. 8 is an example of an implementation for operation 702 in FIG. 7.

The process begins by receiving state variables from aircraft systems in an aircraft (operation 800). The process determines a current mission state using state variables for the current mission state (operation 802). The process terminates thereafter.

Figure 9:
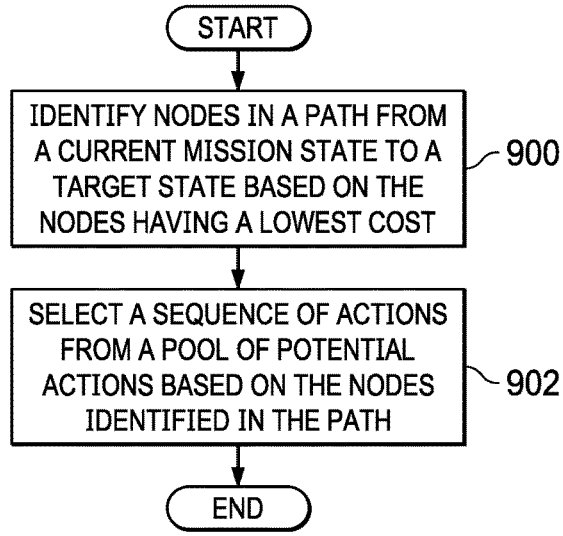
FIG. 9 is an illustration of a flowchart of a process for selecting a sequence of actions from a pool of potential actions to reach a target state from a current mission state for an aircraft in accordance with an illustrative embodiment.

Turning to FIG. 9, an illustration of a flowchart of a process for selecting a sequence of actions from a pool of potential actions to reach a target state from a current mission state for an aircraft is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in action manager 106 in computer system 104 in FIG. 1. This process in FIG. 9 is an example of an implementation of operation 704 in FIG. 7.

The process begins by identifying nodes in a path from a current mission state to a target state based on the nodes having a lowest cost (operation 900). The process selects a sequence of actions from a pool of potential actions based on the nodes identified in the path (operation 902). The process terminates thereafter.

Figure 10:
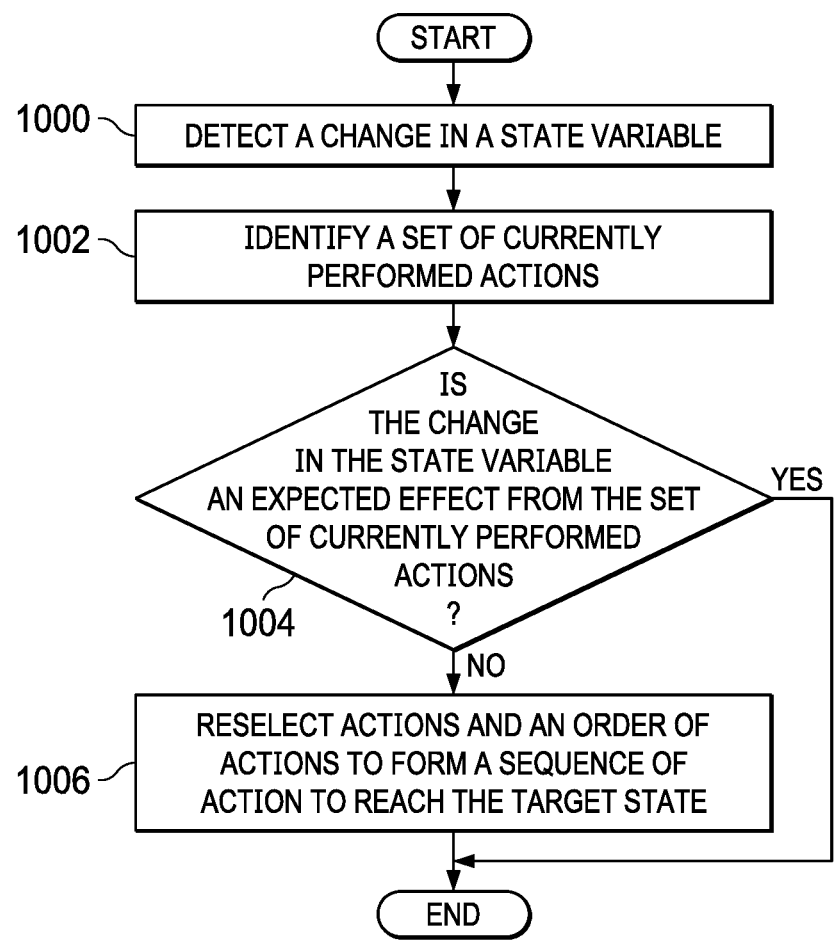
FIG. 10 is an illustration of a flowchart for reselecting actions to reach a target state for an aircraft from a current mission state when a state variable changes in accordance with an illustrative embodiment.

With reference now to FIG. 10, an illustration of a flowchart for reselecting actions to reach a target state for an aircraft from a current mission state when a state variable changes is depicted in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in action manager 106 in computer system 104 in FIG. 1. This process be performed each time a state variable changes for the current mission state.

The process begins by detecting a change in a state variable (operation 1000). The change in the state variable can occur in response to a performance of an action, an environmental change, a change in an aircraft system not caused by the performance of the action, or some other event. For example, a weather change, fuel efficiency changing in an engine, an airport change, a flight plan change, or some other event can cause a state variable change.

The process identifies a set of currently performed actions (operation 1002). In this illustrative example, the set of currently performed actions defines a set of actions that was started and has not been finished. Some actions may finish more quickly than other actions. For example, an action of "turn on the landing lights" will finish before an action of "taxi out" when started at the same time.

The system which starts the execution of an action marks the action as "in progress". In this example, all actions that are marked as "in progress" are still being performed. Once all effects of the currently performed action are observed in the current mission state, the action is marked as "completed". Alternatively, an action may be reported as "completed" by a component such as an aircraft system or a sub system in the aircraft system.

A determination is made as to whether the change in the state variable is an expected effect from the set of currently performed actions (operation 1004). If the change in the state variable is an expected effect from the set of currently performed actions, the process terminates. In this case, the change in the state variable caused by the performance of the set of currently performed actions is normal and expected, and re-planning of actions to reach a target state is unnecessary.

With reference again to operation 1004, if the change in the state variable is not the expected effect from the set of currently performed actions, the process reselects actions and an order of actions to form a sequence of actions to reach the target state (operation 1006). The process terminates thereafter. In operation 1006, a possibility exists that the reselection of the actions can result in the same sequence of actions being selected that was present before the state variable changed.

Figure 11A:
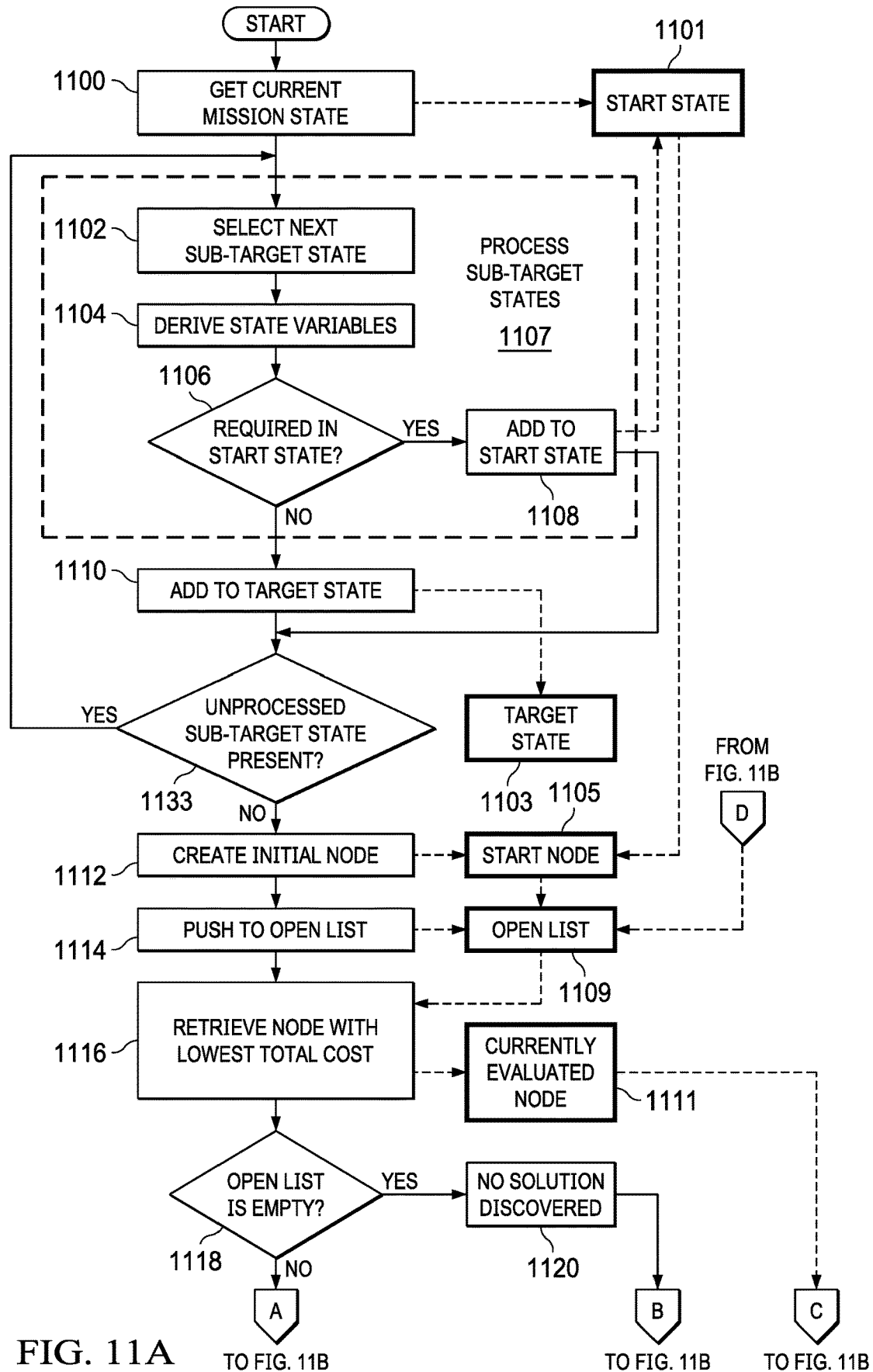
FIGS. 11A and 11B are illustrations of a flowchart of a process for selecting a sequence of actions to reach a target state for an aircraft in accordance with an illustrative embodiment.
Figure 11B:
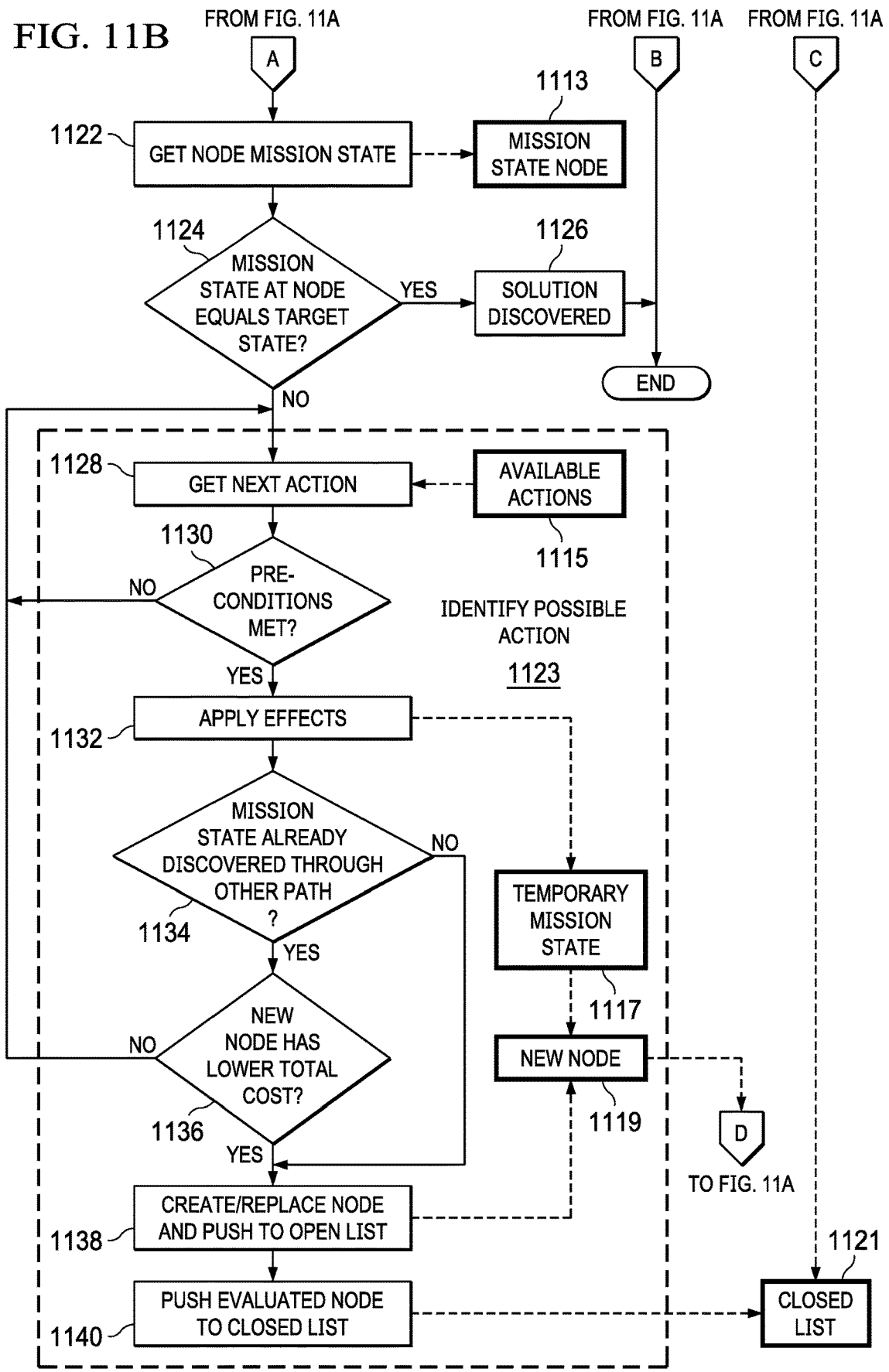

Turning to FIGS. 11A and 11B, illustrations of a flowchart of a process selecting a sequence of actions to reach target state for an aircraft is depicted in accordance with an illustrative embodiment. The process in FIGS. 11A and 11B can be implemented in hardware, software, or both. When implemented in software, the process can take the form of program code that is run by one of more processor units located in one or more hardware devices in one or more computer systems. For example, the process can be implemented in action manager 106 in computer system 104 in FIG. 1. This process can be used in operation 704 in FIG. 7.

In this illustrative example, the process illustrated in the flowchart in FIG. 7 is an implementation of a path-planning algorithm, A* search algorithm, for path-planning to identify actions that can be performed by aircraft systems to provide autonomous operation of an aircraft.

The operations in this flowchart can select actions to cause changes between multiple nodes representing hypothetical mission states of the aircraft. In this illustrative example, the hypothetical mission states in these nodes can occur when performing actions to reach a target state from a current mission state. In other words, the process in this flowchart can be used to select a sequence of actions from a pool of potential actions that can be performed to reach the target state from the current mission state. The selection of the sequence of actions includes selecting the actions and selecting the order in which the actions are to be performed.

The process begins by obtaining a current mission state (operation 1100). In this example, the current mission state can be obtained from aircraft systems in the aircraft. The information forming the current mission state can be maintained during an entire flight of the aircraft. For example, the different aircraft systems can send the information that is stored in a central location for the current mission state.

As depicted, the current mission state obtained in operation 1100 is start state 1101. In other words, start state 1101 is a "snapshot" or copy of the current mission state when the process in FIGS. 11A and 11B begins. In the illustrative example, start state 1101 comprises a Boolean representation of all state variables that are in the current mission state obtained in operation 1100. As depicted, the current location state contains all of the state variables for the particular aircraft in which the actions are to be performed.

The operations in section 1107 of this flowchart are used to process sub target states that may be present in operating the aircraft to reach the target state for the aircraft. In the illustrative example, sub target states that are reached by performing actions as part of the process for reaching the target state for the aircraft can be present. These operations can be performed for every sub target state for the aircraft that is present to reach the target state. In this illustrative example, the target state can be sent by a human operator in the form of a goal and can include sub goals, which are translated into target states and sub target states.

The process then selects a next sub target state (operation 1102). In operation 1102, the next sub target state is a target state that has not yet been processed. The target state can be comprised of sub target states. For example, the target state can be "docked at a gate at the Seattle airport at 9:00 am PDT". Sub target states for this target state can be, for example, "be in Seattle" and "be docked at a gate". In this illustrative example, "be in Seattle" is a spatial sub target state, and "be docked at a gate" is an operational sub target state. As depicted, "docked at 9:00 am PDT" is a constraint for the sub target state "be docked at a gate".

As depicted, the particular sub target state selected can be based on the border, in which the sub target states may need to be reached to reach the target state. For example, one sub target state may have a precondition that is based on reaching another sub target state.

The process derives state variables for the selected sub target state (operation 1104). In this example, the state variables for the target state can be destinationAirportReached=true; destinationAirportSet=true with an assigned object of AirportIdentifier=KSEA; and dockedAtGate=true.

A determination is made as to whether any of the state variables are required in start state 1101 (operation 1106). In the illustrative example, some sub target states may need a modification of start state 1101. This modification may be needed because the information contained in the sub target state may be used for planning to select the actions to reach target state 1103.

For example, destinationAirportReached is a state variable and is just part of target state 1103. The goal is to reach a mission state where this condition is true, meaning that the aircraft has reached the destination. In this case, the destination is defined by destinationAirportSet being true and the associated object containing the airport identifier for the destination that is to be reached by the flight of the aircraft.

As depicted, destinationAirportSet is a state variable that contains information that is necessary for planning. This state variable cannot be part of the target state, as this situation would translate to the goal for target state 1103 being "want to have destination airport set" which would not work well in target state 1103. As a result, this state variable is placed into start state 1101, which is a snapshot of the current mission state. Further, dockedAtGate will be part of target state 1103 for the same reason as destinationAirportReached.

If any of the variables are required in start state 1101, the process adds the required state variables to start state 1101 (operation 1108). If the state variables are not required, the process adds state variables for the sub target state to target state 1103 (operation 1110). As depicted, target state 1103 contains a subset of all possible state variables. This subset includes the state variables that are needed to have a selected value to reach the sub target state.

A determination is made as to whether an unprocessed sub target state is present (operation 1133). If an additional unprocessed target state is present, the process returns to operation 1102 to select the unprocessed sub target state for processing.

With reference again to operation 1133, if all of the sub target states have been processed, an initial node is created (operation 1112). In this illustrative example, the initial node is saved as start node 1105 and contains the current mission state. As depicted, start node 1105 and other nodes processed using this flowchart include information such as the mission state at the node, the action performed to reach the node, the cost to reach the node, the cost estimated to reach the target state from the node, the total cost, and pointer to the preceding node. The total cost is a sum of the cost to reach the node and the cost estimated to reach the target state from the node.

The process pushes the initial node to open list 1109 (operation 1114). Open list 1109 is a list of nodes that have not been expanded.

In the illustrative example, a node to be expanded is selected from open list 1109 based on the total cost value. In this example, the node with the lowest total cost is selected as the node to be expanded.

In this depicted example, the total cost value is the combined cost of moving to this node from the start node and the estimated cost to get from this node to the target node. In this example, an estimated cost can be implemented with a heuristics function. With the use of the heuristics function, the criteria to meet does not overestimate the cost. Avoiding overestimation is needed for the cost to be admissible for use.

For example, the cost can be calculated via the number of effects to be caused by an action. If the action has seven effects that are caused to a mission state, the cost to perform this action is seven. The estimated cost in this example is assumed to be the number of state variables yet to be changed minus one. This results in the estimated cost being lower than the actual cost.

The cost of reaching the current node is the sum of all action costs incurred when starting from the initial node until reaching the current node that is being evaluated. In other words, the cost is the total number of effects caused so far.

In the illustrative examples, expansion is used to discover all nodes that can be reached from the currently expanded node. In this example, the mission state is stored at the currently viewed node and is used to check which actions can be performed. The actions can be analyzed to determine what nodes can be reached by the performance of particular actions. This analysis can be performed using temporary mission states such that new neighboring nodes are discovered.

This process is analogous to standing at an intersection and being either able to go into four directions or maybe only two because of a one-way street constellation, meaning that a node that is behind a one-way street cannot be reached.

The process retrieves the node having the lowest total cost from open list 1109 (operation 1116). In this example, the node with the lowest total cost retrieved from open list 1109 is currently evaluated node 1111. Currently evaluated node 1111 is a node that is currently being processed in this example.

A determination is made as to whether open list 1109 is empty (operation 1118). If open list 1109 is empty, the process indicates that no solution has been discovered (operation 1120), with the process terminating thereafter.

With reference again to operation 1116, if open list 1109 is not empty, the process obtains the node mission state (operation 1122). In this illustrative example, the node mission state in operation 1122 is from mission state node 1113 for currently evaluated node 1111 that was retrieved from open list 1109.

In this illustrative example, mission state node 1113 is the mission state that is present by applying all of the actions performed for nodes in a path from currently evaluated node 1111 back to start node 1105.

A determination is made as to whether mission state node 1113 is the same as target state 1103 (operation 1124). If mission state node 1113 is the same as target state 1103, the process indicates that a solution has been discovered (operation 1126), with the process terminates thereafter.

In operation 1126, the actions in the analysis can be actually performed during the operation of the aircraft to reach the target state from the current mission state. This process can be repeated any number of times during the flight of the aircraft to determine whether different actions should be performed to reach the target state from the current mission state.

The operations performed in section 1123 are performed to identify possible actions that can be performed to move the mission state towards the target state. The operations performed in section 1123 are performed to check the available action against the mission state for currently evaluated node 1111. When the action can be performed, the effects of those actions are applied and a temporary node is generated. After the evaluation is performed for currently evaluated node 1111 using all available actions, this node is put into closed list 1121.

With reference again to operation 1124, if mission state node 1113 is not target state 1103, the process obtains the next action (operation 1128). In operation 1128, the next action is obtained from available actions 1115.

A determination is made as to whether a precondition has been met for the next action obtained (operation 1130). If the precondition has not been met, the process then returns to operation 1128 to obtain a next action for processing.

With reference again to operation 1130, if the precondition for the action is met, the process applies the effects of the action (operation 1132). In this illustrative example, temporary mission state 1117 is created by applying the effects of the action to the state stored at the node.

For example, the state at Node B is lightsOn=false and doorsClosed=true. The effects of the action "LightsOn" is lightsOn=true. In this example, temporary mission state 1117 with applied effects is the state of Node B+effects of action lightsOn=true and action doorsClosed=true.

In this example of temporary mission state 1117, other variables are not changed. Temporary mission state 1117 can be kept until the process knows that either (a) the state is unknown and a new node is generated or (b) the state was already discovered, which would trigger a comparison of cost values.

A determination is made as to whether the mission state has already been discovered through another path (operation 1134). If the mission state has been discovered through another path, a determination is made as to whether new node 1119 has a lower total cost (operation 1136). New node 1119 is created using temporary mission state 1117. If new node 1119 does not have a lower total cost, the process returns to operation 1128. In this example, all possible actions are being performed with each of them yielding a new mission state which has not been discovered before in the current mission state. A new node can be generated for each action that can be performed, resulting in nodes such as nodes 608 and node 604 in FIG. 6.

Otherwise, when new node 1119 has a lower total cost, the process creates and replaces the current node with new node 1119 and pushes new node 1119 to open list 1109 when new node 1119 has a lower cost (operation 1138). New node 1119 can be created from temporary mission state 1117. If the mission state of a prior node had a higher total cost, the process removes the prior node and creates a new node with the same state, but storing another path and another cost value there. This new node is created from temporary mission state 1117.

This other path for the new node is identified from a reference to a previous node or action. With reference again to operation 1134, if the mission state is not already discovered through another path, the process also proceeds to operation 1138.

The process then pushes the evaluated node to closed list 1121 (operation 1140). As depicted, closed list 1121 is a list of all nodes that have been expanded. These nodes are ones that have a lowest cost in this example. All available actions that met preconditions for the nodes on this list led to discovery neighboring nodes.

In this illustrative example, neighboring nodes are all nodes that are reachable from the just expanded node. In other words, a neighboring node is discovered for every action that can be performed on the state that is stored at the currently expanded node. Performing the action and applying effects of the action to the expansion node's state will yield new states and thus potentially new nodes. The process then returns to operation 1116 to obtain a node with a lowest cost from open list 1109.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, cost in FIGS. 11A and 11B can be calculated using other factors other than the number of effects. For example, an airline may want to actually have the cost reflect the actual cost incurred in a monetary sense. The cost can be inferred indirectly using a cost function that incorporates factors selected from at least one of time, a maintenance cost incurred, an amount of fuel to be consumed, a personnel cost connected to time, passenger comfort, a company policy, a manufacturing recommendation, or other suitable factors. In one example, a company policy can refer to performing A over B. As a result, performing B has greater cost than performing A in this example. In the illustrative examples, cost can be dynamic and not static in which the cost can change on when a system state or the environment changes.

Figure 12:
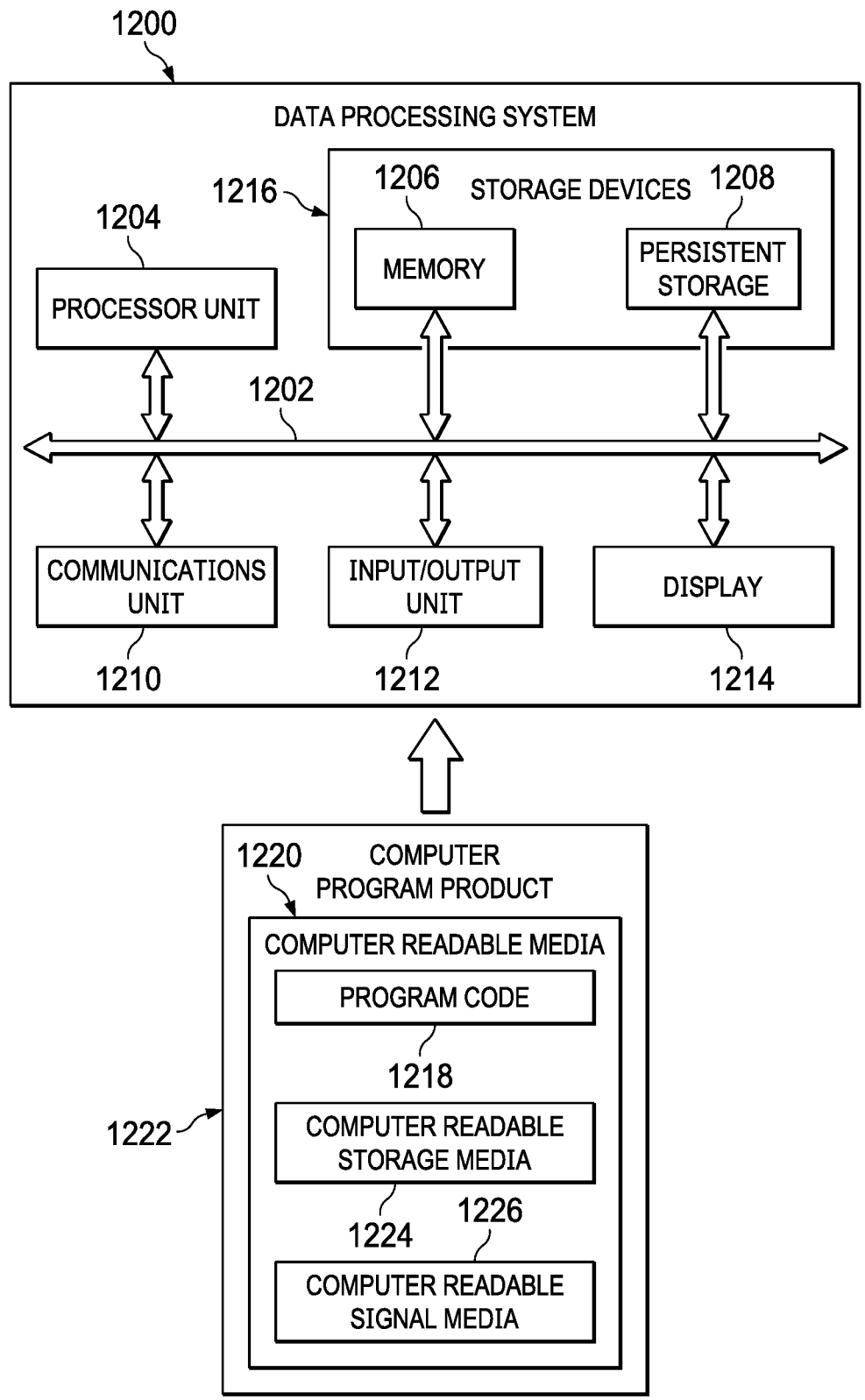
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 can be used to implement one or more data processing systems in computer system 104 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 can take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 can provide a connection for user input through at least one of a keyboard, a mouse, or some other suitable input device. Further, input/output unit 1212 can send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which can be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

In this illustrative example, program code 1218 can include instructions for action manager 106 in FIG. 1. Program code 1218 can also include instructions for artificial intelligence system 146 and a set of path planning algorithms 138 in FIG. 1.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, can be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

Figure 13:
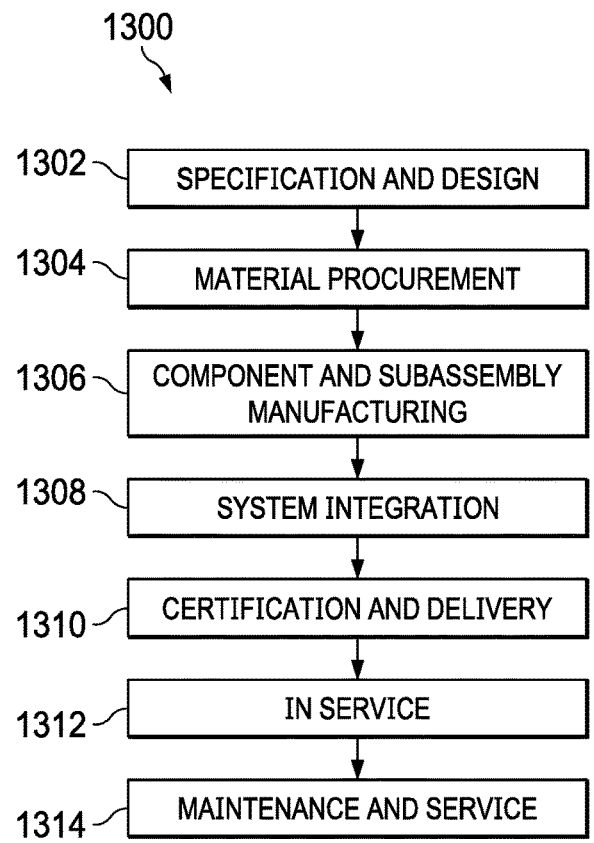
FIG. 13 is an illustration of an aircraft manufacturing and service method in accordance with an illustrative embodiment.
Figure 14:
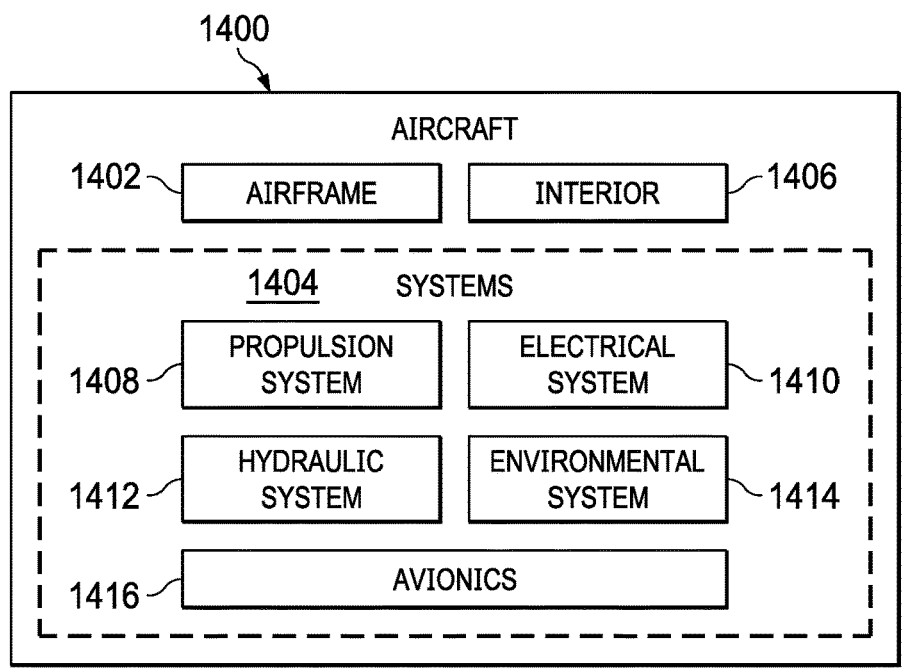
FIG. 14 is an illustration of a block diagram of an aircraft in which an illustrative embodiment may be implemented.
Figure 15:
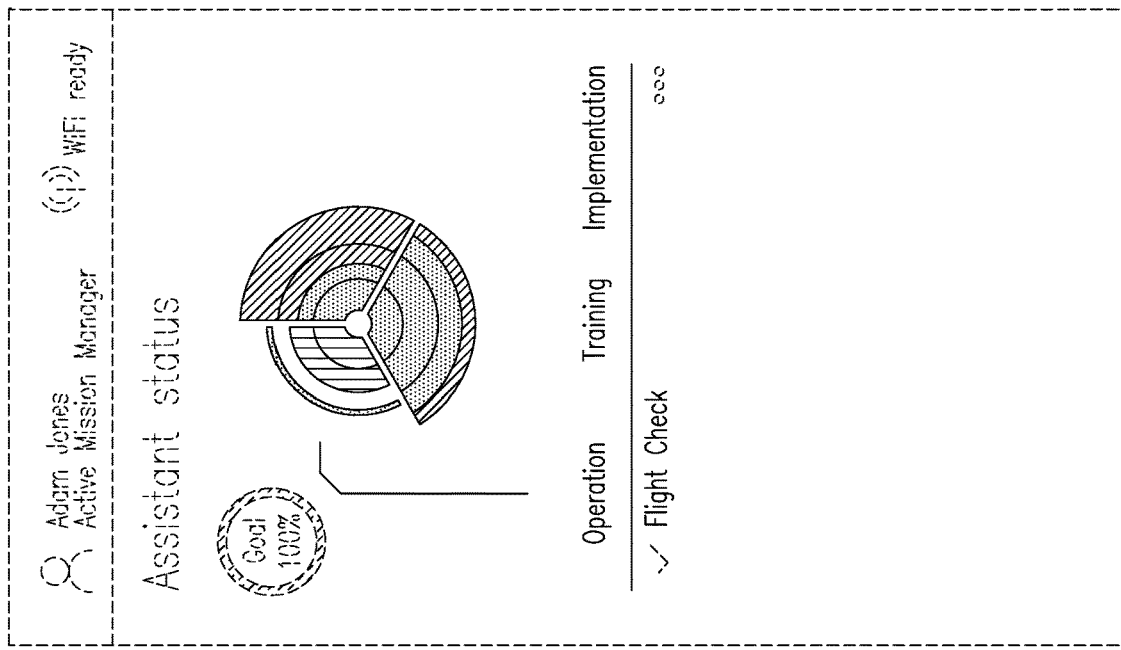
FIG. 15 is a view of a display screen with a graphical user interface.
Figure 16:
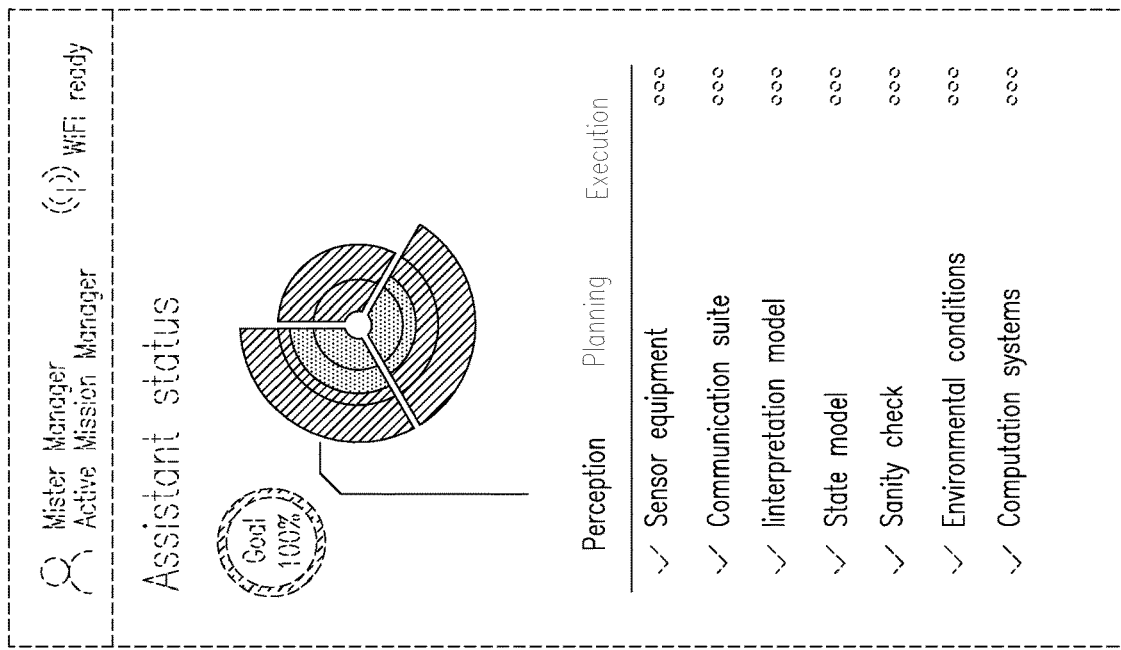
FIG. 16 is a second embodiment of the display screen with a graphical user interface.
Figure 17:
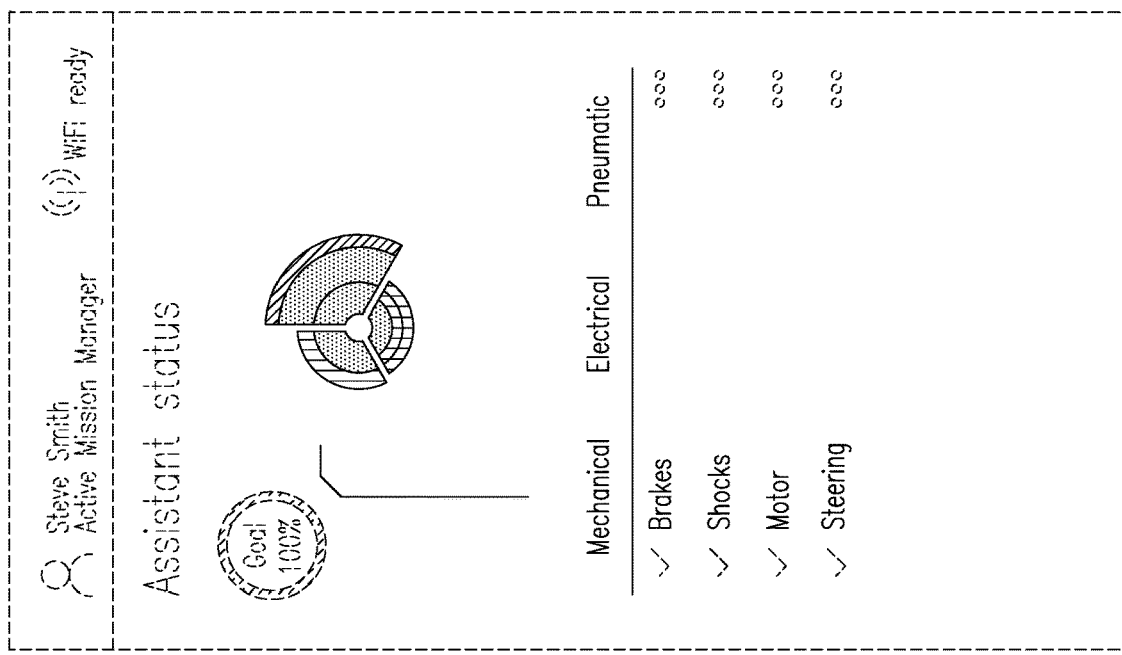
FIG. 17 is a third embodiment of the display screen with a graphical user interface.
Figure 18:
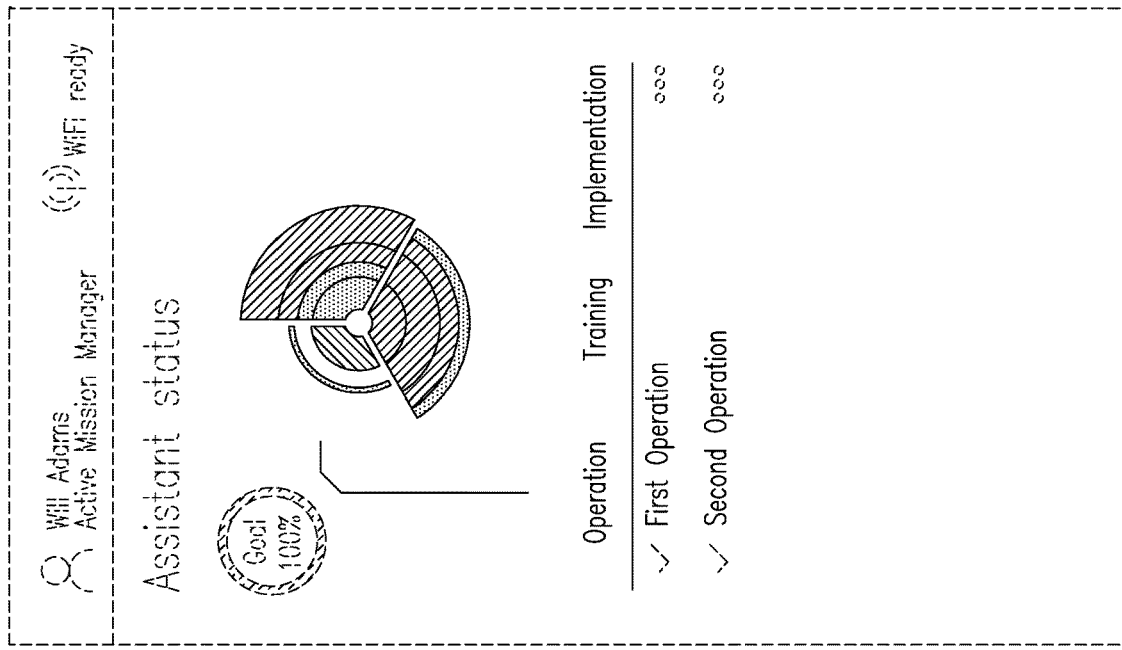
FIG. 18 is a fourth embodiment of the display screen with a graphical user interface.
Figure 19:
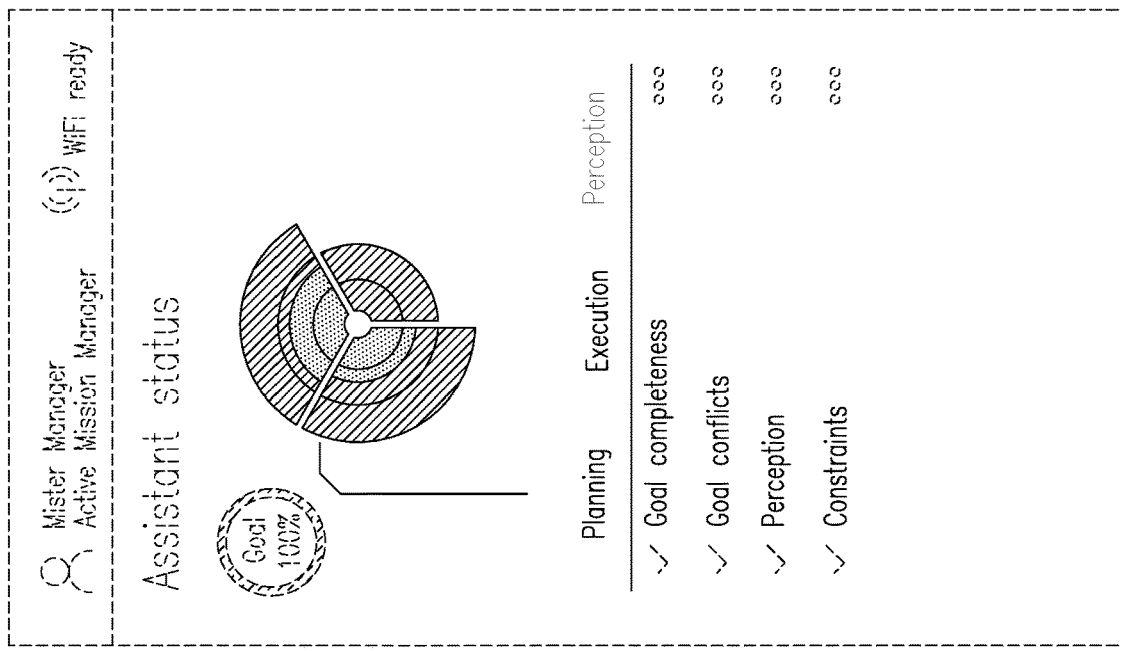
FIG. 19 is a view of a display screen with an animated graphical user interface.
Figure 20:
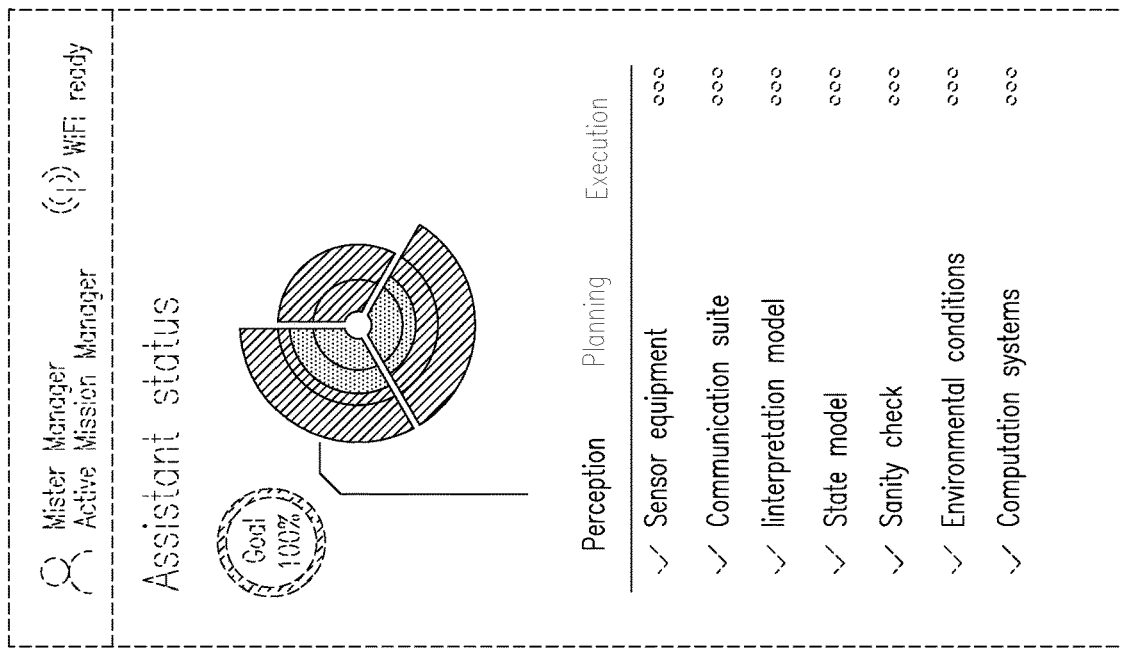
FIG. 20 is a second view of a display screen with an animated graphical user interface.
Figure 21:
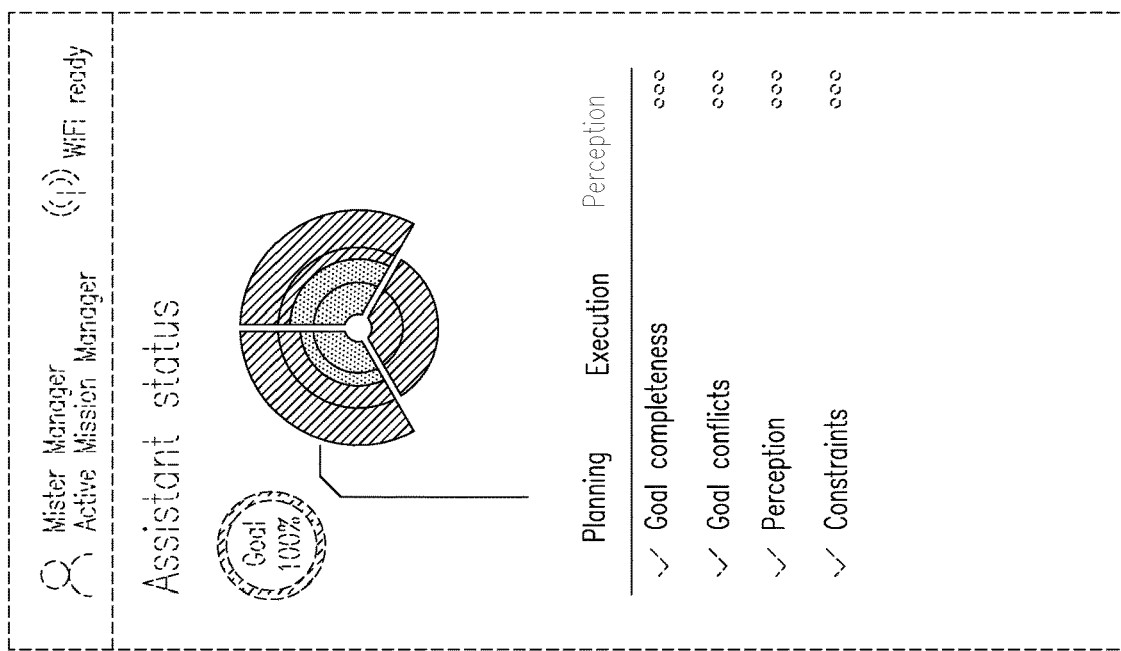
FIG. 21 is a third view of a display screen with an animated graphical user interface.
Figure 22:
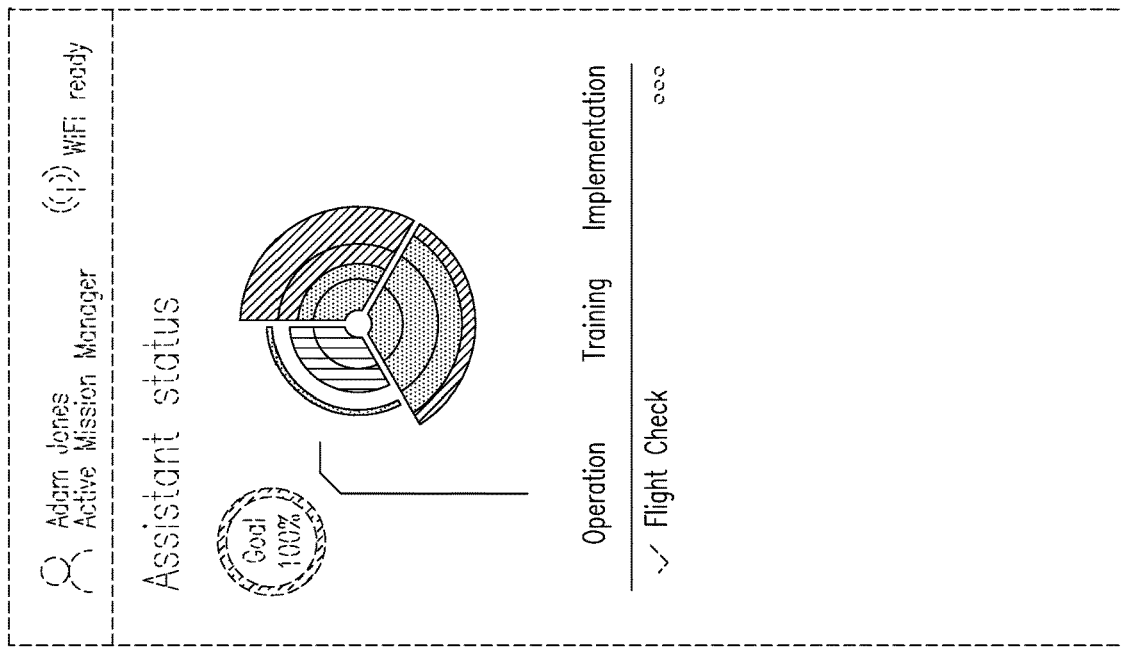
FIG. 22 is a view of a second embodiment of a display screen with an animated graphical user interface.
Figure 23:
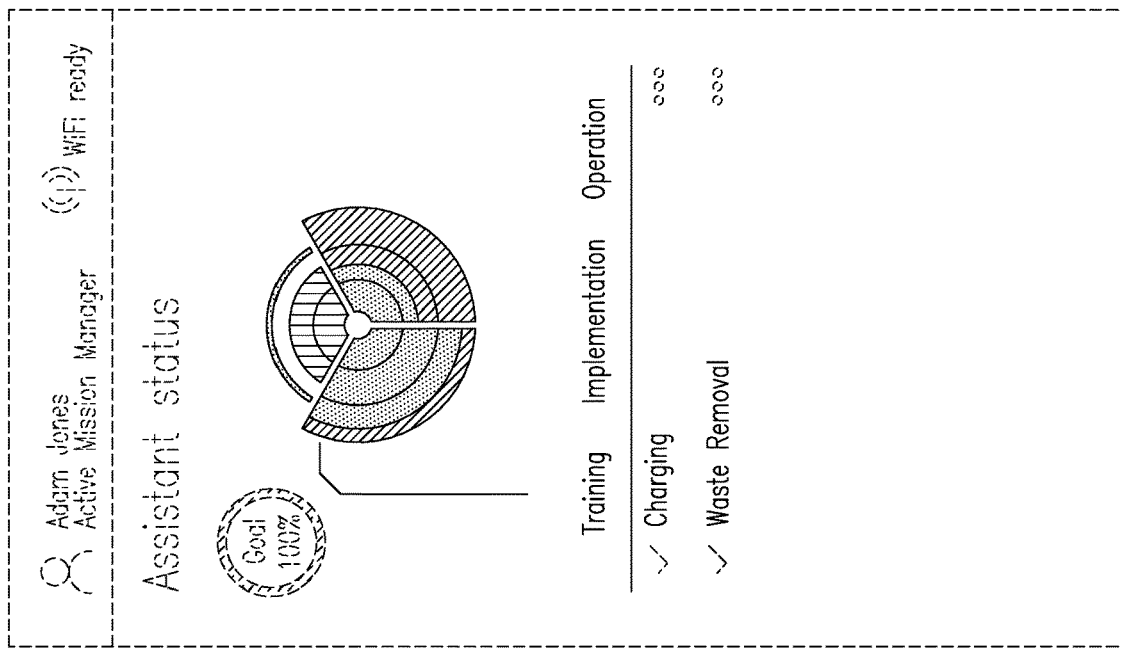
FIG. 23 is a second view of the second embodiment of a display screen with an animated graphical user interface.
Figure 24:
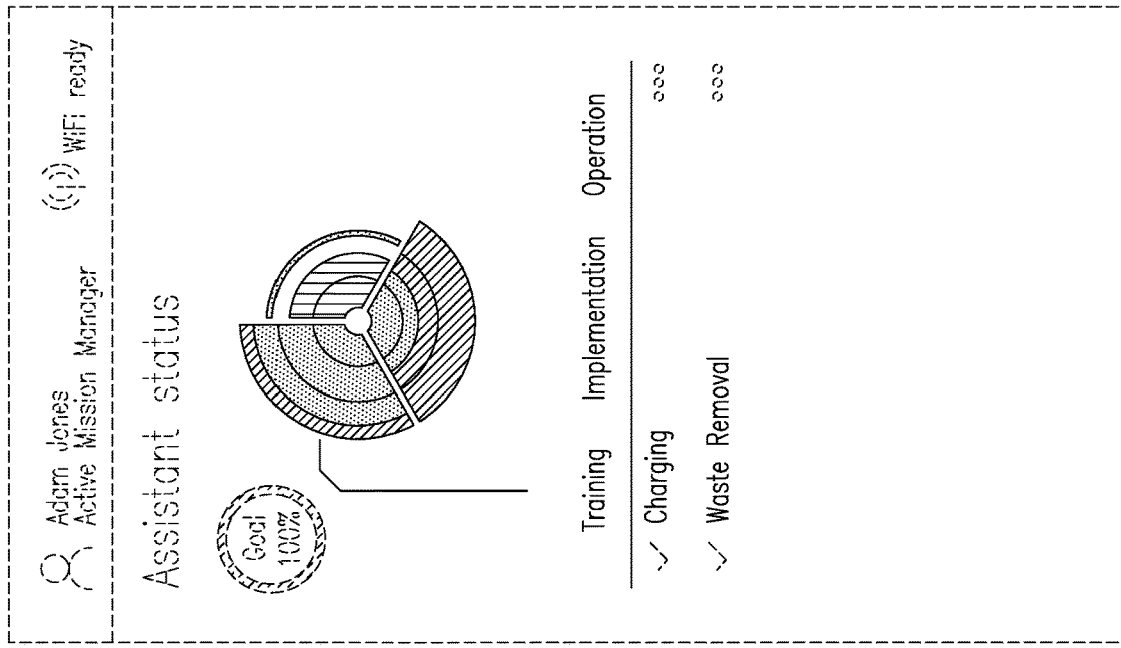
FIG. 24 is a third view of the second embodiment of a display screen with an animated graphical user interface.
Figure 26:
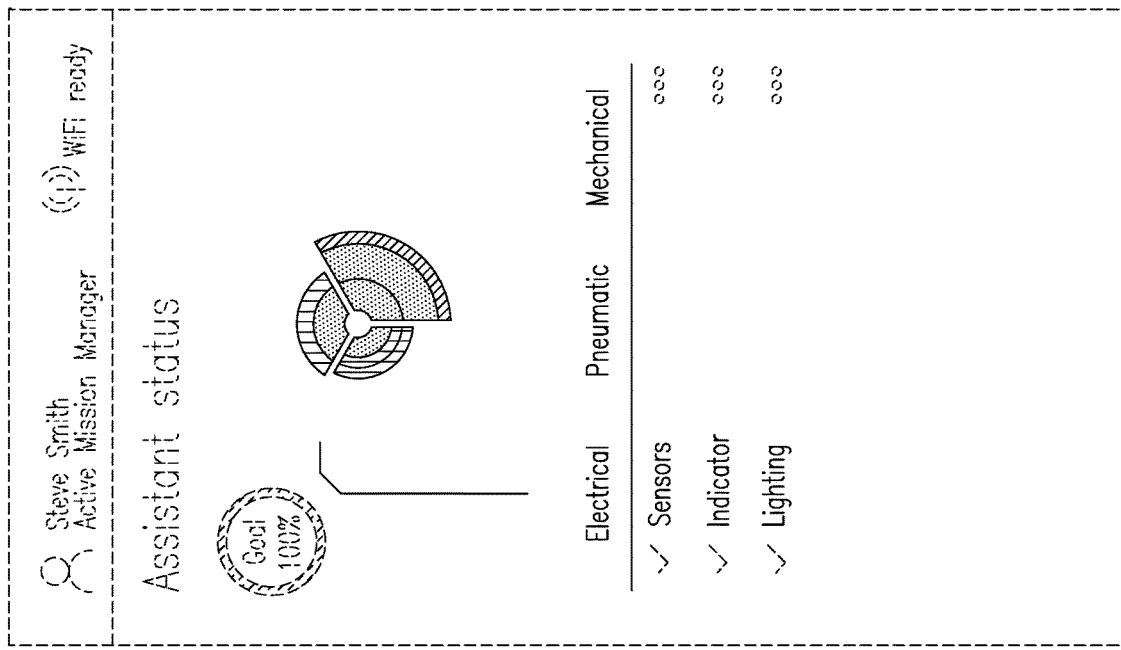
FIG. 26 is a second view of the third embodiment of a display screen with an animated graphical user interface.
Figure 25:
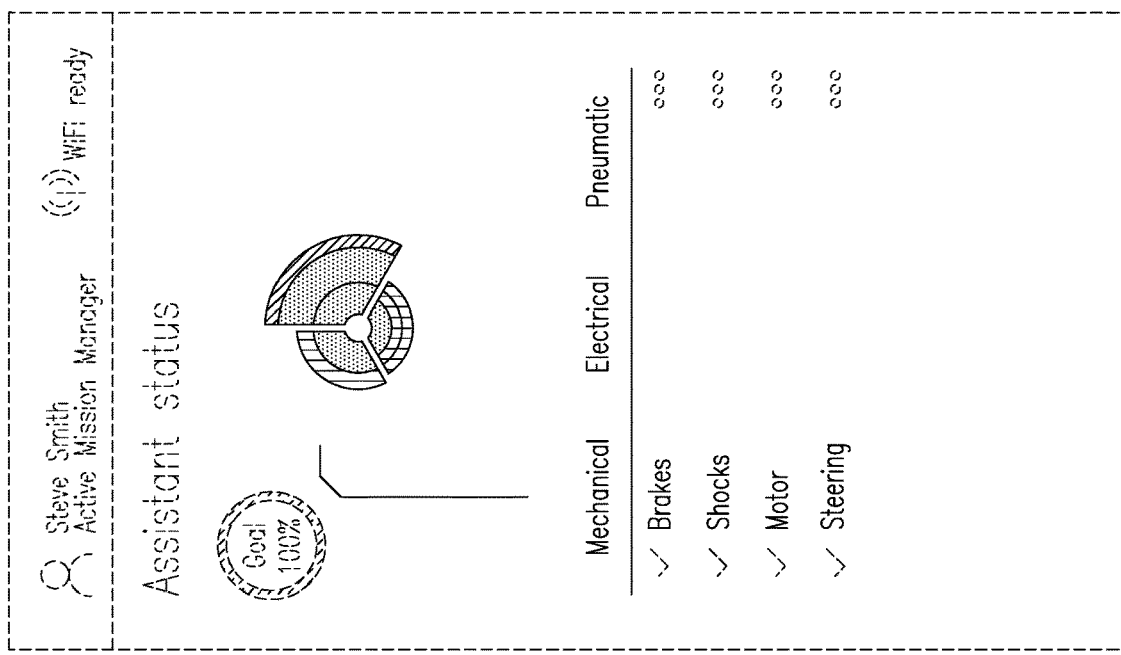
FIG. 25 is a view of a third embodiment of a display screen with an animated graphical user interface.
Figure 27:
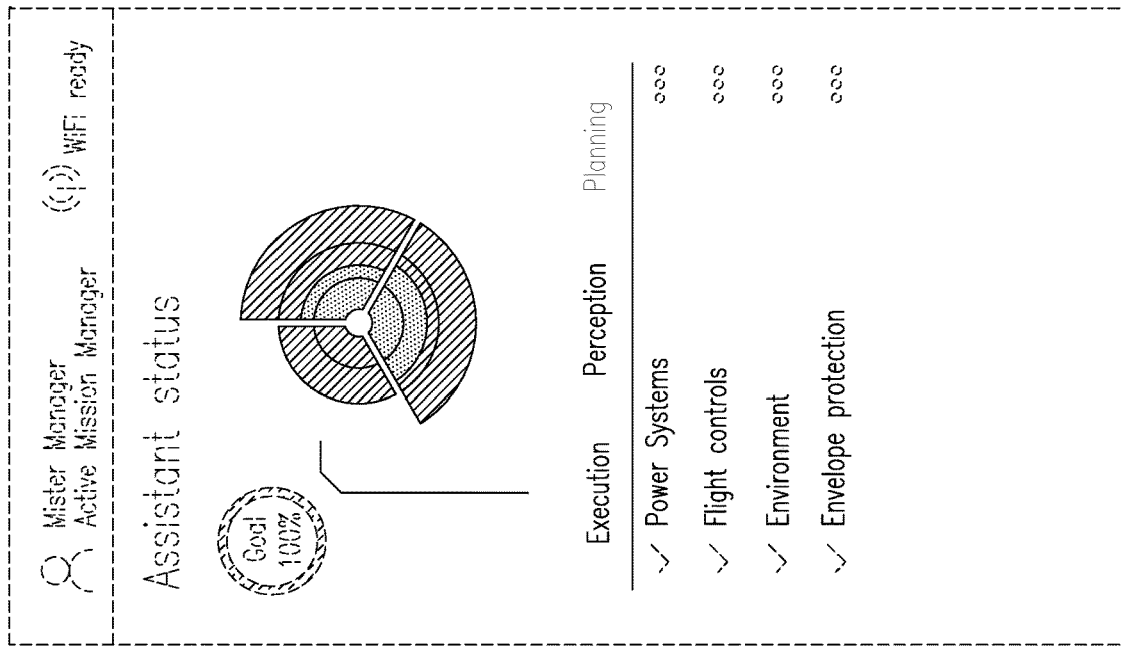
FIG. 27 is a third view of the third embodiment of a display screen with an animated graphical user interface.
Figure 28:
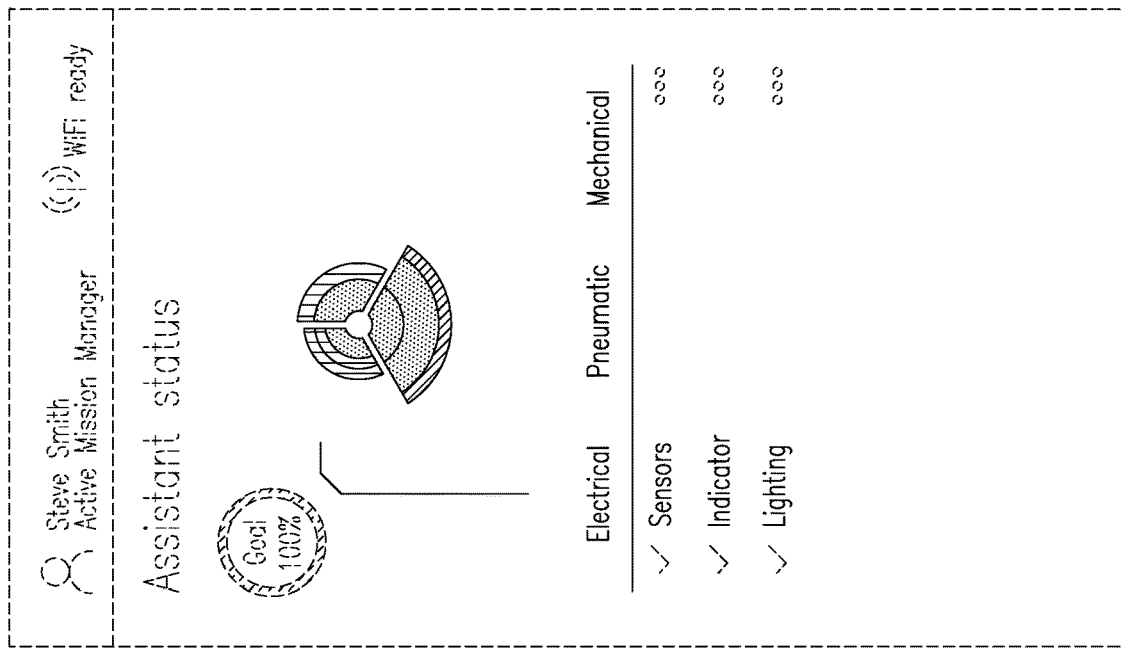
FIG. 28 is a view of a display screen with an animated graphical user interface.
Figure 29:
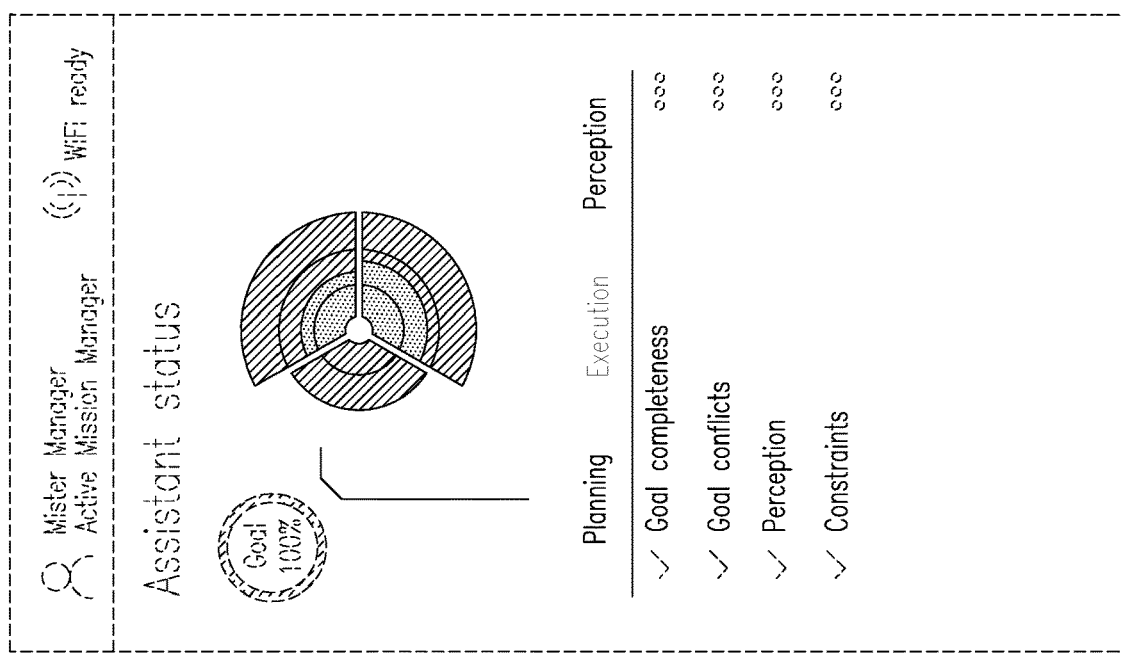
FIG. 29 is a second view of a display screen with an animated graphical user interface.
Figure 30:
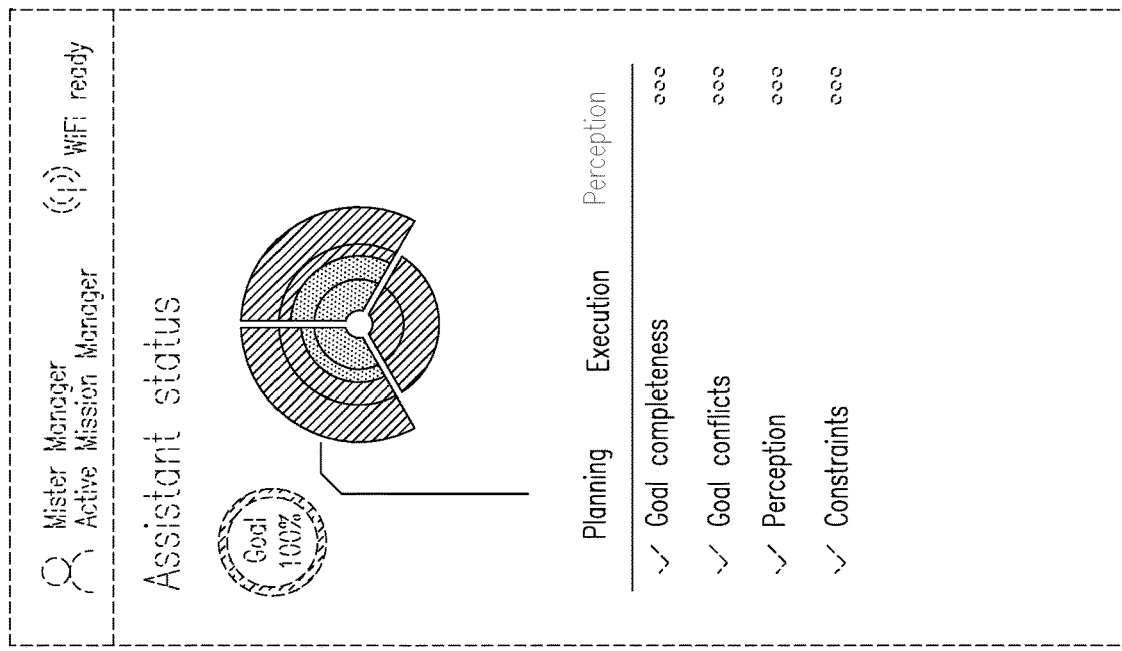
FIG. 30 is a third view of a display screen with an animated graphical user interface.
Figure 32:
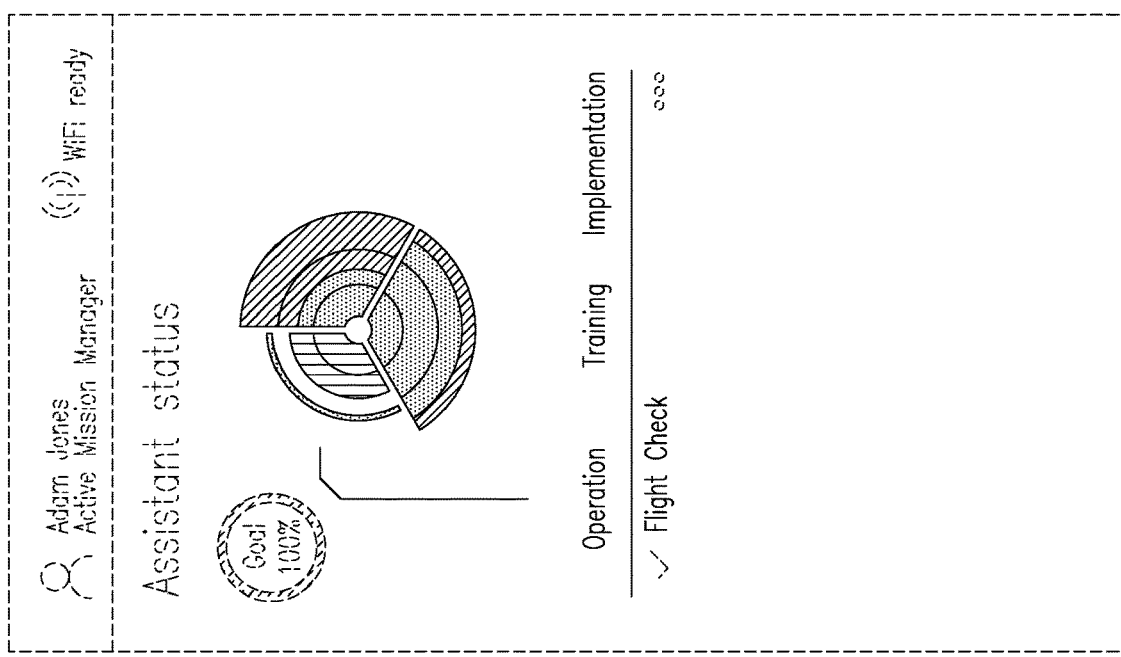
FIG. 32 is a second view of the second embodiment of a display screen with an animated graphical user interface.
Figure 31:
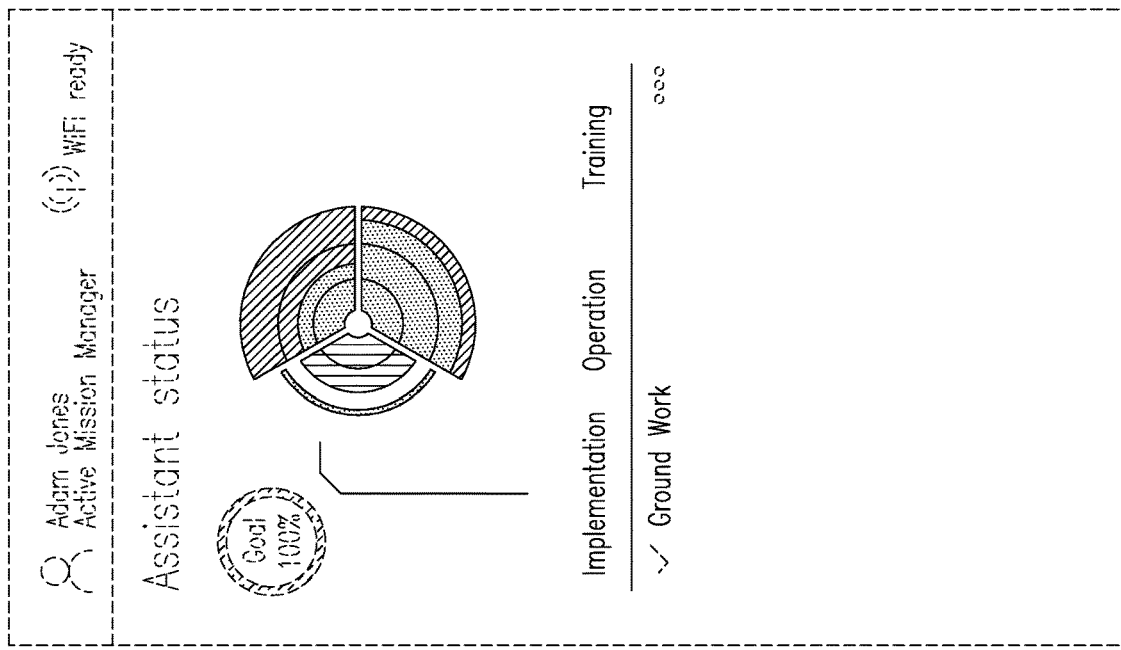
FIG. 31 is a view of a second embodiment of a display screen with an animated graphical user interface.
Figure 33:
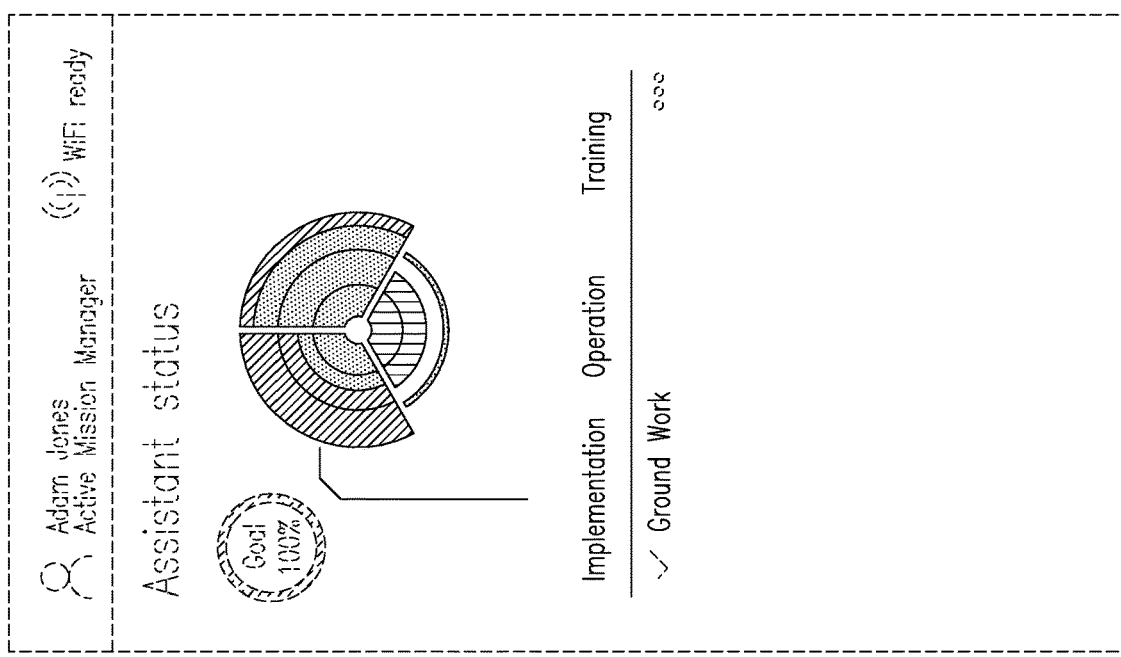
FIG. 33 is a third view of the second embodiment of a display screen with an animated graphical user interface.
Figure 34:
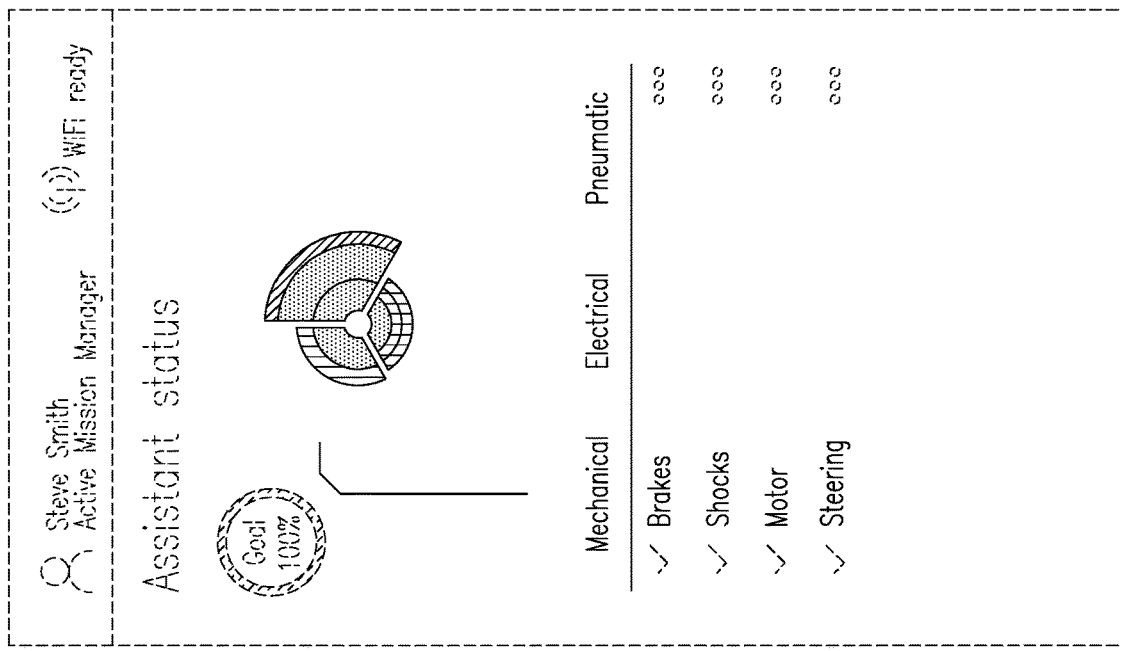
FIG. 34 is a view of a third embodiment of a display screen with an animated graphical user interface.
Figure 35:
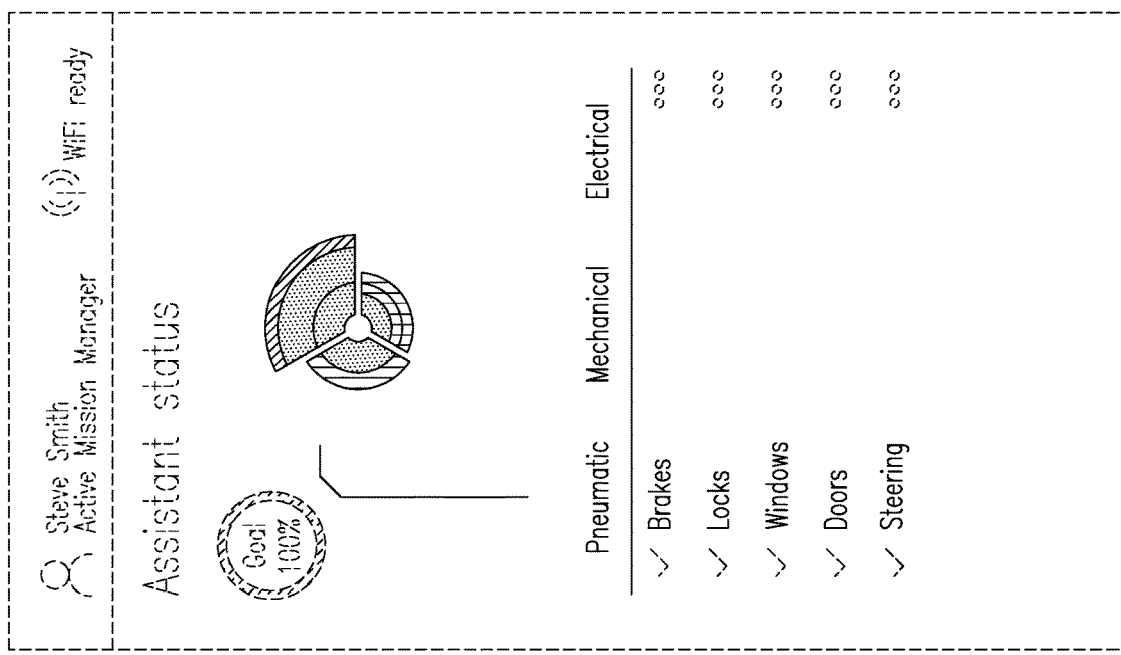
FIG. 35 is a second view of the third embodiment of a display screen with an animated graphical user interface.
Figure 36:
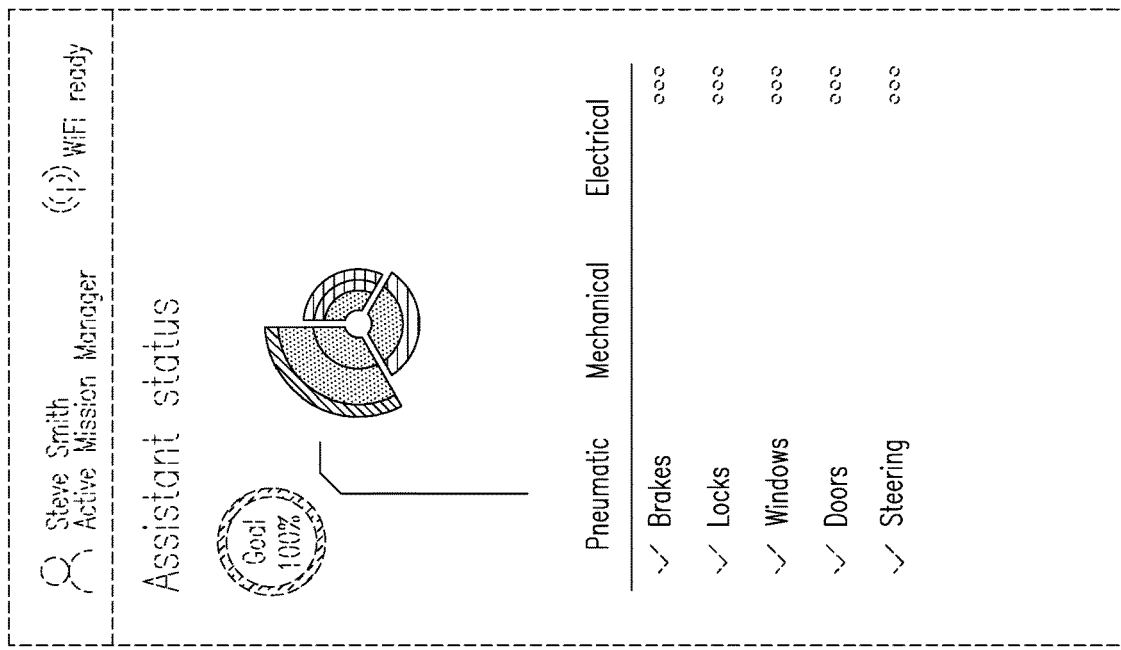
FIG. 36 is a third view of the third embodiment of a display screen with an animated graphical user interface.
Figure 37:
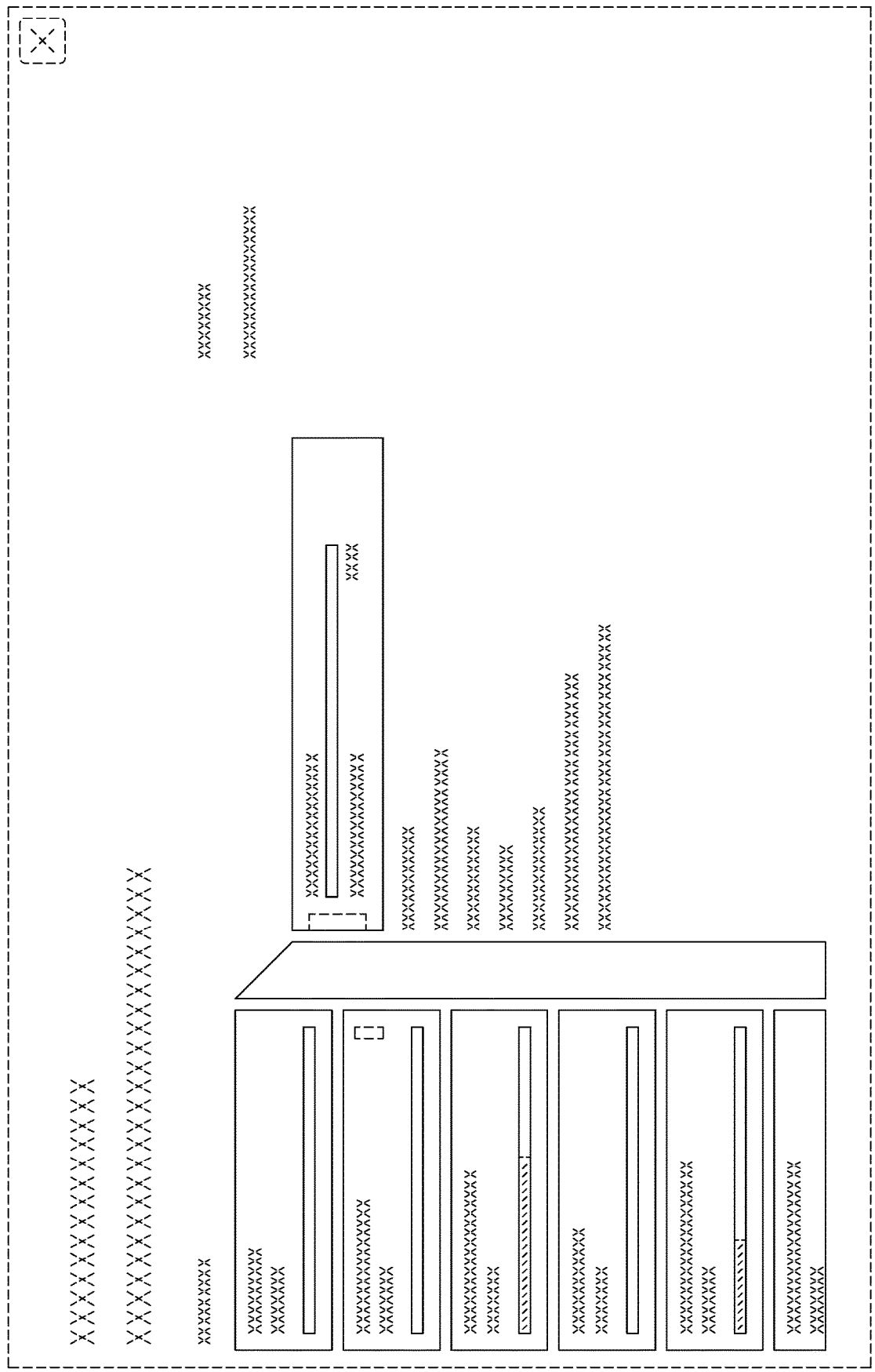
FIG. 37 is a view of a display screen with a graphical user interface is depicted.
Figure 38:
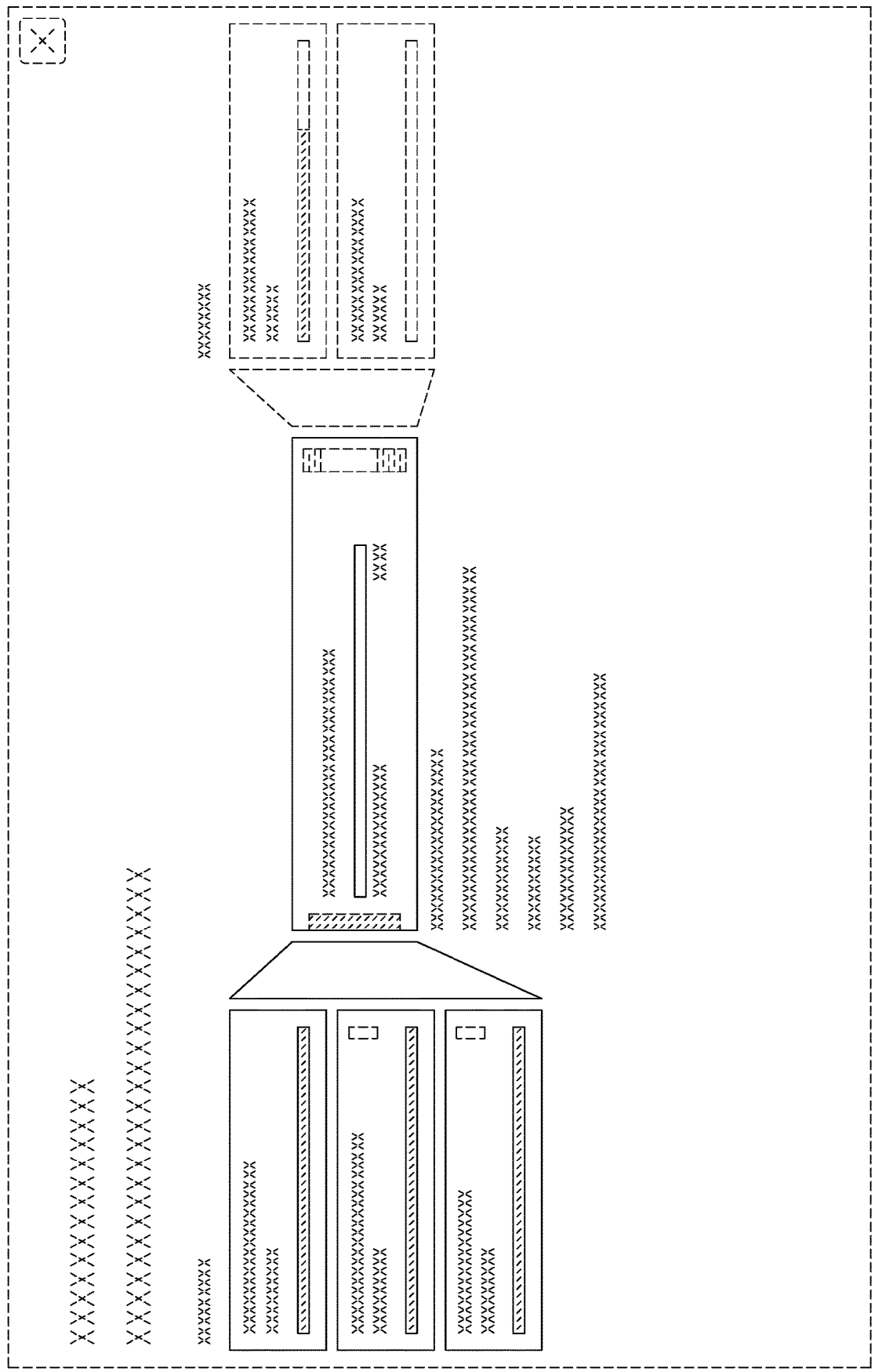
FIG. 38 is a second embodiment of the display screen with a graphical user interface.
Figure 39:
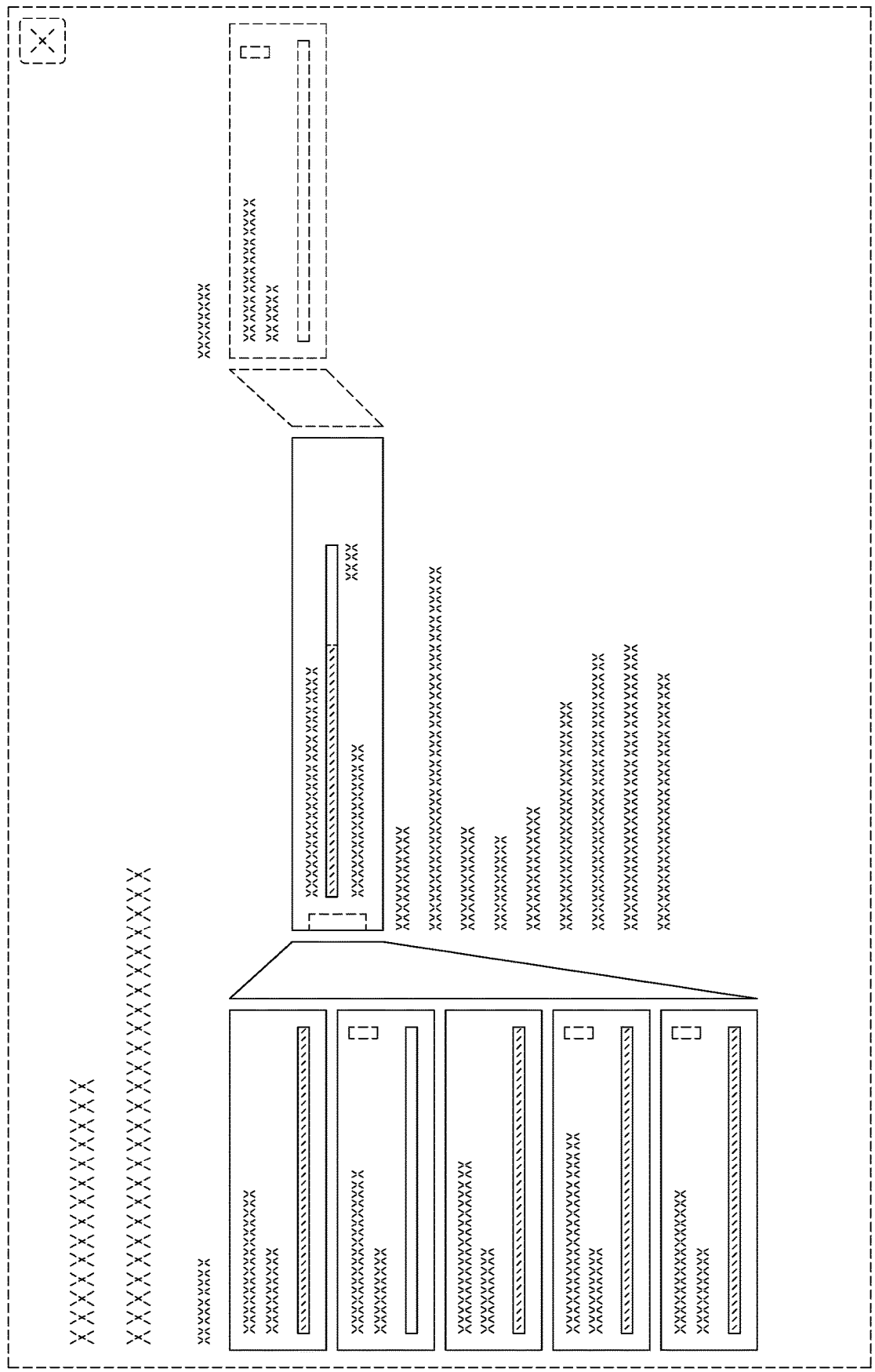
FIG. 39 is a third embodiment of the display screen with a graphical user interface.
Figure 40:
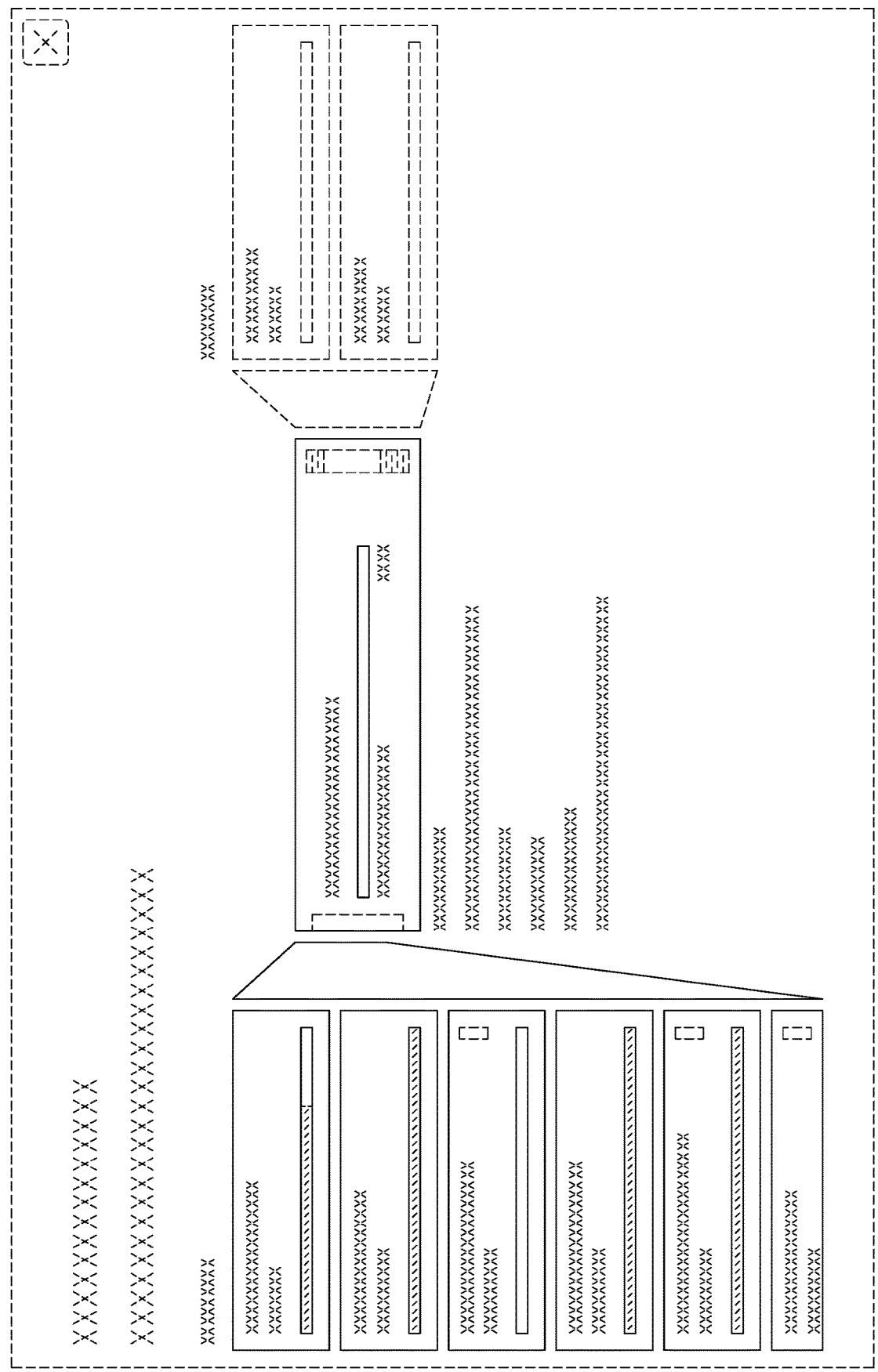
FIG. 40 is a fourth embodiment of the display screen with a graphical user interface.
Figure 41:
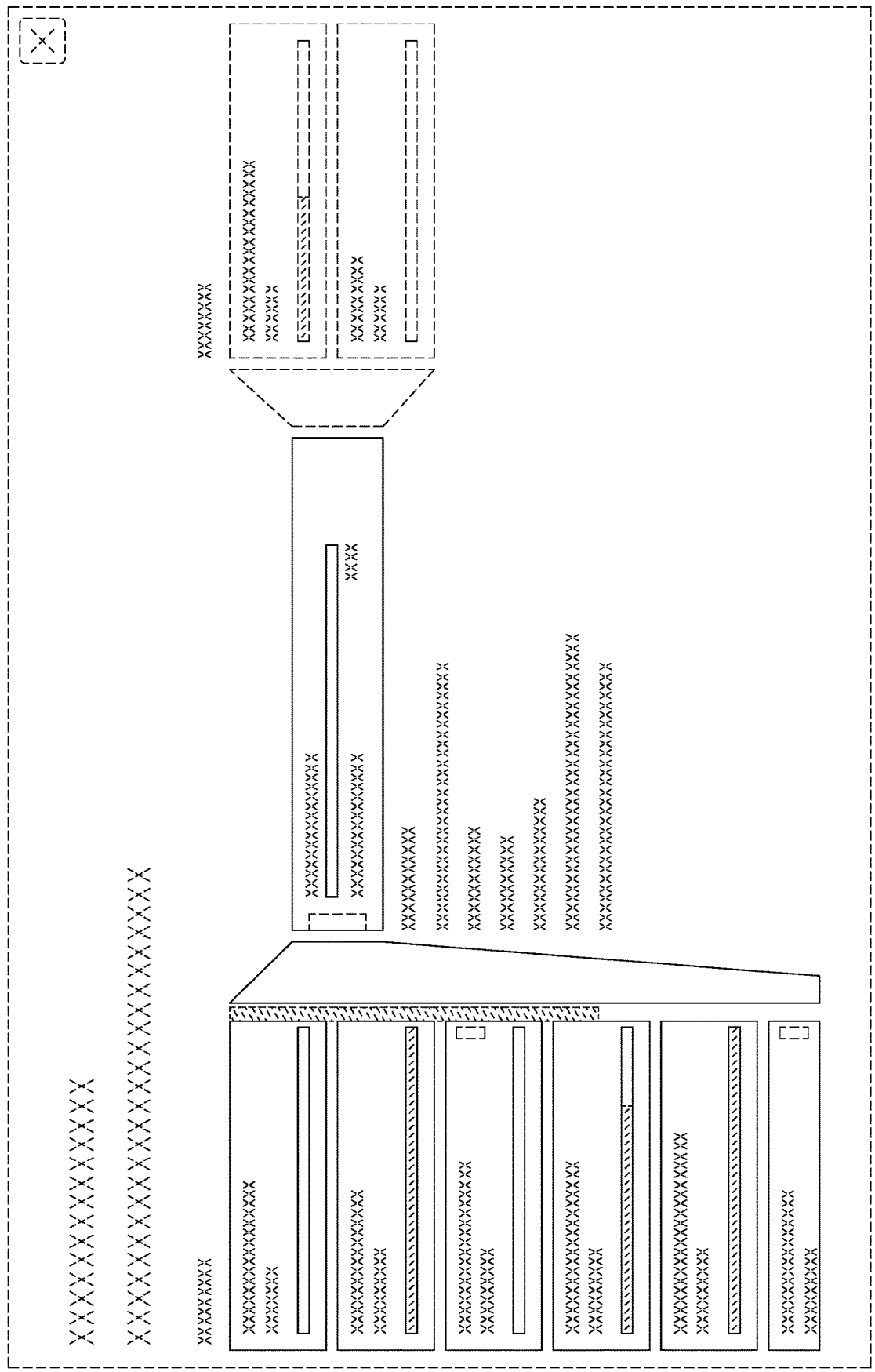
FIG. 41 is a fifth embodiment of the display screen with a graphical user interface.
Figure 42:
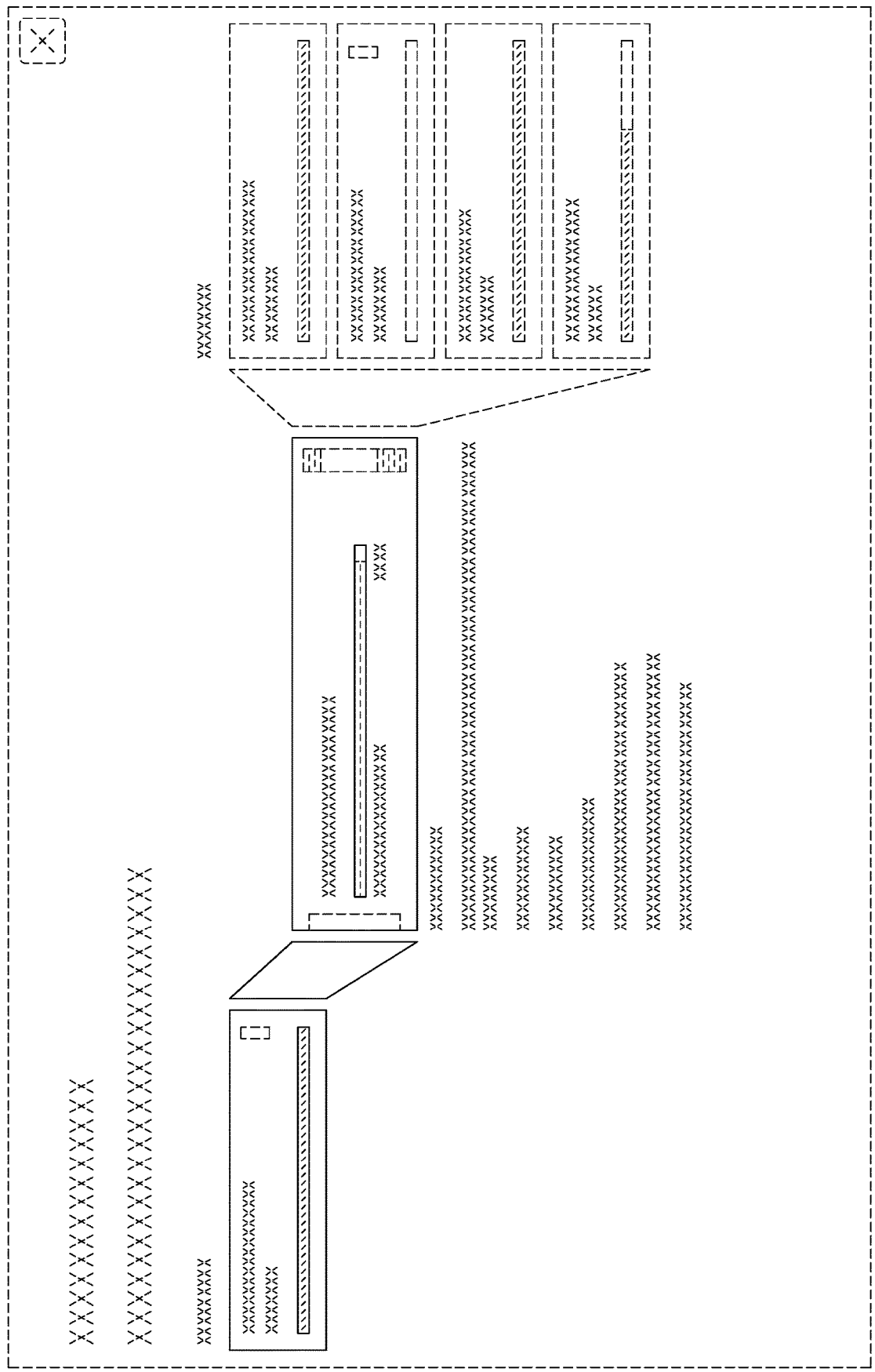
FIG. 42 is a sixth embodiment of the display screen with a graphical user interface.
Figure 43:
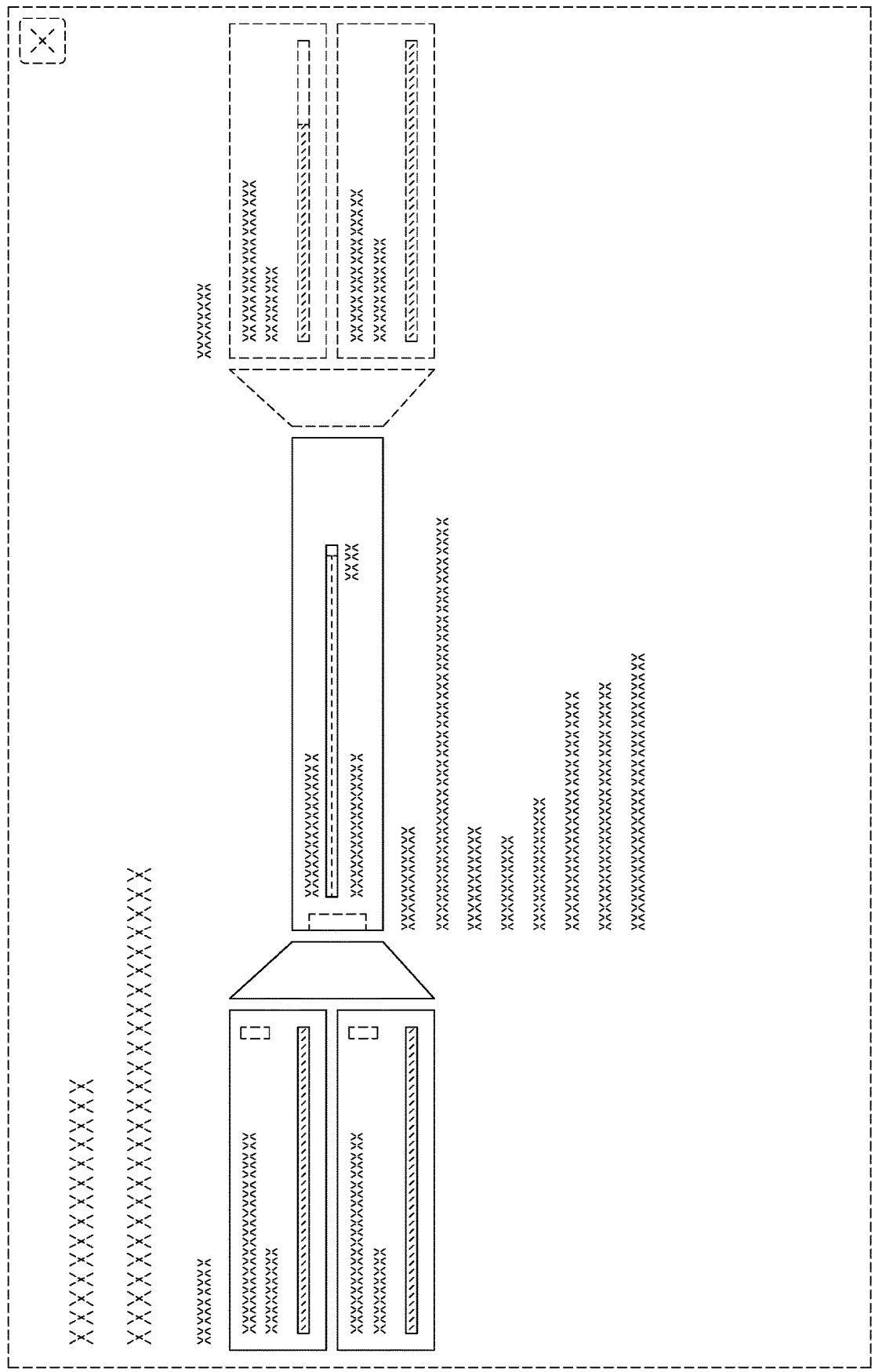
FIG. 43 is a seventh embodiment of the display screen with a graphical user interface.
Figure 44:
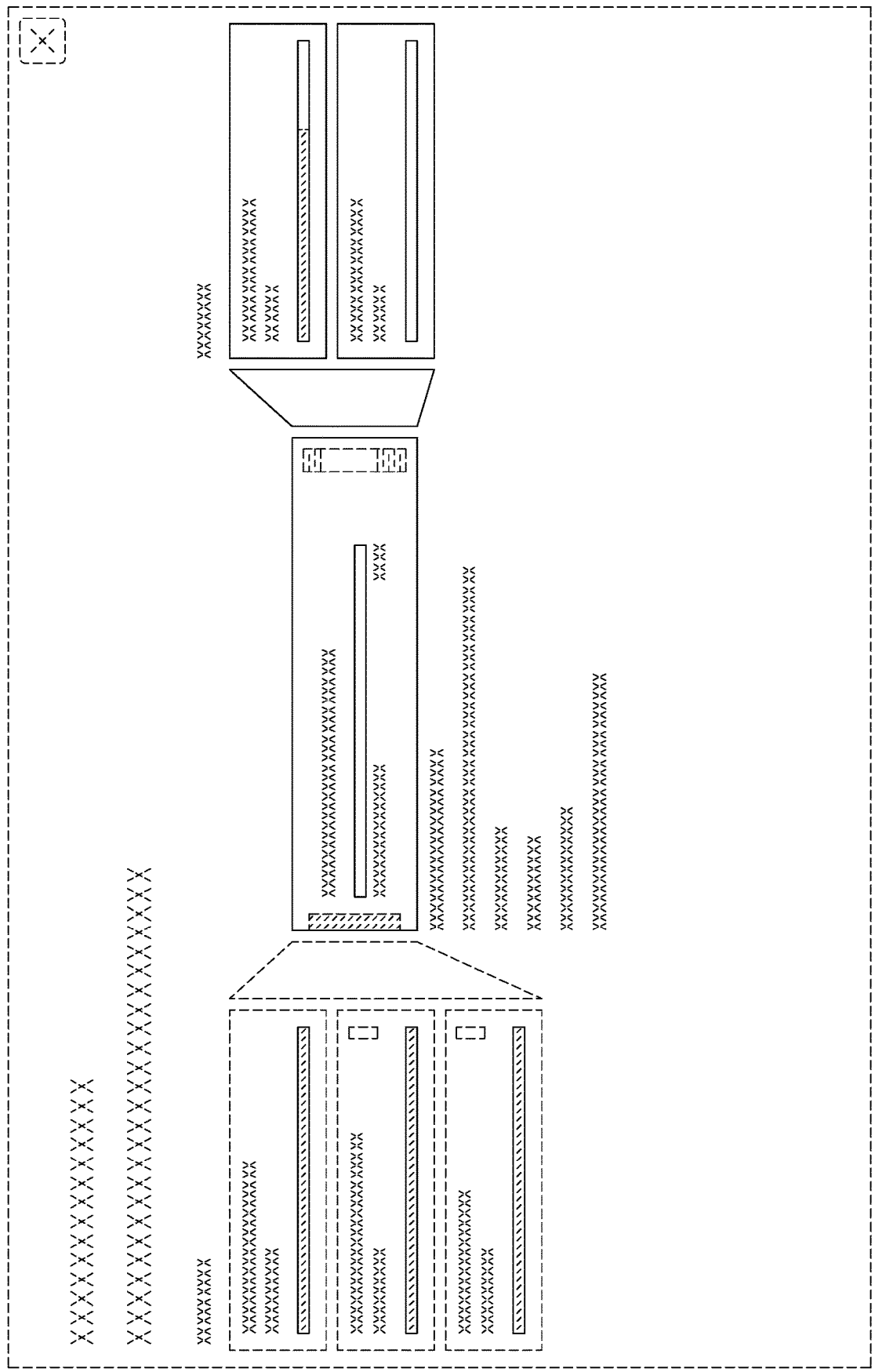
FIG. 44 is a view of a display screen with a graphical user interface.
Figure 45:
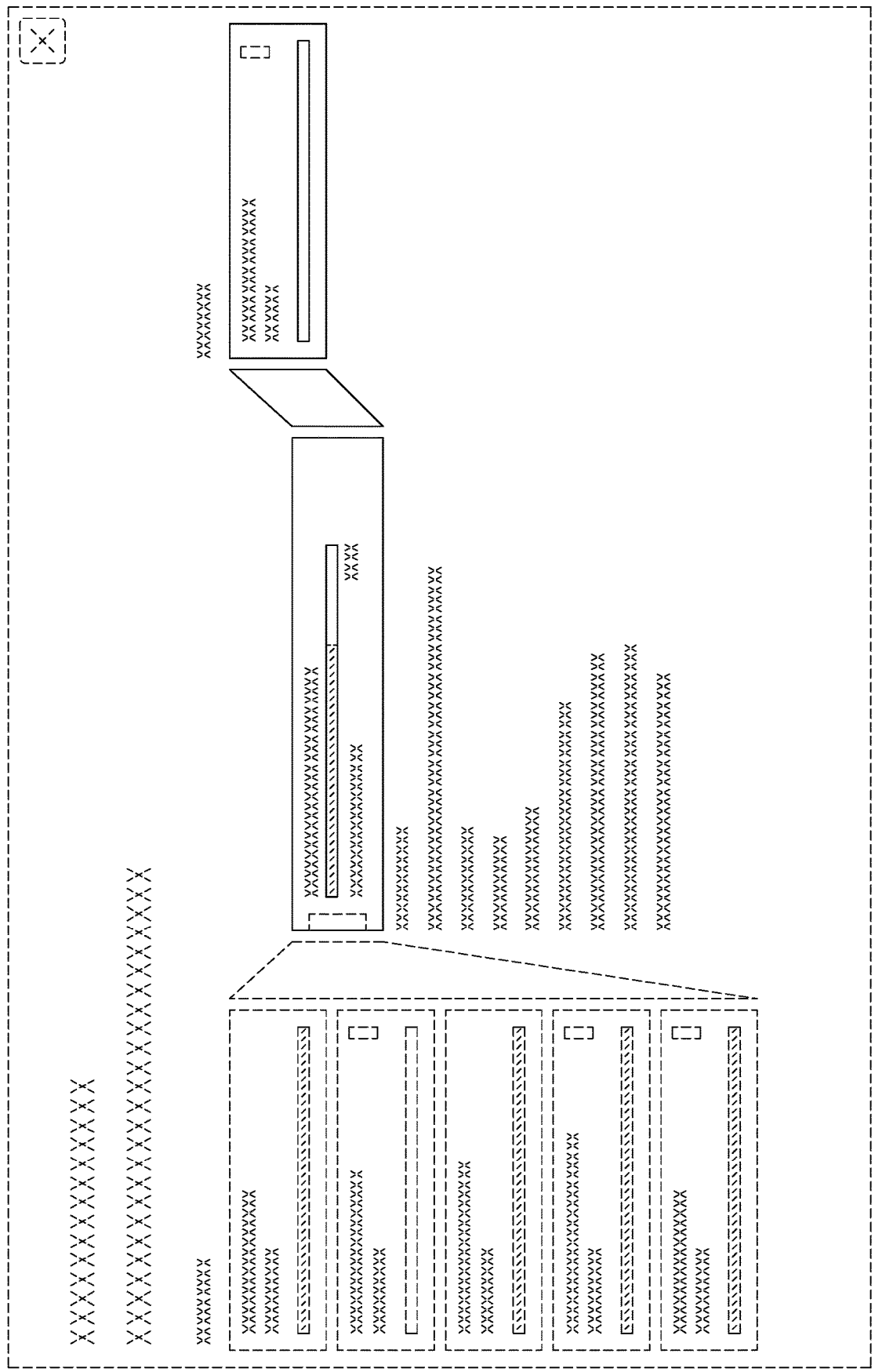
FIG. 45 is a second embodiment of the display screen with a graphical user interface.
Figure 46:
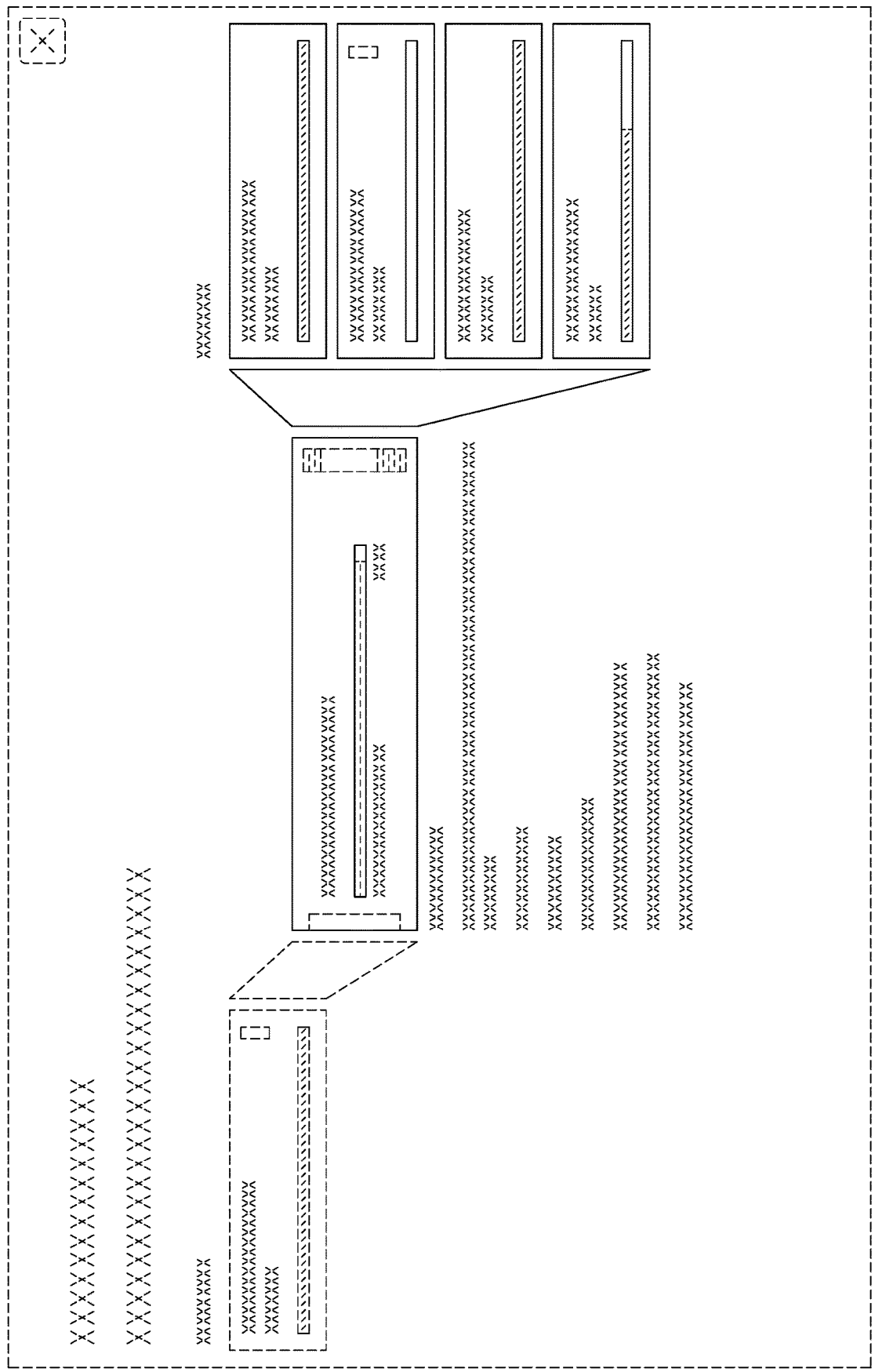
FIG. 46 is a third embodiment of the display screen with a graphical user interface.
Figure 47:
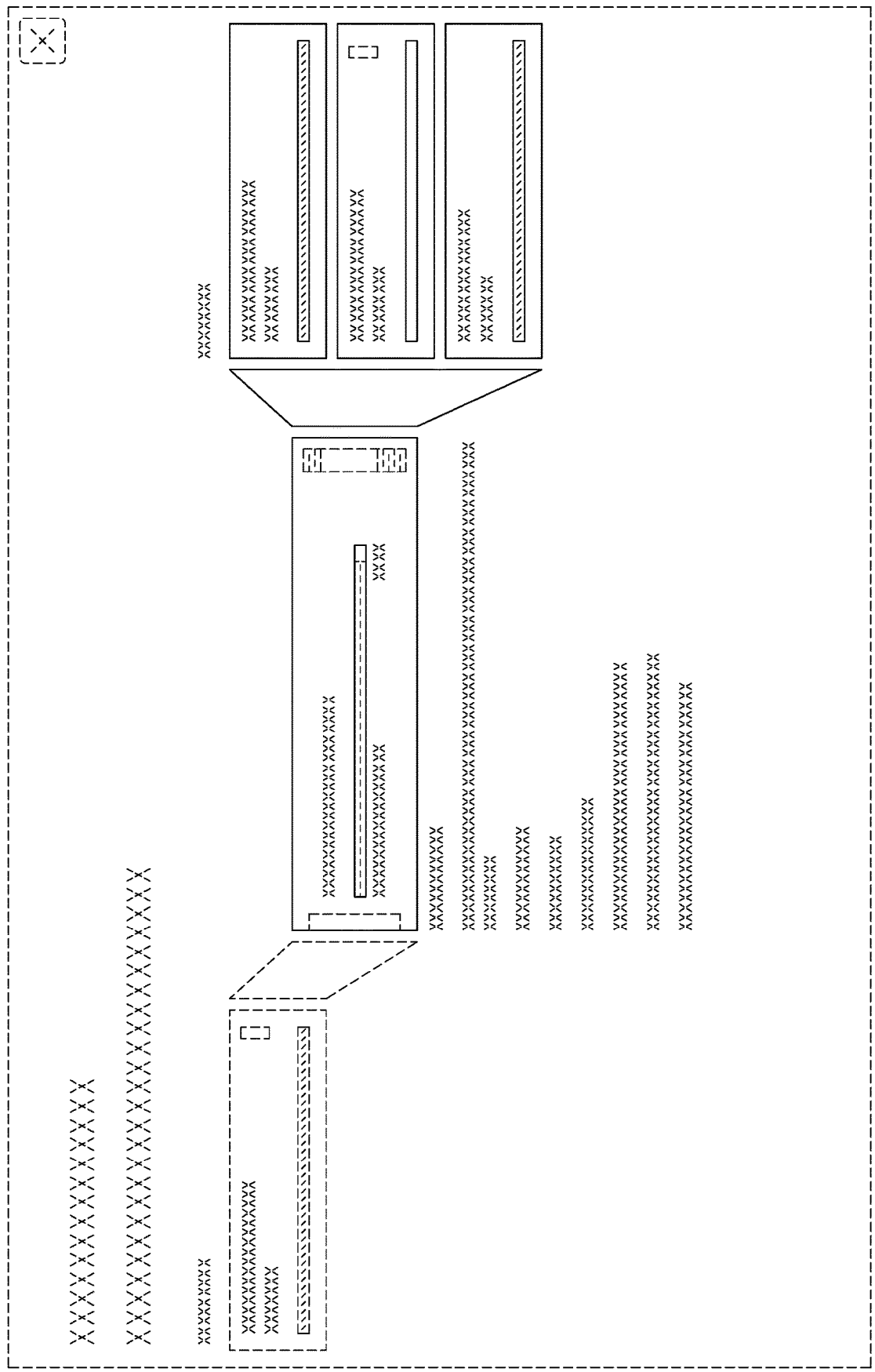
FIG. 47 is a fourth embodiment of the display screen with a graphical user interface.
Figure 48:
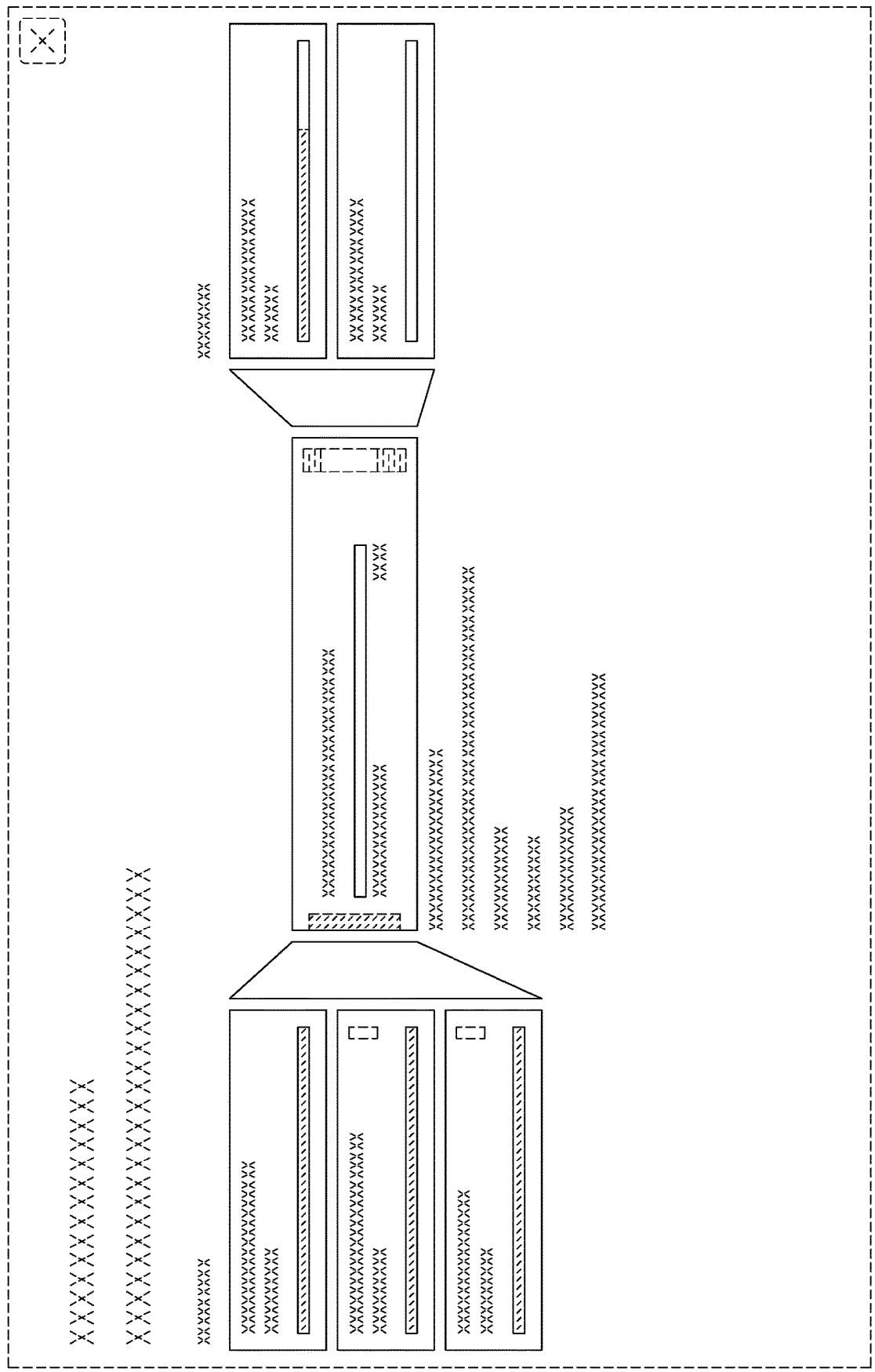
FIG. 48 is a view of a display screen with a graphical user interface.
Figure 49:
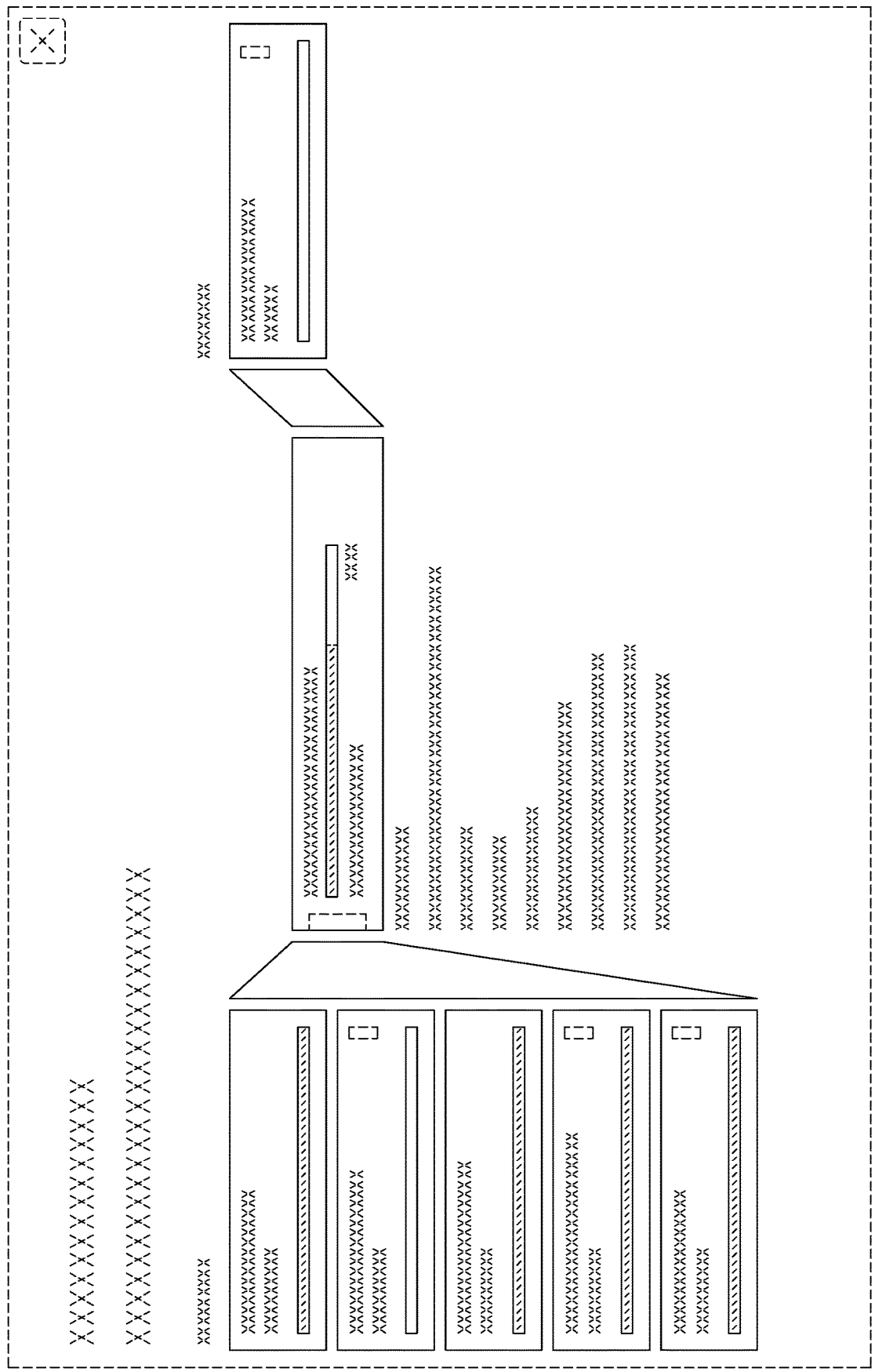
FIG. 49 is a second embodiment of the display screen with a graphical user interface.
Figure 50:
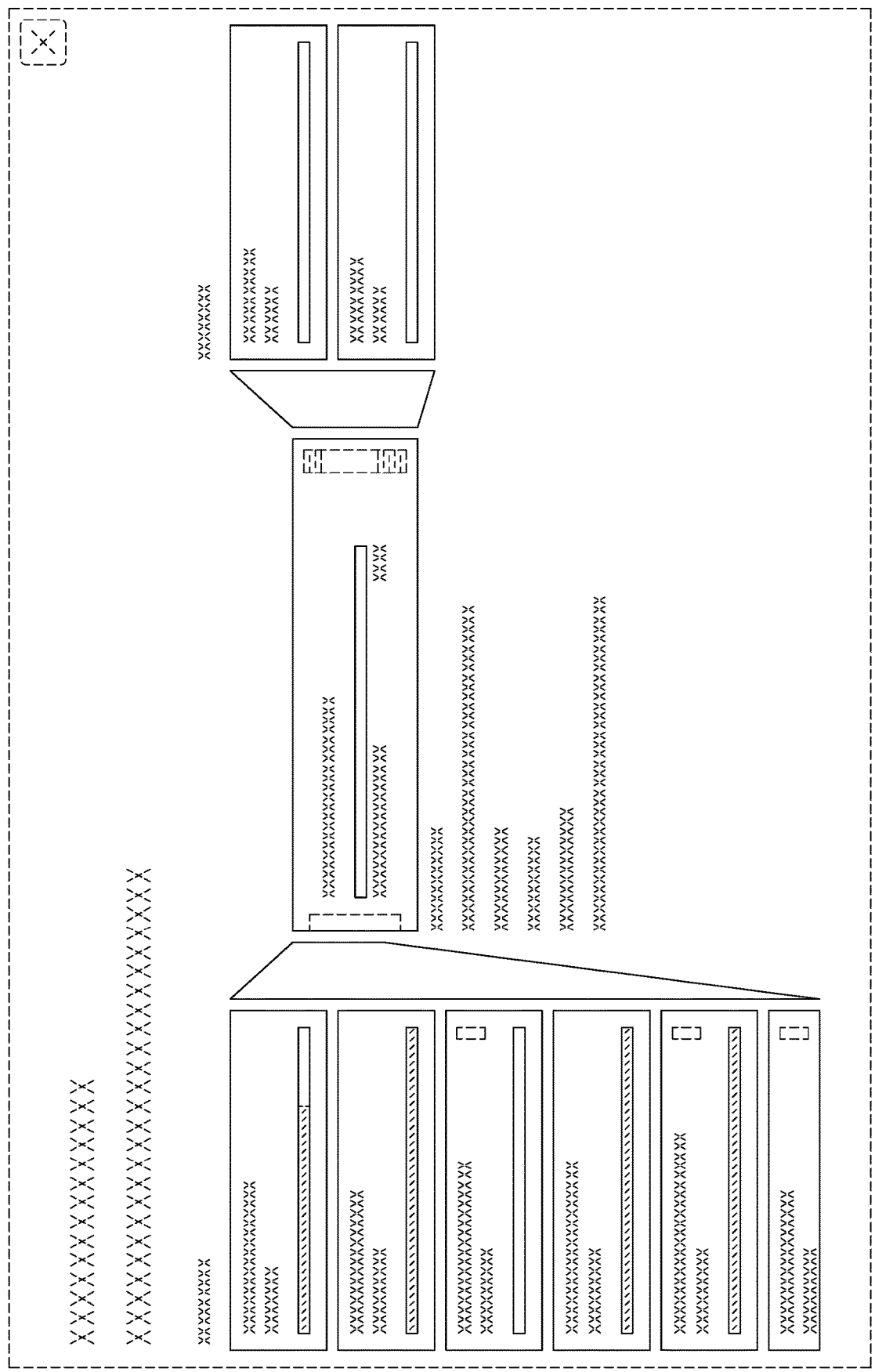
FIG. 50 is a third embodiment of the display screen with a graphical user interface.
Figure 51:
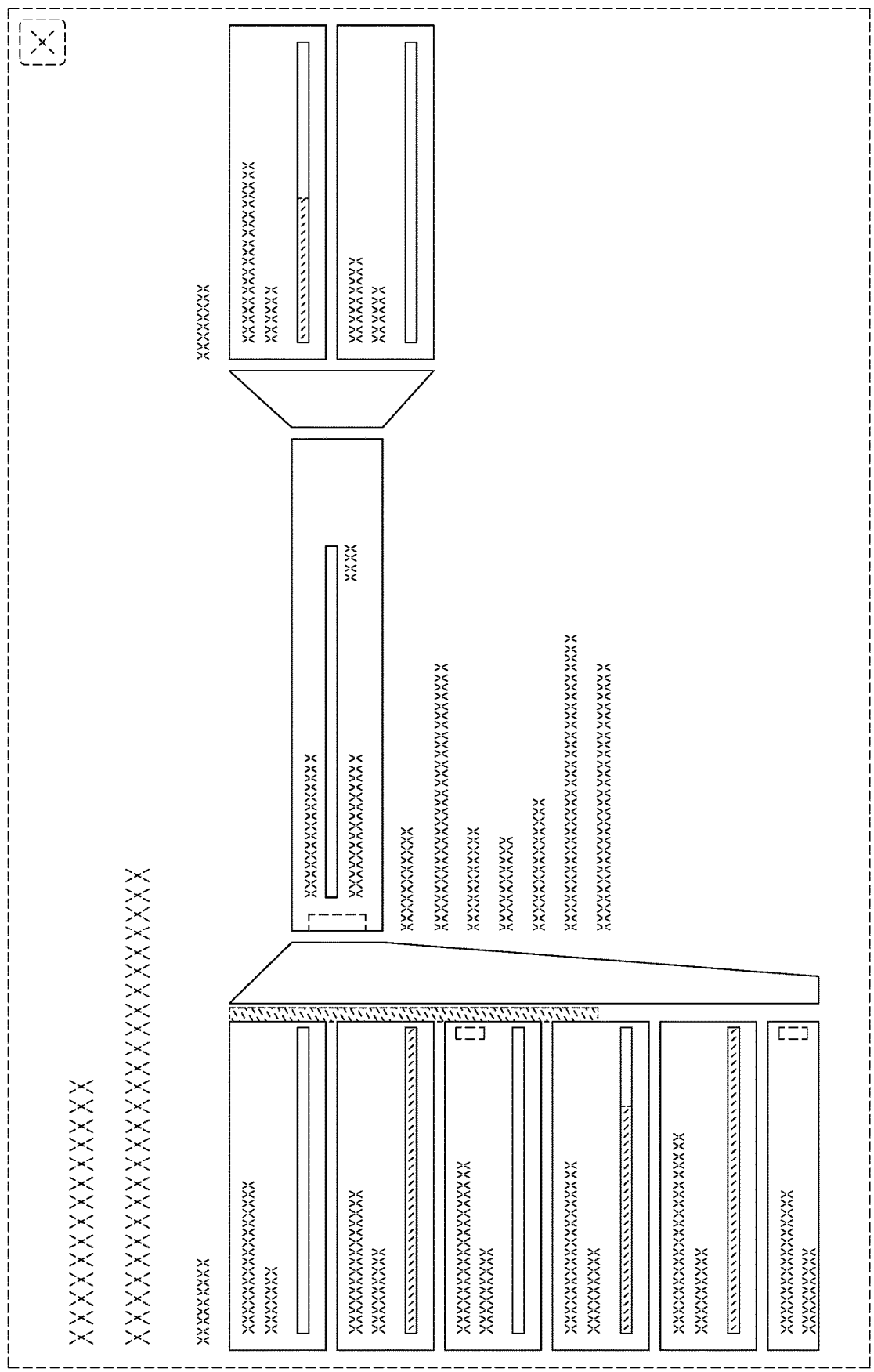
FIG. 51 is a fourth embodiment of the display screen with a graphical user interface.
Figure 52:
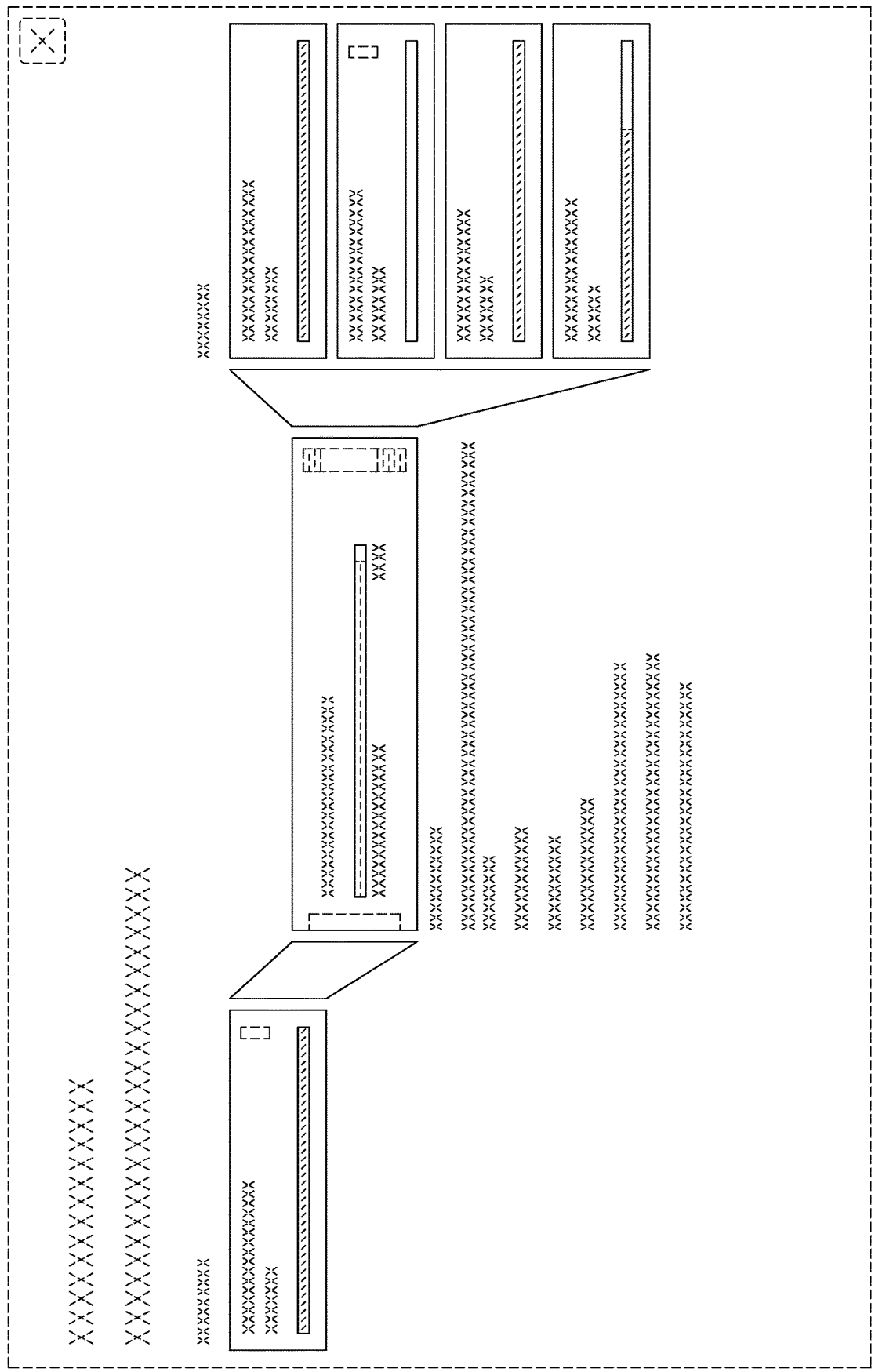
FIG. 52 is a fifth embodiment of the display screen with a graphical user interface.
Figure 53:
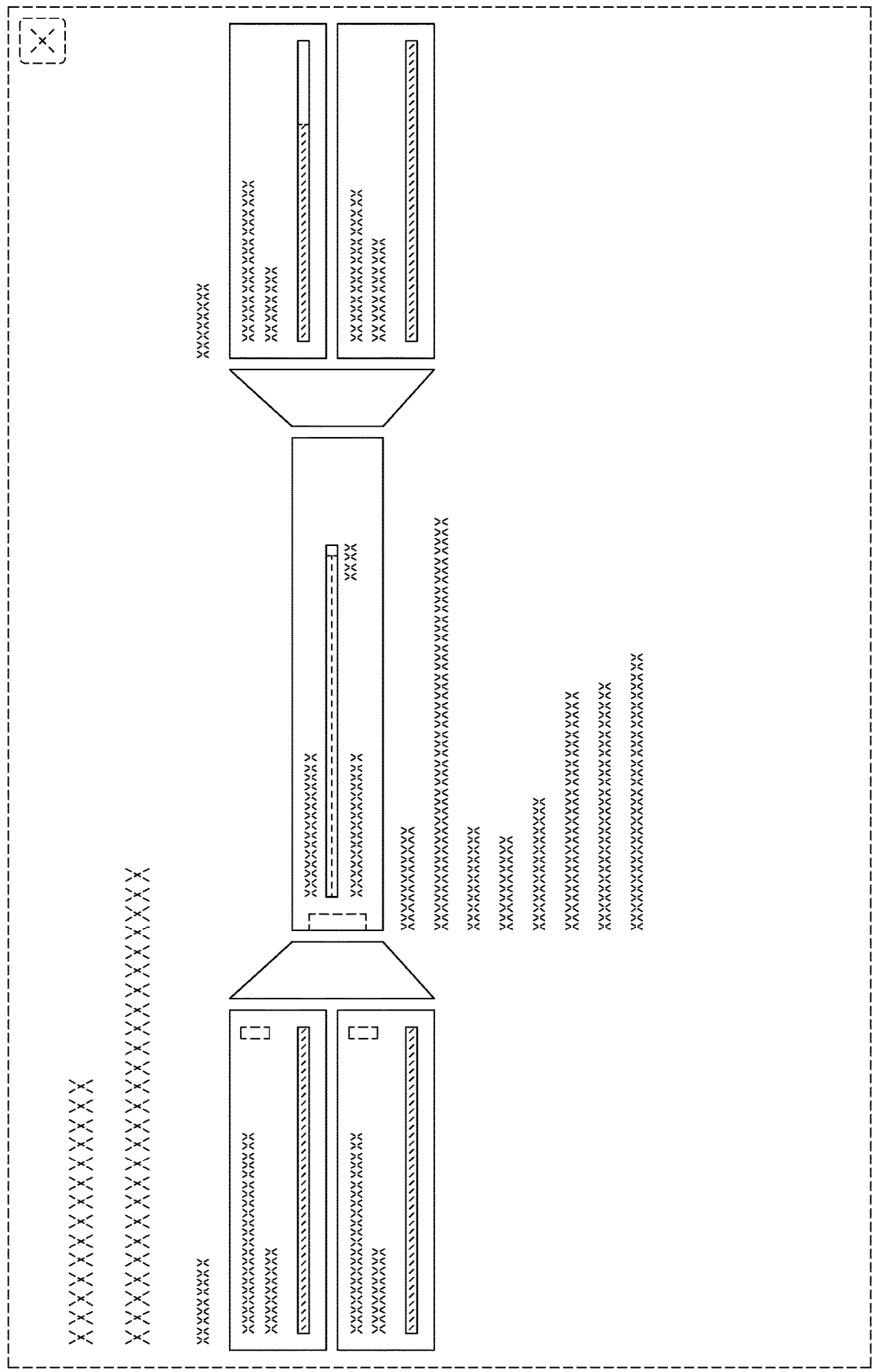
FIG. 53 is a sixth embodiment of the display screen with a graphical user interface.
Figure 54:
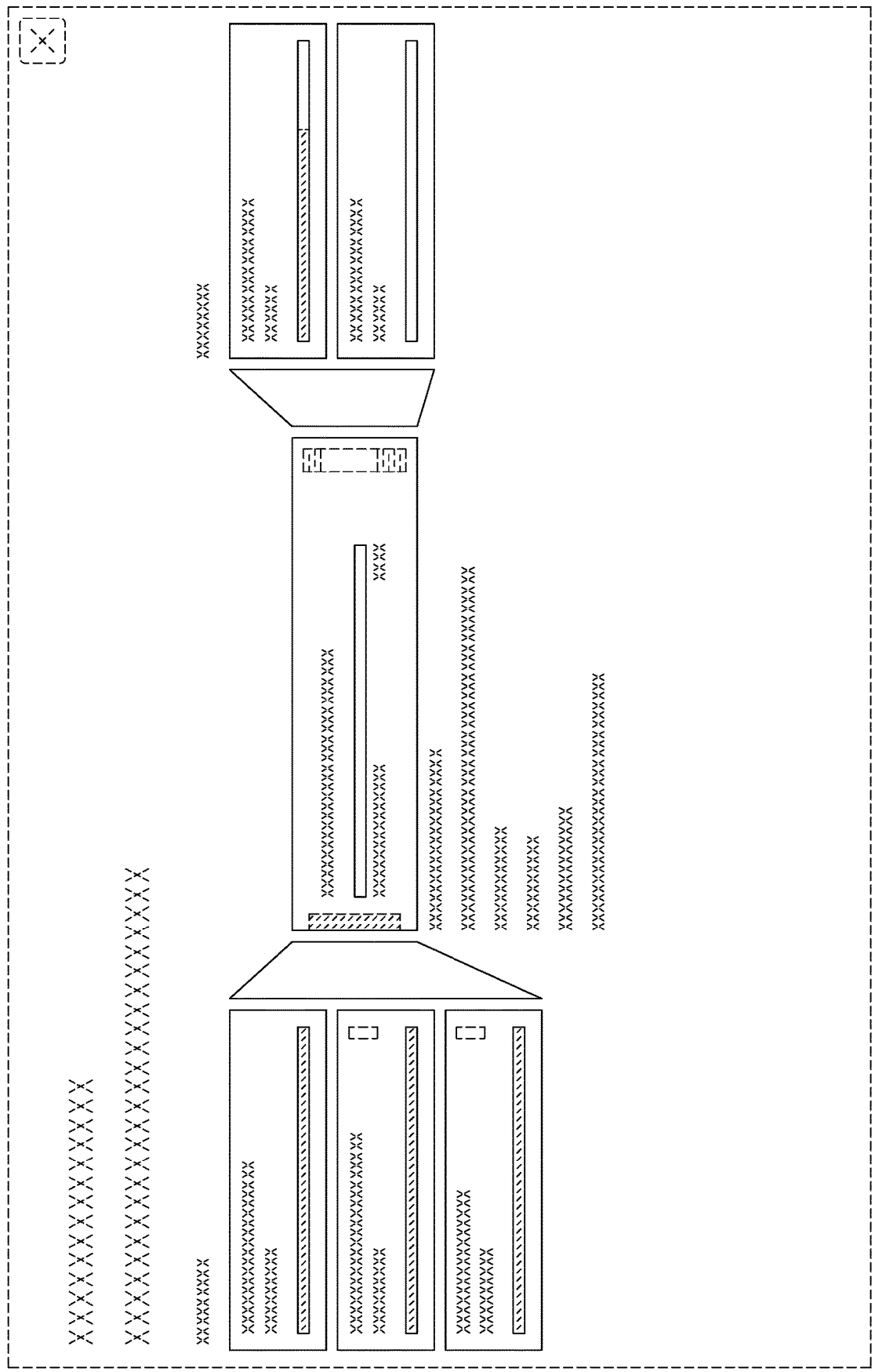
FIG. 54 is a seventh embodiment of the display screen with a graphical user interface.
Figure 55:
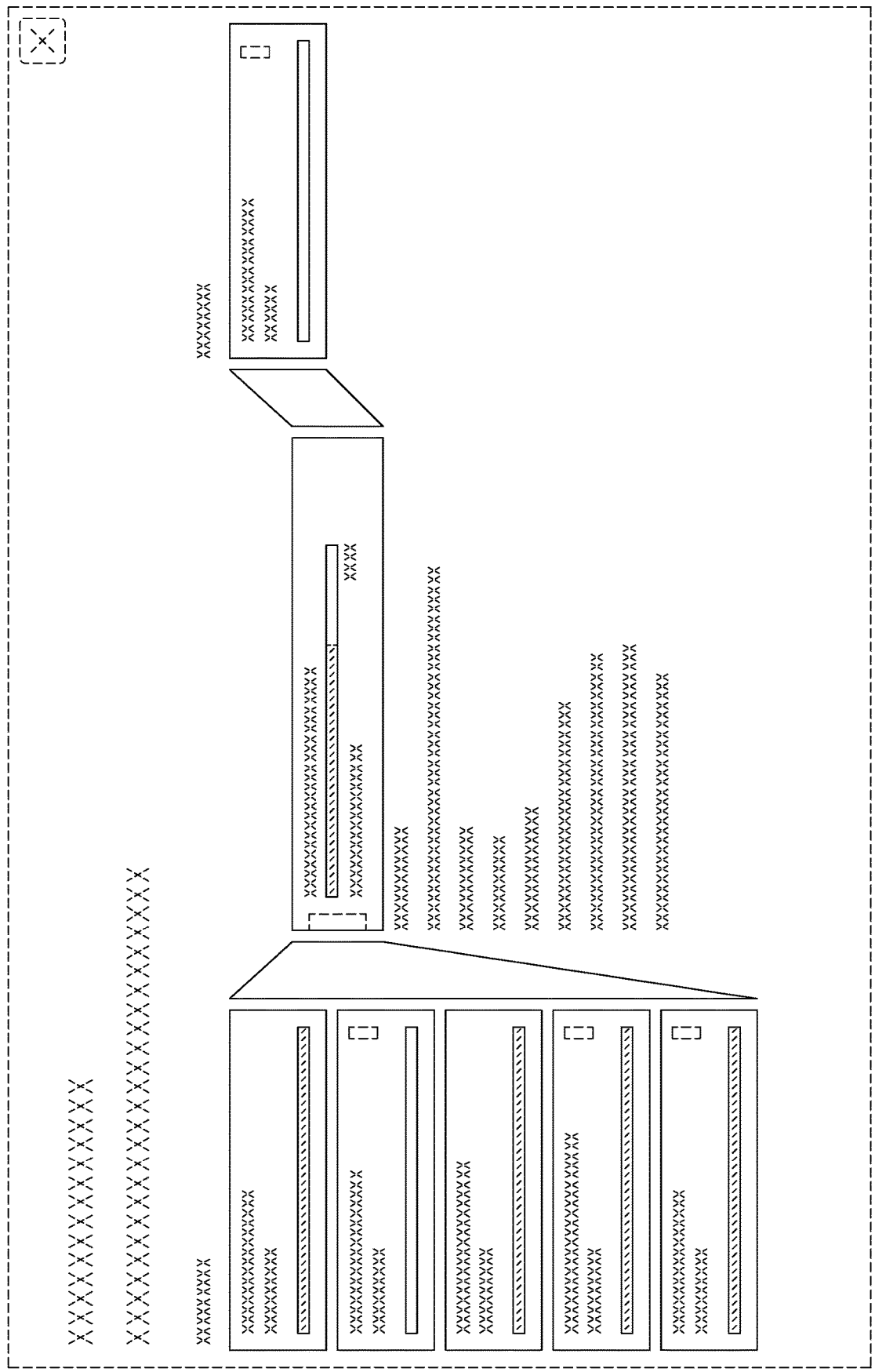
FIG. 55 is an eighth embodiment of the display screen with a graphical user interface.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During preproduction, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 can go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, environmental system 1413 and avionics 1416. Any number of other systems may be included. Although an aerospace example is shown, different illustrative embodiments may be applied to other industries, such as the automotive industry. Avionics 1416 can include a computer system such as computer system 104 in which action manager 106 is located.

Apparatuses and methods embodied herein may be employed during at least one of the stages of aircraft manufacturing and service method 1300 in FIG. 13. For example, a computer system implemented to include processes in the illustrative examples, such as those performed by hardware or software for actions manager 106 in FIG. 1 can operate during in service 1312 to control the operation of aircraft 1400.

In one illustrative example, components or subassemblies produced in component and subassembly manufacturing 1306 in FIG. 13 can be fabricated or manufactured in a manner similar to components or subassemblies produced while aircraft 1400 is in service 1312 in FIG. 13. As yet another example, one or more apparatus embodiments, method embodiments, or a combination thereof can be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially reduce of operating the cost of aircraft 1400 and increase the efficiency in which aircraft 1400 operates.

With reference to FIGS. 15-55, illustrations of display screens or portions of display screens that can be displayed on human machine interface system 158 are depicted. These figures are some illustrative examples of display screens or portions of display screens that can be displayed in graphical user interface 150 on display system 152 in human machine interface system 158 in FIG. 1.

These illustrative display screens or portions of displays screens in FIGS. 15-55 provide some examples of how information can be displayed in graphical user interface 150 and are not meant limit the manner in which information can be displayed in graphical user interface. For example, the display screens portions of displays screens depicted in these figures can be displayed in conjunction with other graphical displays to at least one of display information or receive user input.

As depicted, FIGS. 15-18 are illustrations of a display screen or a portion thereof with different embodiments of a graphical user interface depicted in accordance with an illustrative embodiment. The broken lines showing a display screen or a portion thereof in all views are for the purpose of illustrating environment and form no part of the claimed design. The broken lines of text, numbers, icons, and boxes demonstrating portions of a graphical user interface displayed on the display screen in all views are for illustrative purposes only and form no part of the claimed design. The diagonal lines in all views represents a color or shaded portion of the graphical user interface. The diagonal lines do not imply or claim a specific color. An ornamental design for a display screen with a graphical user interface is shown and described in FIGS. 15-18.

FIGS. 19-27 are illustrations of a display screen or a portion thereof with different embodiments of an animated graphical user interface depicted in accordance with an illustrative embodiment. The broken lines showing a display screen or a portion thereof in all views are for the purpose of illustrating environment and form no part of the claimed design. The broken lines of text, numbers, icons, and boxes demonstrating portions of the animated graphical user interface displayed on the display screen in all views are for illustrative purposes only and form no part of the claimed design. The diagonal lines in all views represents a color or shaded portion of the animated graphical user interface. The diagonal lines do not imply or claim a specific color. An ornamental design for a display screen with an animated graphical user interface is shown and described in FIGS. 19-27. The appearance of the animated images sequentially transitions between the images shown in FIGS. 19-21, FIGS. 22-24, or FIGS. 25-27. The process or period in which one image transitions to another forms no part of the claimed design.

FIGS. 28-36 are illustrations of a display screen or a portion thereof with different embodiments of an animated graphical user interface depicted in accordance with an illustrative embodiment. The broken lines showing a display screen or a portion thereof in all views are for the purpose of illustrating environment and form no part of the claimed design. The broken lines of text, numbers, icons, and boxes demonstrating portions of the animated graphical user interface displayed on the display screen in all views are for illustrative purposes only and form no part of the claimed design. The diagonal lines in all views represents a color or shaded portion of the animated graphical user interface. The diagonal lines do not imply or claim a specific color. An ornamental design for a display screen with an animated graphical user interface is shown and described in FIGS. 28-36. The appearance of the animated images sequentially transitions between the images shown in FIGS. 28-30, FIGS. 31-33, or FIGS. 34-36. The process or period in which one image transitions to another forms no part of the claimed design.

FIGS. 37-43 are illustrations of a display screen or a portion thereof with different embodiments of a graphical user interface depicted in accordance with an illustrative embodiment. The broken lines showing a display screen or a portion thereof in all views are for the purpose of illustrating environment and form no part of the claimed design. The broken lines of text, numbers, icons, and boxes demonstrating portions of a graphical user interface displayed on the display screen in all views are for illustrative purposes only and form no part of the claimed design. An ornamental design for a display screen with a graphical user interface is shown and described in FIGS. 37-43.

FIGS. 44-47 are illustrations of a display screen or a portion thereof with different embodiments of a graphical user interface depicted in accordance with an illustrative embodiment. The broken lines showing a display screen or a portion thereof in all views are for the purpose of illustrating environment and form no part of the claimed design. The broken lines of text, numbers, icons, and boxes demonstrating portions of a graphical user interface displayed on the display screen in all views are for illustrative purposes only and form no part of the claimed design. An ornamental design for a display screen with a graphical user interface is shown and described in FIGS. 44-47.

FIGS. 48-55 are illustrations of a display screen or a portion thereof with different embodiments of a graphical user interface depicted in accordance with an illustrative embodiment. The broken lines showing a display screen or a portion thereof in all views are for the purpose of illustrating environment and form no part of the claimed design. The broken lines of text, numbers, icons, and boxes demonstrating portions of a graphical user interface displayed on the display screen in all views are for illustrative purposes only and form no part of the claimed design. An ornamental design for a display screen with a graphical user interface is shown and described in FIGS. 48-55.

Thus, the illustrative embodiments provide a method, apparatus, and system for controlling and aircraft. In those examples, the aircraft can be controlled by a computer system that provides instructions to aircraft systems in aircraft. With one or more illustrative examples, specific values for automated systems are unnecessary to be entered by a human operator.

For example, the human operator does not need to enter information such as speed, heading, altitude, or other information. Instead, the human operator can enter a goal such as "be docked at gate B13 at Seattle Tacoma at 10:35 UTC". This goal can be translated into a target state, and the current mission state of the aircraft can be used to automatically identify actions and an order for performing the actions for a sequence of actions to reach target state. Further, the sequence of actions can be performed automatically without intervention of the pilot or other flight crew, thus resulting in increased automation of processes or functions for operating an aircraft.

Additionally, the processes in the illustrative examples are dynamic such that the selection of actions can be performed again to identify a new sequence of actions while the current sequence of actions is still being performed. In this manner, those examples provide capability to take into account events that may change what actions are performed to reach the target state.

As a result, unforeseen changes can be taken and handled as compared to current systems using decision trees. Thus, control of functions being handled by the automated aircraft system is less likely to be returned to the pilot in the illustrative examples as compared to systems using a decision tree. As a result, workloads for the pilot and other flight crew members can be reduced with greater predictability.

In the illustrative example, features of the illustrative examples are described in the following clauses. These clauses are examples of features not intended to limit other illustrative examples.

Clause 1.

A method comprising:
identifying, by a computer system, a target state for an aircraft;
determining, by the computer system, a current mission state for the aircraft;
selecting, by the computer system, a sequence of actions from a pool of potential actions to reach the target state from the current mission state for the aircraft in which the sequence of actions is selected based on the current mission state; and
performing, by the computer system, actions in the sequence of actions for which preconditions for the actions that have been met, in which the actions are performed in an order defined by the sequence of actions.

Clause 2.

The method of clause 1, wherein the actions and the sequence of actions are selected based on a cost of performing the actions.

Clause 3.

The method of clause 1 or 2, wherein the actions and the sequence of actions is selected from the pool of potential actions by an artificial intelligence system.

Clause 4.

The method of clause 1, 2, or 3, wherein determining, by the computer system, the current mission state for the aircraft comprises:
receiving state variables from aircraft systems in the aircraft; and
determining the current mission state using the state variables for the current mission state.

Clause 5.

The method of clause 1, 2, 3, or 4, wherein the selecting the sequence of actions, by the computer system, from the pool of potential actions to reach the target state from the current mission state for the aircraft in which the sequence of actions is selected based on the current mission state comprises:
identifying nodes in a path from the current mission state to the target state based on the nodes having a lowest cost; and
selecting the sequence of actions from the pool of potential actions based on the nodes identified in the path.

Clause 6.

The method of clause 5, wherein a cost used to determine the lowest cost comprises a set of factors selected from at least one of a number of effects of an action, a monetary cost, an amount of time, a maintenance cost to be incurred, an amount of fuel to be consumed, a personnel cost connected to time, or passenger comfort.

Clause 7.

The method of clause 1, 2, 3, 4, 5, or 6, wherein selecting the sequence of actions, by the computer system, from the pool of potential actions to reach the target state to reach the current mission state for the aircraft comprises:
selecting the sequence of actions, by the computer system, from the pool of potential actions to reach the target state based on the current mission state for the aircraft using a set of path planning algorithms.

Clause 8.

The method of clause 7, wherein the set of path planning algorithms is selected from at least one an A* search algorithm, a Dijkstra's algorithm, a D*, an incremental search algorithm, a Backtracking algorithm, a Fringe search, an Any-angle path planning algorithm, an iterative deepening A* search algorithm, a Bellman-Ford search algorithm, a Floyd-Warshall algorithm, a Hill climbing algorithm, a Bidirectional search algorithm, or a Johnson's algorithm.

Clause 9.

The method of clause 1, 2, 3, 4, 5, 6, 7, or 8 further comprising:
responsive to an event, selecting the sequence of actions, by the computer system, from the pool of potential actions to reach the target state based from the current mission state in which the sequence of actions is selected based on the current mission state.

Clause 10.

The method of clause 1, 2, 3, 4, 5, 6, 7, 8, or 9, wherein the event is selected from a periodic event, a non-periodic event, a current mission state change, reaching a sub target state, an expiration of a timer, a state variable change, a change in a configuration of the aircraft, and a performance of an action.

Clause 11.

The method of clause 1, 2, 3, 4, 5, 6, 7, 8, 9, or 10, wherein the current mission state of the aircraft comprises set of state variables for the aircraft.

Clause 12.

The method of clause 1, 2, 3, 4, 5, 6, 7, 8, 9, 10, or 11, wherein the preconditions comprise at least one of a current location of the aircraft, a performance of a selected action, a configuration of the aircraft, a position of a control surface, a weather condition, or an instruction from an air traffic controller.

Clause 13.

The method of clause 1, 2, 3, 4, 5, 6, 7, 8, 9, 10, 11, or 12, wherein the target state is one of an operational target state and a spatial target state.

Clause 14.

The method of clause 1, 2, 3, 4, 5, 6, 7, 8, 9, 10, 11, 12, or 13, wherein the target state comprises a set of state variables with a set of values for the target state.

Clause 15.

The method of clause 1, 2, 3, 4, 5, 6, 7, 8, 9, 10, 11, 12, 13, or 14 further comprising:

defining the target state for the aircraft based on user input received from a human machine interface system.

Clause 16.

The method of clause 15, wherein the human machine interface system is at least one of located in the aircraft, a remote location in communication with is remotely coupled to the aircraft, an air traffic control system, or an airline system.

Clause 17.

An aircraft control system comprising:

a computer system; and an action manager in the computer system, wherein the action manager is configured to:

identify a target state for an aircraft;

determine a current mission state for the aircraft from state variables received from aircraft systems in the aircraft;

select a sequence of actions from a pool of potential actions to reach the target state from the current mission state for the aircraft using a set of path planning algorithms in which the sequence of actions is selected based on the current mission state; and perform actions in the sequence of actions for which preconditions for the actions that have been met in which the actions are performed in an order defined by the sequence of actions.

Clause 18.

The aircraft control system of clause 17, wherein the action manager selects the sequence of actions from the pool of potential actions to reach the target state from the current mission state for the aircraft using the set of path planning algorithms in which the sequence of actions is selected based on the current mission state when an event occurs.

Clause 19.

The aircraft control system of clause 17 or 18, wherein the set of path planning algorithms comprises at least one of an A* search algorithm, a Dijkstra's algorithm, a D*, an incremental search algorithm, a Backtracking algorithm, a Fringe search, an Any-angle path planning algorithm, an iterative deepening A* search algorithm, a Bellman-Ford search algorithm, a Floyd-Warshall algorithm, a Hill climbing algorithm, a Bidirectional search algorithm, or a Johnson's algorithm.

Clause 20.

The aircraft control system of clause 18 or 19, wherein the event is one of periodic event, a non-periodic event, a current mission state change, reaching a sub target state, an expiration of a timer, a state variable change, a change in a configuration of the aircraft, and a performance of an action.

Clause 21.

An aircraft control system comprising: a computer system configured to identify a target state for an aircraft; determine a current mission state for the aircraft; select a sequence of actions from a pool of potential actions to reach the target state from the current mission state for the aircraft in which the sequence of actions is selected based on the current mission state; and perform actions in the sequence of actions for which preconditions for the actions that have been met in which the actions are performed in an order defined by the sequence of actions.

Clause 22.

The aircraft control system of clause 21, wherein the actions and the sequence of actions are selected based on a cost of performing the actions.

Clause 23.

The aircraft control system of clause 21 or 22, wherein the actions and the sequence of actions are selected from the pool of potential actions by an artificial intelligence system.

Clause 24.

The aircraft control system of clause 21, 22, or 23, wherein in determining, by the computer system, the current mission state for the aircraft, the computer system is configured to receive state variables from aircraft systems in the aircraft and determine the current mission state using the state variables for the current mission state.

Clause 25.

The aircraft control system of clause 24, wherein the aircraft systems are selected from at least one of a flight management system, a flight navigation system, an environmental control system, an engine, a flight control surface system, an auto pilot, a communications system, a satellite communications system, a very high frequency communication system, microwave-band communication system, a radar system, an autopilot, a fuel system, a weather radar, an electronic centralized aircraft monitoring system, a quick access data recorder, an onboard network server, an electronic flight instrument system.

Clause 26.

The aircraft control system of clause 21, 22, 23, 24, or 25, wherein in selecting the sequence of actions from the pool of potential actions to reach the target state from the current mission state for the aircraft in which the sequence of actions is selected based on the current mission state, the computer system is configured to identify nodes in a path from the current mission state to the target state based the nodes having a lowest cost using an artificial intelligence system and select the sequence of actions from the pool of potential actions based on the nodes identified in the path.

Clause 27.

The aircraft control system of clause 21, 22, 23, 24, 25, or 26, wherein a cost used to determine the lowest cost comprises a set of factors selected from at least one of a number of effects of an action, a monetary cost, an amount of time, a maintenance cost incurred, an amount of fuel to be consumed, a personnel cost connected to time, or passenger comfort.

Clause 28.

The aircraft control system of clause 21, 22, 23, 24, 25, 26, or 27, wherein in selecting the sequence of actions from the pool of potential actions to reach the target state from the current mission state for the aircraft in which the sequence of actions is selected based on the current mission state, the computer system is configured to select the sequence of actions from the pool of potential actions to reach the target state based on the current mission state for the aircraft using a set of path planning algorithms.

Clause 29.

The aircraft control system of clause 28, wherein the set of path planning algorithms comprises at least one an A* search algorithm, a Dijkstra's algorithm, a D*, an incremental search algorithm, a Backtracking algorithm, a Fringe search, an Any-angle path planning algorithm, an iterative deepening A* search algorithm, a Bellman-Ford search algorithm, a Floyd-Warshall algorithm, a Hill climbing algorithm, a Bidirectional search algorithm, or a Johnson's algorithm.

Clause 30.

The aircraft control system of clause 21, 22, 23, 24, 25, 26, 27, 28, or 29, wherein the computer system selects the sequence of actions from the pool of potential actions to reach the target state from the current mission state for the aircraft using a set of path planning algorithms in which the sequence of actions is selected based on the current mission state when an event occurs.

Clause 31.

The aircraft control system of clause 30, wherein the event is selected from a periodic event, a non-periodic event, a current mission state change, reaching a sub target state, an expiration of a timer, a state variable change, a change in a configuration of the aircraft, and a performance of an action.

Clause 32.

The aircraft control system of clause 21, 22, 23, 24, 25, 26, 27, 28, 29, 30, or 31, wherein the current mission state of the aircraft comprises state variables for the aircraft.

Clause 33.

The aircraft control system of clause 21, 22, 23, 24, 25, 26, 27, 28, 29, 30, 31, or 32, wherein the preconditions comprise at least one of a current location of the aircraft, a performance of a selected action, a configuration of the aircraft, a position of a control surface, a weather condition, or an instruction from an air traffic controller.

Clause 34.

The aircraft control system of clause 21, 22, 23, 24, 25, 26, 27, 28, 29, 30, 31, 32, or 33, wherein the target state is one of an operational target state and a spatial target state.

Clause 35.

The aircraft control system of clause 21, 22, 23, 24, 25, 26, 27, 28, 29, 30, 31, 32, 33, or 34, wherein the target state comprises a set of state variables with a set of values for the target state.

Clause 36.

The aircraft control system of clause 21, 22, 23, 24, 25, 26, 27, 28, 29, 30, 31, 32, 33, 34, or 35, wherein the computer system defines the target state for the aircraft based on user input received from a human machine interface system.

Clause 37.

The aircraft control system of claim 36, wherein the human machine interface system is at least one of located in the aircraft, a remote location in communication with is remotely coupled to the aircraft, an air traffic control system, or an airline system.

Clause 38.

The aircraft control system of clause 21, 22, 23, 24, 25, 26, 27, 28, 29, 30, 31, 32, 33, 34, 35, 36, or 37, wherein the computer system includes at least one of a flight management system, a line replaceable unit, a tablet computer, or an electronic flight bag.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   receiving, by a computer system, a goal for an aircraft;
   identifying, by the computer system, a set of state variables defining a target state that satisfies the goal for the aircraft;
   determining, by the computer system, a set of state variables defining a current mission state for the aircraft;
   lacking a predetermined decision tree pathway that comprises tactical actions to the goal;
   generating, by the computer system, a sequence of actions for changing the set of state variables defining the current mission state for the aircraft to the set of state variables defining the target state for the aircraft, by evaluating an effect virtually, respectively, on each state variable in the set of variables defining the current mission state, of all potential actions from the current mission state for the aircraft and virtually creating a temporary mission state resultant, respectively, from taking each one of the all potential actions and repeating iteratively for all potential actions from each temporary mission state until generating the sequence of actions producing the set of state variables defining the target state;
   assigning each action in the sequence of actions a cost;
   the computer system selecting, using a cost of performing the actions, one sequence of actions for performing; and
   performing, by the computer system, actions in the sequence of actions changing the set of state variables defining the current mission state for the aircraft to the set of state variables defining the target state after meeting preconditions for the actions in an order defined by the sequence of actions changing the set of state variables defining the current mission state for the aircraft to the set of state variables defining the target state.

2. The method of claim 1, wherein the method further comprises the computer system:
generating more than one sequence of actions changing the set of state variables defining the current mission state for the aircraft to the set of state variables defining the target state for the aircraft.

3. The method of claim 1, further comprising the computer system:
planning, while performing actions in the sequence of actions changing the set of state variables defining the current mission state for the aircraft to the set of state variables defining the target state, and using a change in a state variable that defines the current mission state, a new sequence of actions for reaching the target state.

4. The method of claim 1, wherein determining, by the computer system, the current mission state for the aircraft comprises:
receiving all state variables from aircraft systems in the aircraft; and
determining the current mission state using the state variables for the current mission state.

5. The method of claim 1, wherein generating the sequence of actions comprises:
identifying nodes in a path from the current mission state to the target state based on the nodes having a lowest cost; and
selecting the sequence of actions changing the set of state variables defining the current mission state for the aircraft to the set of state variables defining the target state based on the nodes identified in the path.

6. The method of claim 5, wherein a cost used to determine the lowest cost comprises a set of factors selected from at least one of a number of effects of an action, a monetary cost, an amount of time, a maintenance cost to be incurred, an amount of fuel to be consumed, a personnel cost connected to time, or passenger comfort.

7. The method of claim 1, wherein generating the sequence of actions changing the set of state variables defining the current mission state for the aircraft to the set of state variables defining the target state further comprises selecting, by the computer system, actions, for reaching the target state based on the current mission state for the aircraft using a set of path planning algorithms.

8. The method of claim 7, wherein the set of path planning algorithms is selected from at least one an A* search algorithm, a Dijkstra's algorithm, a D*, an incremental search algorithm, a Backtracking algorithm, a Fringe search, an Any-angle path planning algorithm, an iterative deepening A* search algorithm, a Bellman-Ford search algorithm, a Floyd-Warshall algorithm, a Hill climbing algorithm, a Bidirectional search algorithm, or a Johnson's algorithm.

9. The method of claim 1 further comprising:
responsive to an event, generating the sequence of actions, by the computer system basing the sequence of actions changing the set of state variables defining the current mission state for the aircraft to the set of state variables defining the target state on the current mission state.

10. The method of claim 9, wherein the event is selected from a periodic event, a non-periodic event, a current mission state change, reaching a sub target state, an expiration of a timer, a state variable change, a change in a configuration of the aircraft, and a performance of an action.

11. The method of claim 1, wherein the current mission state of the aircraft comprises set of state variables for the aircraft.

12. The method of claim 1, wherein preconditions for an action comprise at least one of a current location of the aircraft, a performance of a selected action, a configuration of the aircraft, a position of a control surface, a weather condition, or an instruction from an air traffic controller.

13. The method of claim 1, wherein the target state is one of an operational target state and a spatial target state.

14. The method of claim 1, wherein the set of state variables define the target state with a set of values for the target state.

15. The method of claim 1 further comprising:
receiving the goal from a human machine interface system.

16. The method of claim 15, wherein the human machine interface system is at least one of located in the aircraft, a remote location in communication with the aircraft, an air traffic control system, or an airline system.

17. An aircraft control system that comprises:
a computer system; and
an action manager in the computer system, wherein the action manager is configured to:
identify a first set of variables that define a target state that satisfies a goal for an aircraft;
determine a second set of variables that define a current mission state for the aircraft from state variables received from aircraft systems in the aircraft;
generate, based upon a set of path planning algorithms, a sequence of actions that change the second set of variables to the first set of variables based upon an evaluation of a virtual effect, respectively, on each variable in the second set of variables that define the current mission state, of all potential actions from the current mission state to create a temporary mission state resultant, respectively, from each one of the all potential actions and an iterative repeat thereof for all potential actions from each temporary mission state until dynamic generation of the sequence of actions that change the second set of variables to the first set of variables, wherein the computer system lacks a predetermined decision tree pathway that comprises tactical actions to the goal, and selections of the actions and the sequence of actions that change the second set of state variables to the set of state variables that define the target state are based on a cost of performance of each of the actions;
select a sequence of actions from a list of generated sequences of actions that reach the target state from the current mission state for the aircraft; and
perform actions in the sequence of actions selected, in an order defined by the sequence of actions.

18. The aircraft control system of claim 17, wherein the action manager selects the sequence of actions from the list based on the current mission state at an occurrence of an event.

19. The aircraft control system of claim 18, wherein the set of path planning algorithms comprises at least one of an A* search algorithm, a Dijkstra's algorithm, a D*, an incremental search algorithm, a Backtracking algorithm, a Fringe search, an Any-angle path planning algorithm, an iterative deepening A* search algorithm, a Bellman-Ford search algorithm, a Floyd-Warshall algorithm, a Hill climbing algorithm, a Bidirectional search algorithm, or a Johnson's algorithm.

20. The aircraft control system of claim 18, wherein the event is one of periodic event, a non-periodic event, a current mission state change, reaching a sub target state, an expiration of a timer, a state variable change, a change in a configuration of the aircraft, and a performance of an action.

21. An aircraft control system that comprises a computer system configured to:
receive a goal for an aircraft;
identify a set of state variables that define a target state that satisfies the goal for the aircraft;
determine a second set of state variables that define a current mission state for the aircraft;
generate, based upon a set of path planning algorithms, a sequence of actions that change the second set of state variables to the set of state variables that define the target state based upon an evaluation of a virtual effect, respectively, on each variable in the second set of state variables that define the current mission state, of all potential actions from the current mission state to create a temporary mission state resultant, respectively, from each one of the all potential actions and an iterative repeat thereof for all potential actions from each temporary mission state until dynamic generation of the sequence of actions that change the second set of state variables to the set of state variables that define the target state, wherein the computer system lacks a predetermined decision tree pathway that comprises tactical actions to the goal, and selections of the actions and the sequence of actions that change the second set of state variables to the set of state variables that define the target state are based on a cost of performance of each of the actions; and
perform actions in the sequence of actions selected, in an order defined by the sequence of actions.

22. The aircraft control system of claim 21, wherein the computer system is further configured to:
use an artificial intelligence system.

23. The aircraft control system of claim 21, wherein the computer system is configured to receive state variables from aircraft systems in the aircraft and determine the current mission state using the state variables for the current mission state.

24. The aircraft control system of claim 23, wherein the aircraft systems are selected from at least one of a flight management system, a flight navigation system, an environmental control system, an engine, a flight control surface system, an auto pilot, a communications system, a satellite communications system, a very high frequency communication system, microwave-band communication system, a radar system, an autopilot, a fuel system, a weather radar, an electronic centralized aircraft monitoring system, a quick access data recorder, an onboard network server, an electronic flight instrument system.

25. The aircraft control system of claim 21, wherein the computer system is further configured to:
identify, based upon an artificial intelligence system, nodes in a path from the current mission state to the target state based on nodes having a lowest cost; and
select the sequence of actions based on the nodes identified in the path.

26. The aircraft control system of claim 21, wherein the computer system is further configured to determine a lowest cost that comprises a set of factors selected from at least one of: a number of effects of an action, a monetary cost, an amount of time, a maintenance cost incurred, an amount of fuel to be consumed, a personnel cost connected to time, or passenger comfort.

27. The aircraft control system of claim 21, wherein the computer system is further configured to select the sequence of actions based on the current mission state for the aircraft using a set of path planning algorithms.

28. The aircraft control system of claim 27, wherein the set of path planning algorithms comprises at least one an A* search algorithm, a Dijkstra's algorithm, a D*, an incremental search algorithm, a Backtracking algorithm, a Fringe search, an Any-angle path planning algorithm, an iterative deepening A* search algorithm, a Bellman-Ford search algorithm, a Floyd-Warshall algorithm, a Hill climbing algorithm, a Bidirectional search algorithm, or a Johnson's algorithm.

29. The aircraft control system of claim 21, wherein the computer system selects the sequence of actions that change the second set of state variables to the set of state variables that define the target state based on the current mission state when an event occurs.

30. The aircraft control system of claim 29, wherein the event is selected from a periodic event, a non-periodic event, a current mission state change, reaching a sub target state, an expiration of a timer, a state variable change, a change in a configuration of the aircraft, and a performance of an action.

31. The aircraft control system of claim 21, wherein the current mission state of the aircraft comprises state variables for the aircraft.

32. The aircraft control system of claim 21, wherein preconditions for an action comprise at least one of a current location of the aircraft, a performance of a selected action, a configuration of the aircraft, a position of a control surface, a weather condition, or an instruction from an air traffic controller.

33. The aircraft control system of claim 21, wherein the target state is one of an operational target state and a spatial target state.

34. The aircraft control system of claim 21, wherein the set of state variables that define the target state comprises a set of values for the target state.

35. The aircraft control system of claim 21, wherein the computer system defines the target state for the aircraft based on user input received from a human machine interface system.

36. The aircraft control system of claim 35, wherein the human machine interface system is at least one of located in the aircraft, in a remote location in communication with the aircraft, an air traffic control system, or an airline system.

37. The aircraft control system of claim 21, wherein the computer system includes at least one of a flight management system, a line replaceable unit, a tablet computer, or an electronic flight bag.

* * * * *